US009947960B2

(12) United States Patent
Hallac et al.

(10) Patent No.: US 9,947,960 B2
(45) Date of Patent: Apr. 17, 2018

(54) ELECTROLYTES FOR LOW IMPEDANCE, WIDE OPERATING TEMPERATURE RANGE LITHIUM-ION BATTERY MODULE

(71) Applicants: Johnson Controls Technology Company, Holland, MI (US); California Institute of Technology, Pasadena, CA (US)

(72) Inventors: Boutros Hallac, Franklin, WI (US); Marshall C. Smart, Studio City, CA (US); Frederick C. Krause, Los Angeles, CA (US); Bernhard M. Metz, Milwaukee, WI (US); Ratnakumar V. Bugga, Arcadia, CA (US); Junwei Jiang, Whitefish Bay, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 284 days.

(21) Appl. No.: 14/614,389

(22) Filed: Feb. 4, 2015

(65) Prior Publication Data

US 2015/0221977 A1    Aug. 6, 2015

Related U.S. Application Data

(60) Provisional application No. 61/936,067, filed on Feb. 5, 2014.

(51) Int. Cl.
*H01M 10/0525* (2010.01)
*H01M 10/0569* (2010.01)
(Continued)

(52) U.S. Cl.
CPC ... *H01M 10/0525* (2013.01); *H01M 10/0567* (2013.01); *H01M 10/0568* (2013.01);
(Continued)

(58) Field of Classification Search
CPC ........ H01M 10/0525; H01M 10/0567; H01M 10/0569; H01M 10/0568;
(Continued)

(56) References Cited

U.S. PATENT DOCUMENTS 6,399,255 B2    6/2002   Herreyre et al.
6,436,577 B1    8/2002   Kida et al.
(Continued)

FOREIGN PATENT DOCUMENTS

CN    101771167    7/2010
CN    102593515    7/2012
(Continued)

OTHER PUBLICATIONS

Invitation to Pay Fees and, Where Applicable, Protest Fee for International Application No. PCT/US2015/014643 dated Apr. 29, 2015.
(Continued)

*Primary Examiner* — Osei K Amponsah
(74) *Attorney, Agent, or Firm* — Fletcher Yoder, P.C.

(57) ABSTRACT

A lithium ion battery cell includes a housing, a cathode disposed within the housing, wherein the cathode comprises a cathode active material, an anode disposed within the housing, wherein the anode comprises an anode active material, and an electrolyte disposed within the housing and in contact with the cathode and anode. The electrolyte consists essentially of a solvent mixture, a lithium salt in a concentration ranging from approximately 1.0 molar (M) to approximately 1.6 M, and an additive mixture. The solvent mixture includes a cyclic carbonate, an non-cyclic carbonate, and a linear ester. The additive mixture consists essentially of lithium difluoro(oxalato)borate (LiDFOB) in an amount ranging from approximately 0.5 wt % to approximately 2.0 wt % based on the weight of the electrolyte, and
(Continued)

vinylene carbonate (VC) in an amount ranging from approximately 0.5 wt % to approximately 2.0 wt % based on the weight of the electrolyte.

21 Claims, 38 Drawing Sheets

(51) Int. Cl.
| | |
|---|---|
| *H01M 10/0568* | (2010.01) |
| *H01M 10/0567* | (2010.01) |
| *H01M 4/485* | (2010.01) |
| *H01M 4/505* | (2010.01) |
| *H01M 4/525* | (2010.01) |
| *H01M 4/587* | (2010.01) |

(52) U.S. Cl.
CPC ........ *H01M 10/0569* (2013.01); *H01M 4/485* (2013.01); *H01M 4/505* (2013.01); *H01M 4/525* (2013.01); *H01M 4/587* (2013.01); *H01M 2220/20* (2013.01); *H01M 2300/004* (2013.01); *H01M 2300/0034* (2013.01); *H01M 2300/0042* (2013.01); *H01M 2300/0091* (2013.01); *Y02E 60/122* (2013.01)

(58) Field of Classification Search
CPC ... H01M 2300/0091; H01M 2300/004; H01M 2300/0034; H01M 2300/0042; H01M 4/505; H01M 4/525; H01M 4/587; H01M 4/485
USPC ........................................................ 429/163
See application file for complete search history.

(56) References Cited

U.S. PATENT DOCUMENTS

| | | | |
|---|---|---|---|
| 6,492,064 | B1 | 12/2002 | Smart et al. |
| 7,255,965 | B2 | 8/2007 | Xu et al. |
| 7,476,463 | B2 | 1/2009 | Desilvestro et al. |
| 7,740,986 | B2 | 6/2010 | Yumoto et al. |
| 8,383,274 | B2 | 2/2013 | Abe |
| 8,748,046 | B2 | 6/2014 | Smart et al. |
| 8,795,903 | B2 | 8/2014 | Smart et al. |
| 8,920,981 | B2 | 12/2014 | Smart et al. |
| 2008/0026297 | A1* | 1/2008 | Chen ................. H01M 10/0568 429/341 |
| 2009/0106970 | A1 | 4/2009 | Fan et al. |
| 2010/0119956 | A1* | 5/2010 | Tokuda ................. H01M 4/134 429/338 |
| 2011/0189548 | A1 | 8/2011 | Xu |
| 2012/0007560 | A1 | 1/2012 | Smart et al. |
| 2012/0141883 | A1 | 6/2012 | Smart et al. |
| 2014/0178770 | A1 | 6/2014 | Xu et al. |
| 2014/0186723 | A1 | 7/2014 | Hallac et al. |

FOREIGN PATENT DOCUMENTS

| | | |
|---|---|---|
| CN | 103078141 | 5/2013 |
| EP | 2469633 | 6/2012 |

OTHER PUBLICATIONS

Applied Battery Research for Transportation (B&R No. VT-1102000). Progress Report for Third Quarter FY 2013. Sep. 2013. http://www.abr.anl.gov/pdfs/ABR_Program_Report_Q3_FY2013.pdf.
M.C. Smart et al.; Electrolytes Designed for Improved Operation of Li-ion Cells at High Temperatures; NTR-NPO-45627; Sep. 5, 2008.
M.C. Smart et al.; The Use Methyl Butyrate-Based Lithium-ion Electrolytes with Additives for High Voltage Systems; NTR-NPO-49160; May 10, 2013.
M.C. Smart et al.; Optimized carbonate and ester-based Li-ion electrolytes with improved low temperature performance of Li-ion cells; NTR NOP-44974; Mar. 9, 2007.
M.C. Smart et al.; Wide Operating Temperature Range Li-Ion Cells Employing Electrolytes with Methyl Propionate and Ethyl Butyrate Co-Solvents; NTR NPO-46976; Mar. 13, 2009.
M.C. Smart et al.; Improved Low Temperature Performance of High Rate Nano-Lithium Iron Phosphate-Based Li-Ion Cells with the use of Advanced Electrolytes; NTR NPO-46180; Apr. 28, 2008.
M.C. Smart et al.; The use of additives to improve the performance of methyl butyrate-based lithium-ion electrolytes; NTR NPO-47537; Feb. 10, 2010.
M.C. Smart et al.; Improved wide operating temperature range of Li-ion cells using methyl propionate-based electrolytes containing additives; NTR NPO-47538; Feb. 10, 2010.
A. Xiao et al.; Thermal Reactions of LiPF6 with Added LiBOB Electrolyte Stabilization and Generation of LiF4OP; Electrochem. Solid State Lett.; 10 (11); A241-244; 2007.
S. Dalavi et al.; Effect of Added LiBOB on High Voltage (LiNi0.5Mn1.5O4) Spinel Cathodes; Electrochem. Solid State Lett.; 15 (2); A28-A31; 2011.
M.C. Smart et al.; Li-ion Electrolytes with Improved Safety and Tolerance to High Voltage Systems; NTR-NPO-47980; Dec. 10, 2010.
M.C. Smart et al.; The Evaluation of Triphenyl Phospate as a Flame Retardant Additive to Improve the Safety of Lithium-ion Battery Electrolytes; ECS Trans. 35(13); 2011.
Y. Zhu et al.; Positive Electrode Passivation by LiDFOB Electrolyte Additive in Cells with Li 1.2 Ni 0.15 Mn 0.55 Co 0.1O2—based positive; Electrochem. Soc. 159(12); A2109-A2117; 2012.
J. Liu et al.; Lithium Difluoro(oxalato) Borate as a Functional Additive for Lithium-ion Batteries; Electrochem. Commun. 9(2007) 475.

* cited by examiner

━◆━ 1.2M LiPF6 EC /EMC /MB /(20 /20 /60) 1wt%VC,0.5wt%LiBOB
───── 1.2M LiPF6 FEC /EMC /MB /(20 /20 /60) 1wt%VC,0.5wt%LiBOB

━◆━ 1.2M LiPF6 EC /EMC /DMC /MB+1wt%VC, 0.5wt%LiBOB
━■━ 1.2M LiPF6 EC /EMC /DMC /MB+1wt%VC, 0.5wt%LiDFOB

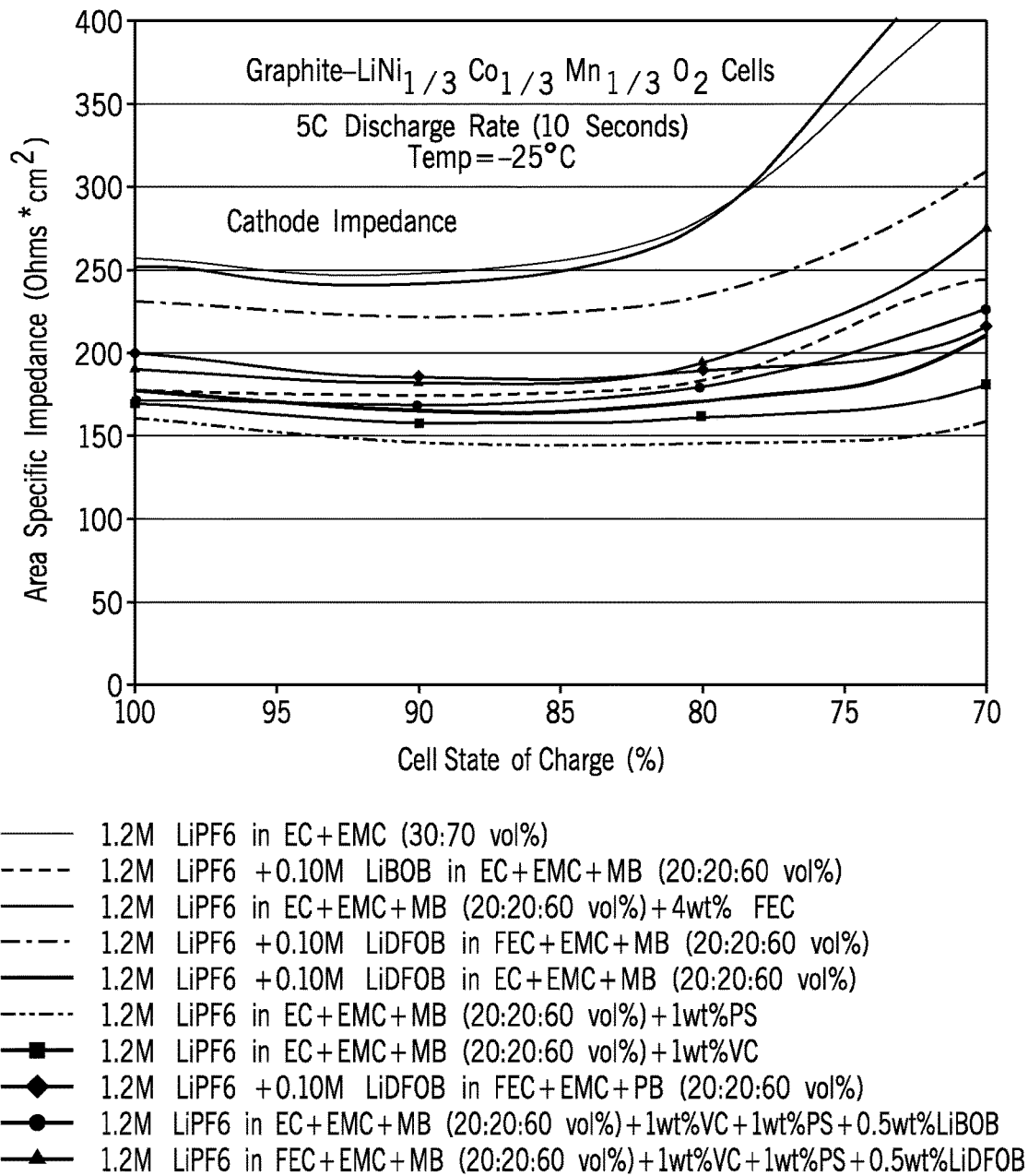

— 1.2M LiPF6 in EC+EMC (30:70 vol%)
---- 1.2M LiPF6 +0.10M LiBOB in EC+EMC+MB (20:20:60 vol%)
— 1.2M LiPF6 in EC+EMC+MB (20:20:60 vol%)+4wt% FEC
—·—· 1.2M LiPF6 +0.10M LiDFOB in FEC+EMC+MB (20:20:60 vol%)
— 1.2M LiPF6 +0.10M LiDFOB in EC+EMC+MB (20:20:60 vol%)
····· 1.2M LiPF6 in EC+EMC+MB (20:20:60 vol%)+1wt%PS
—■— 1.2M LiPF6 in EC+EMC+MB (20:20:60 vol%)+1wt%VC
—♦— 1.2M LiPF6 +0.10M LiDFOB in FEC+EMC+PB (20:20:60 vol%)
—●— 1.2M LiPF6 in EC+EMC+MB (20:20:60 vol%)+1wt%VC+1wt%PS+0.5wt%LiBOB
—▲— 1.2M LiPF6 in FEC+EMC+MB (20:20:60 vol%)+1wt%VC+1wt%PS+0.5wt%LiDFOB

FIG. 21

ELECTROLYTES FOR LOW IMPEDANCE, WIDE OPERATING TEMPERATURE RANGE LITHIUM-ION BATTERY MODULE

CROSS REFERENCE TO RELATED APPLICATIONS

This application claims priority from and the benefit of U.S. Provisional Application Ser. No. 61/936,067, entitled "ELECTROYLYTES WITH ESTER CO-SOLVENTS AND ADDITIVES FOR INPROVED WIDE OPERATING TEMPERATURE RANGE", filed Feb. 5, 2014, which is hereby incorporated by reference in its entirety for all purposes.

STATEMENT REGARDING FEDERALLY SPONSORED RESEARCH & DEVELOPMENT

The invention described herein was made in the performance of work under a NASA contract, and is subject to the provisions of Public Law 96-517 (35 USC § 202) in which the Contractor has elected to retain title.

BACKGROUND

The present disclosure relates generally to the field of lithium-ion batteries and battery modules. More specifically, the present disclosure relates to battery cells that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems. In particular, it may be desirable for an xEV battery power source to enable operation of the xEV in a number of environments (e.g., high and low temperature environments, humid environments, arid environments).

SUMMARY

The present disclosure relates generally to the field of lithium-ion batteries and battery modules. More specifically, the present disclosure relates to battery cells that may be used in vehicular contexts, as well as other energy storage/expending applications.

In one embodiment, a lithium ion battery cell includes a housing, a cathode disposed within the housing, wherein the cathode comprises a cathode active material, an anode disposed within the housing, wherein the anode comprises an anode active material, and an electrolyte disposed within the housing and in contact with the cathode and anode. The electrolyte consists essentially of a solvent mixture, a lithium salt in a concentration ranging from approximately 1.0 molar (M) to approximately 1.6 M, and an additive mixture. The solvent mixture includes a cyclic carbonate, an non-cyclic carbonate, and a linear ester. The additive mixture consists essentially of lithium difluoro(oxalato)borate (LiDFOB) in an amount ranging from approximately 0.5 wt % to approximately 2.0 wt % based on the weight of the electrolyte, and vinylene carbonate (VC) in an amount ranging from approximately 0.5 wt % to approximately 2.0 wt % based on the weight of the electrolyte.

In another embodiment, a lithium ion battery cell includes a housing, a cathode disposed within the housing, wherein the cathode comprises a cathode active material, an anode disposed within the housing, wherein the anode comprises an anode active material, and an electrolyte disposed within the housing and in contact with the cathode and anode. The electrolyte includes a solvent mixture, a lithium salt in a concentration ranging from approximately 1.0 molar (M) to approximately 1.6 M, and lithium difluoro(oxalato)borate (LiDFOB) in an amount ranging from approximately 0.5 wt % to approximately 2.0 wt % based on the weight of the electrolyte. The solvent mixture includes a cyclic carbonate, a non-cyclic carbonate, and a linear ester. The cyclic carbonate consists essentially of fluoroethylene carbonate (FEC).

In a further embodiment, a lithium ion battery cell includes a housing, a cathode disposed within the housing, wherein the cathode comprises a cathode active material; an anode disposed within the housing, wherein the anode comprises a titanate-based active material, and an electrolyte disposed within the housing and in contact with the cathode and anode. The electrolyte includes a solvent mixture, a lithium salt in a concentration ranging from approximately 1.0 molar (M) to approximately 1.6 M, and lithium difluoro (oxalato)borate (LiDFOB) in an amount ranging from approximately 0.5 wt % to approximately 2.0 wt % based on the weight of the electrolyte. The solvent mixture includes a cyclic carbonate, an non-cyclic carbonate, and a linear ester, wherein the cyclic carbonate consists essentially of propylene carbonate (PC).

DRAWINGS

Figure 19:
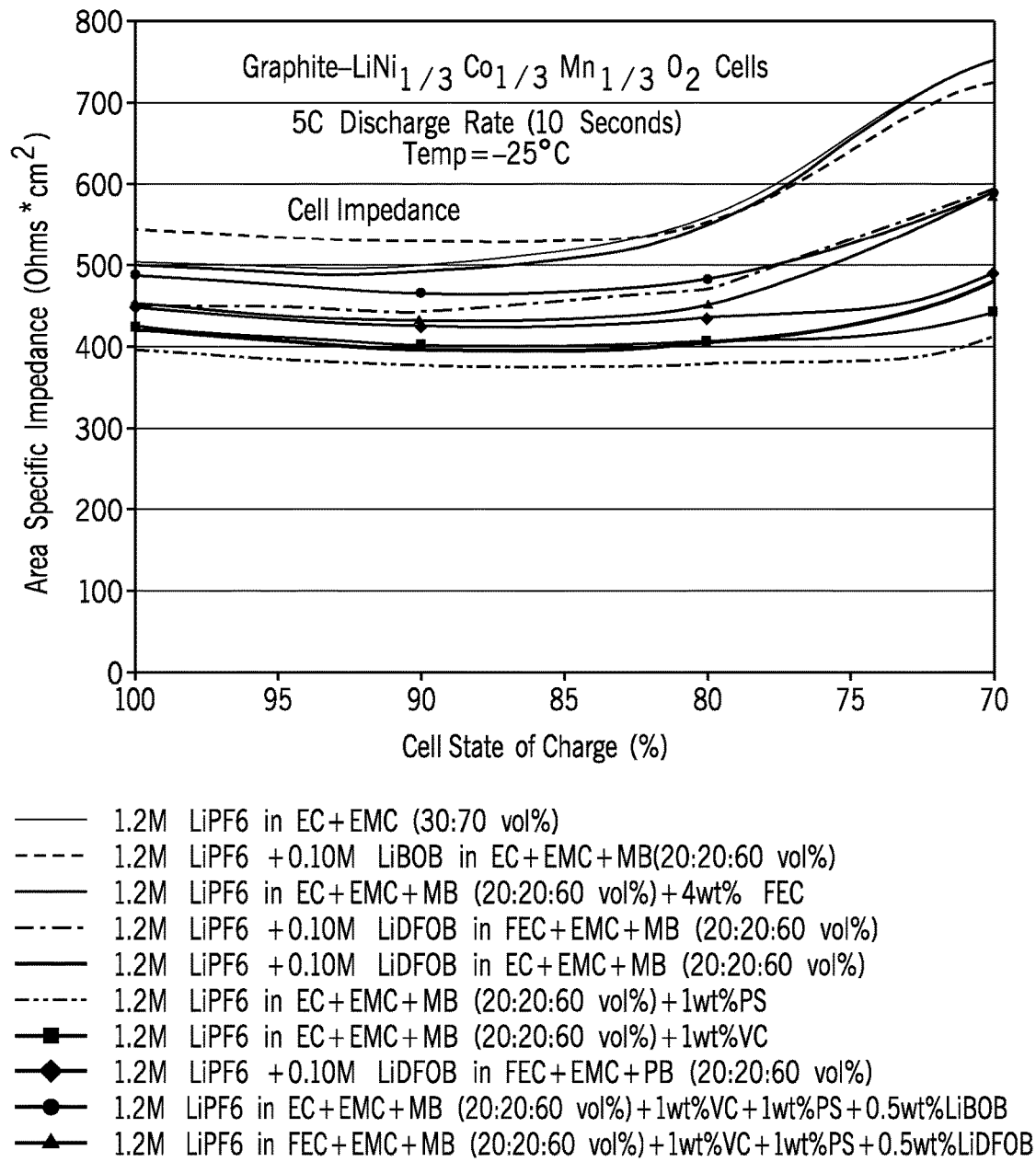
Figure 20:
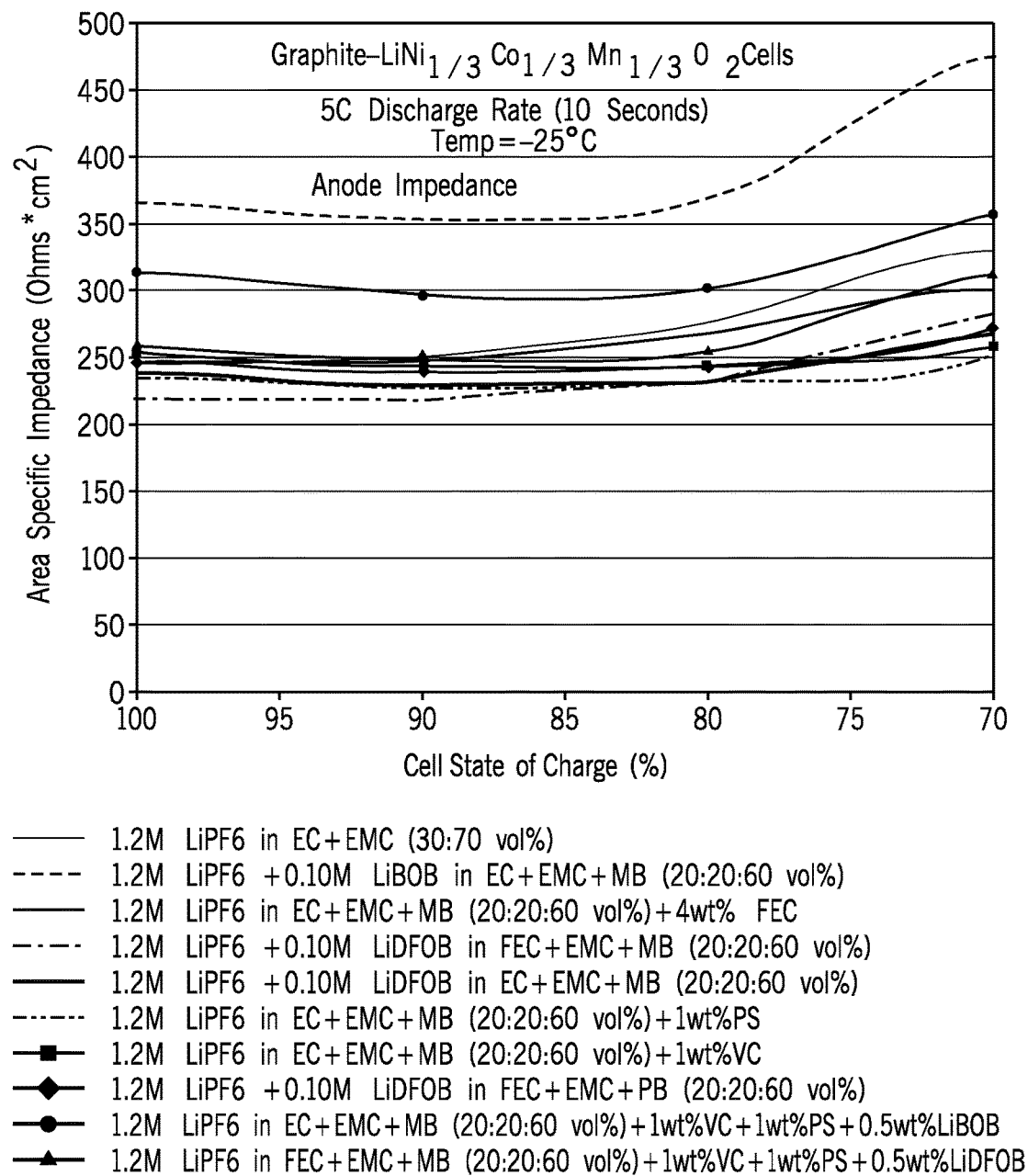
Figure 22:
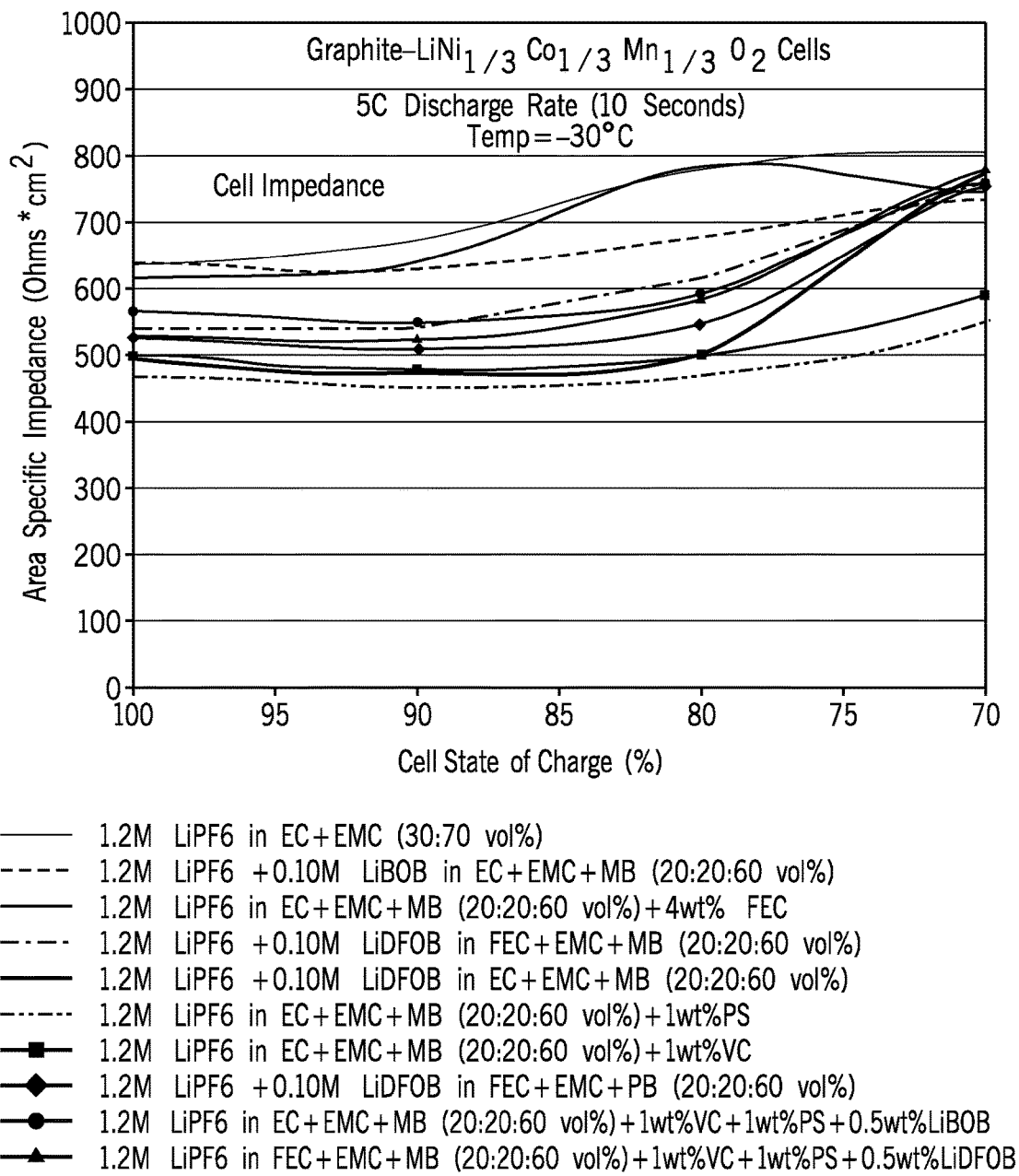
Figure 23:
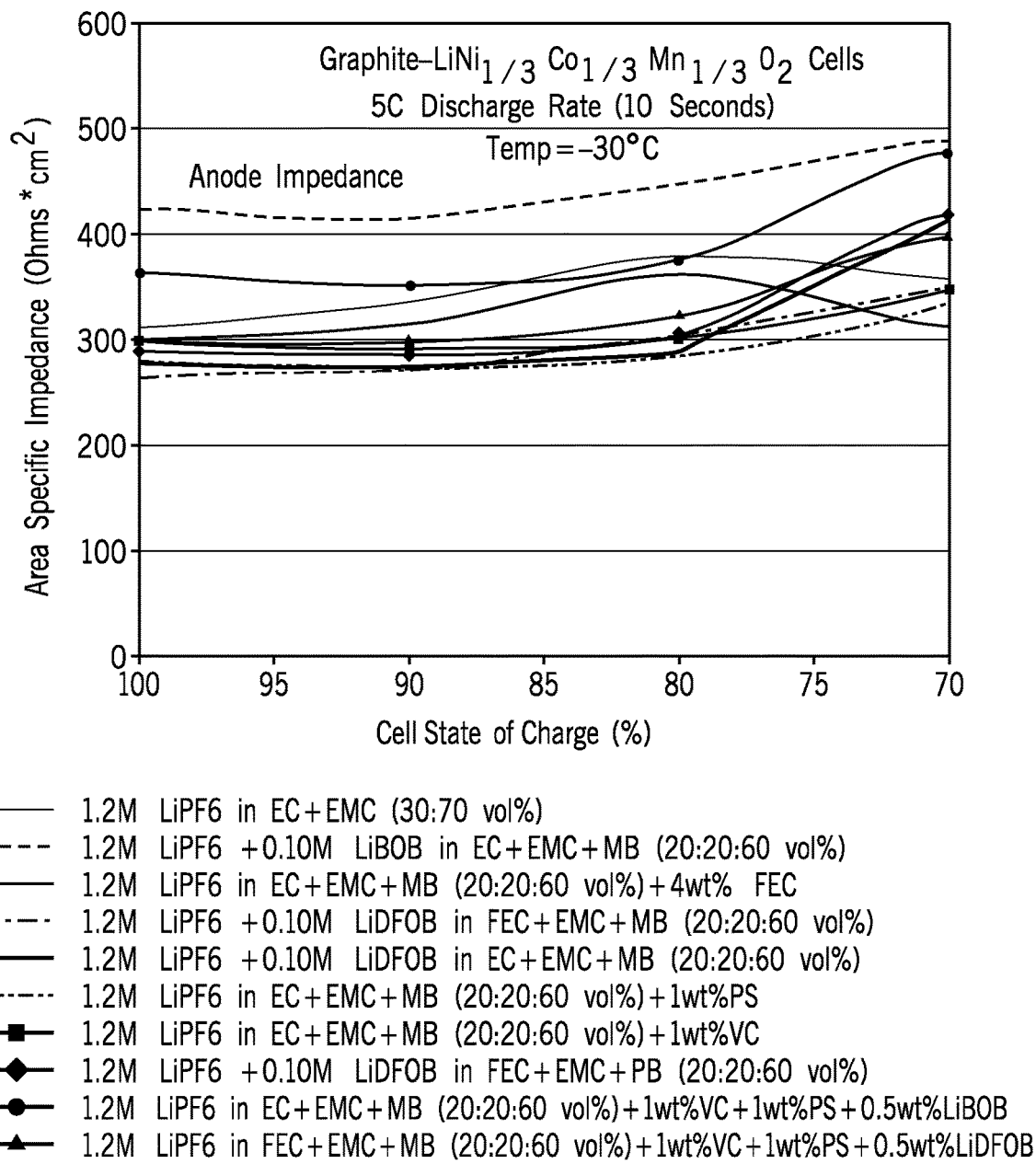
Figure 24:
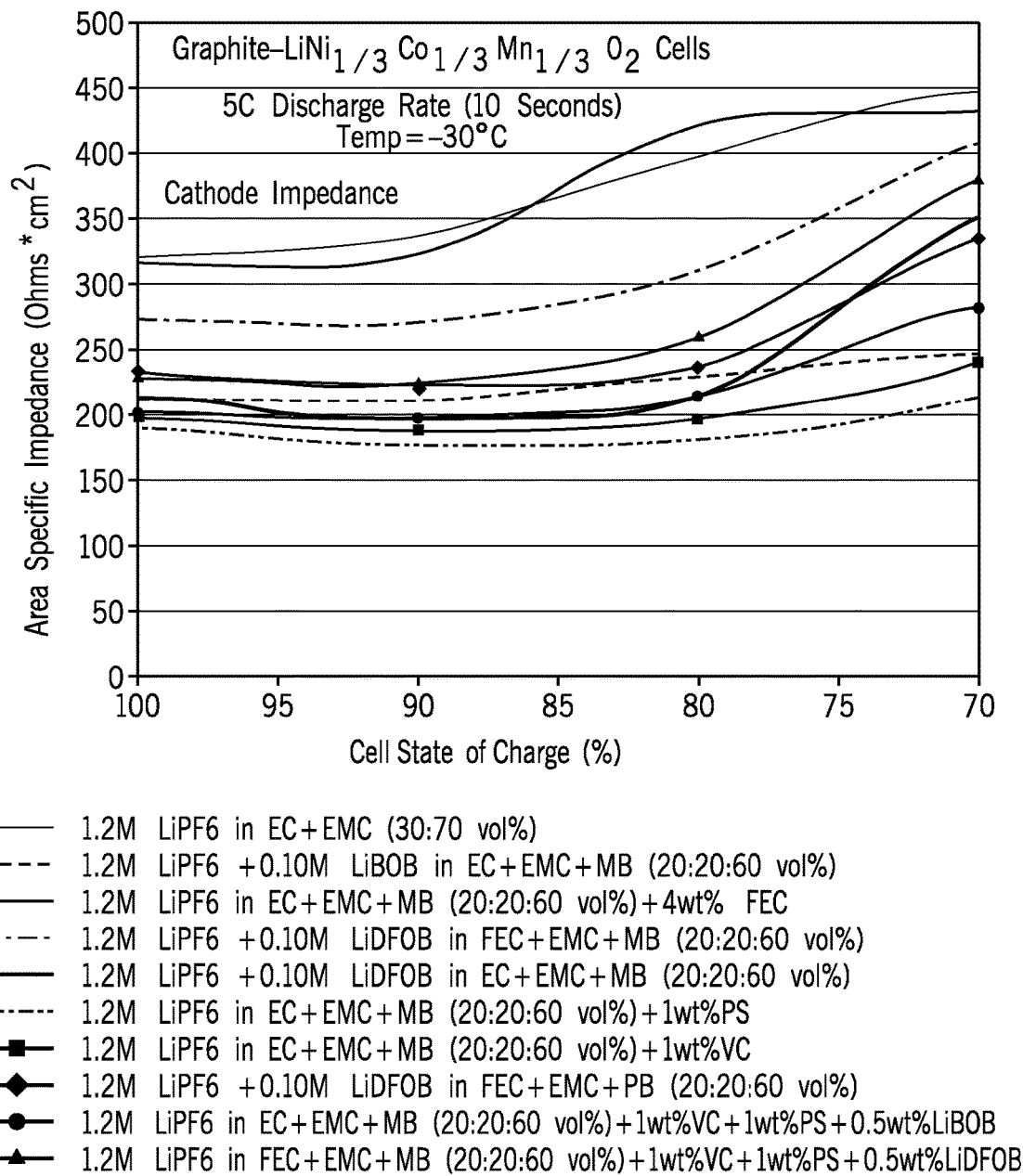
Figure 25:
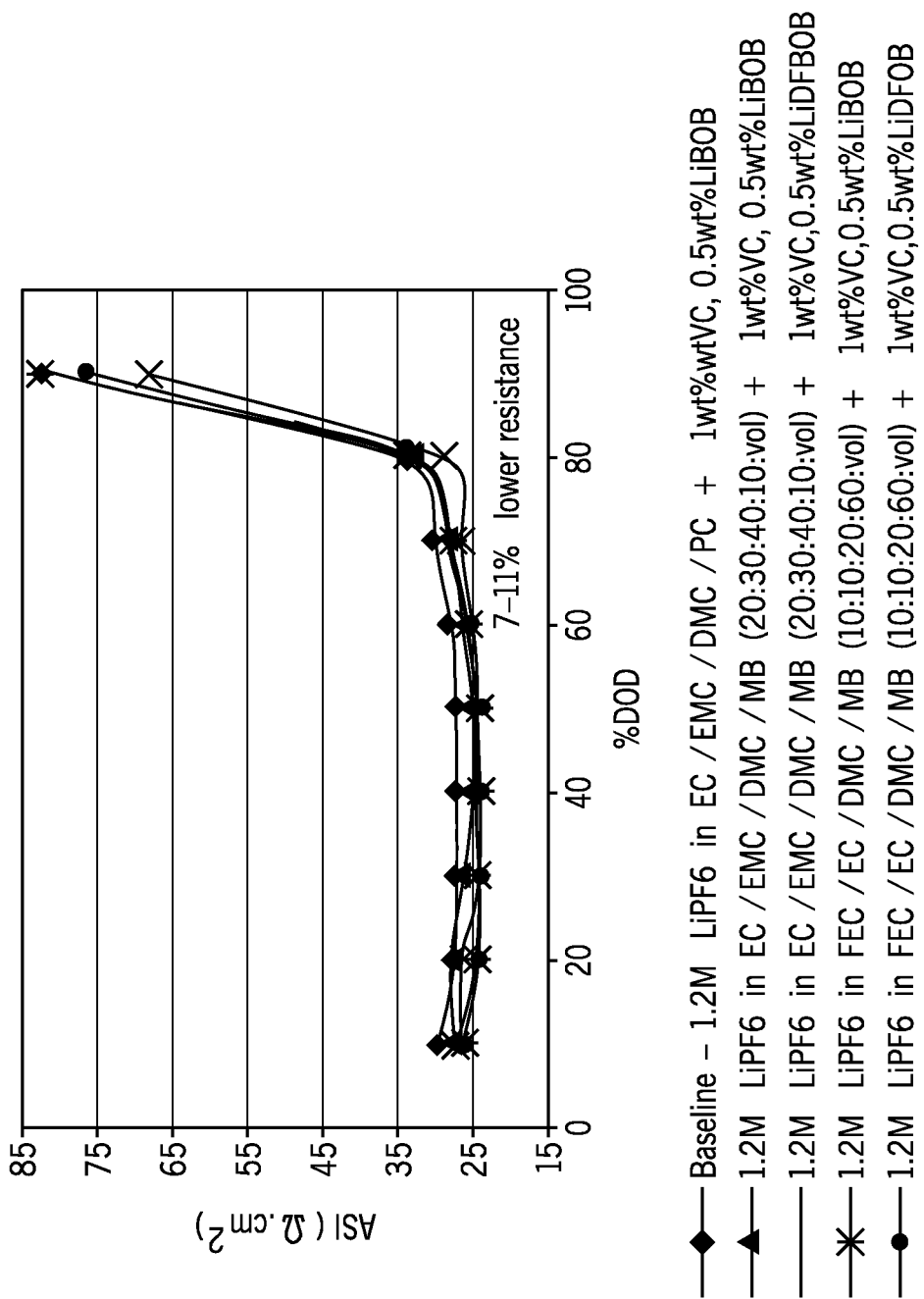
Figure 26:
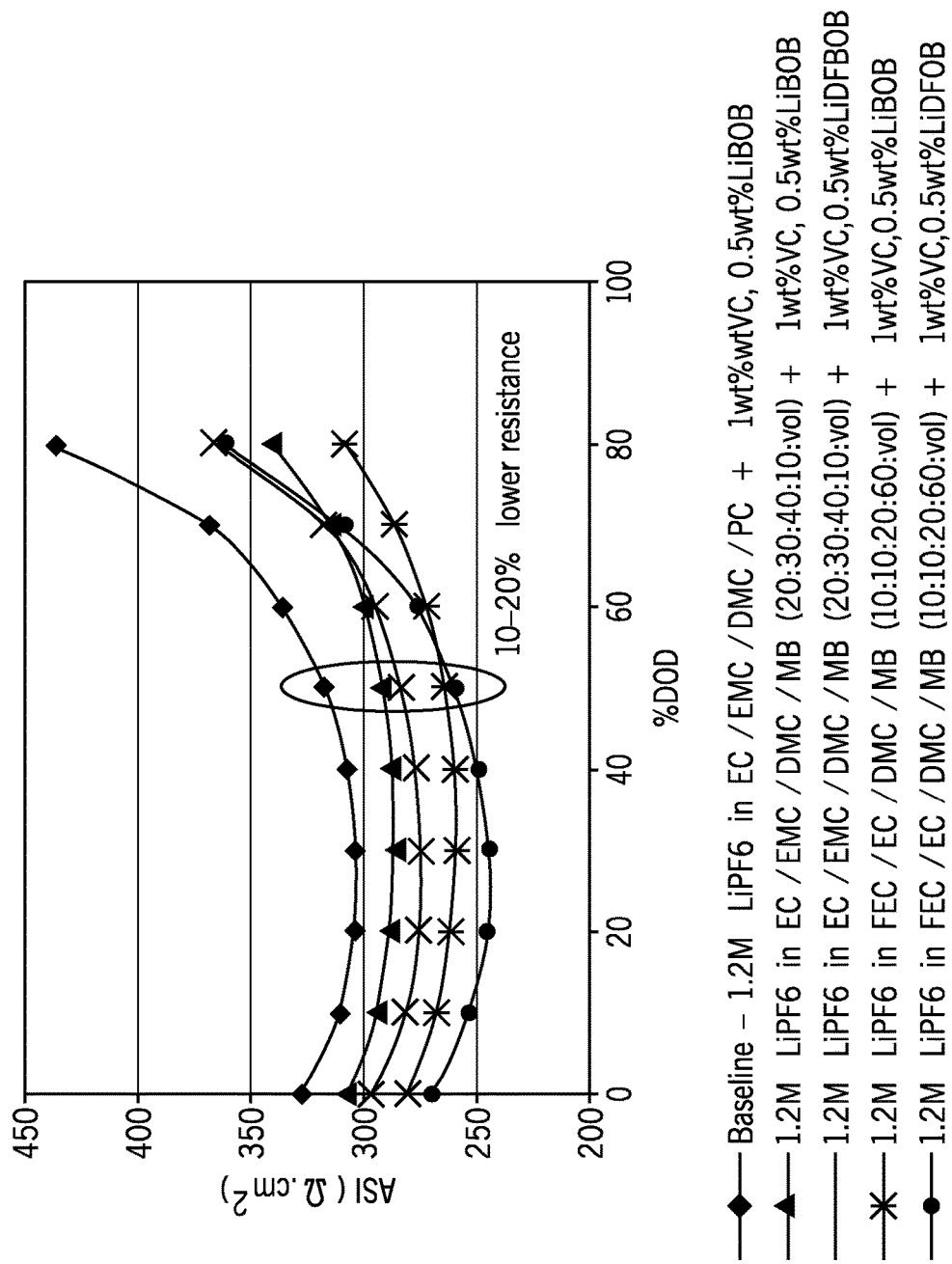
Figure 27:
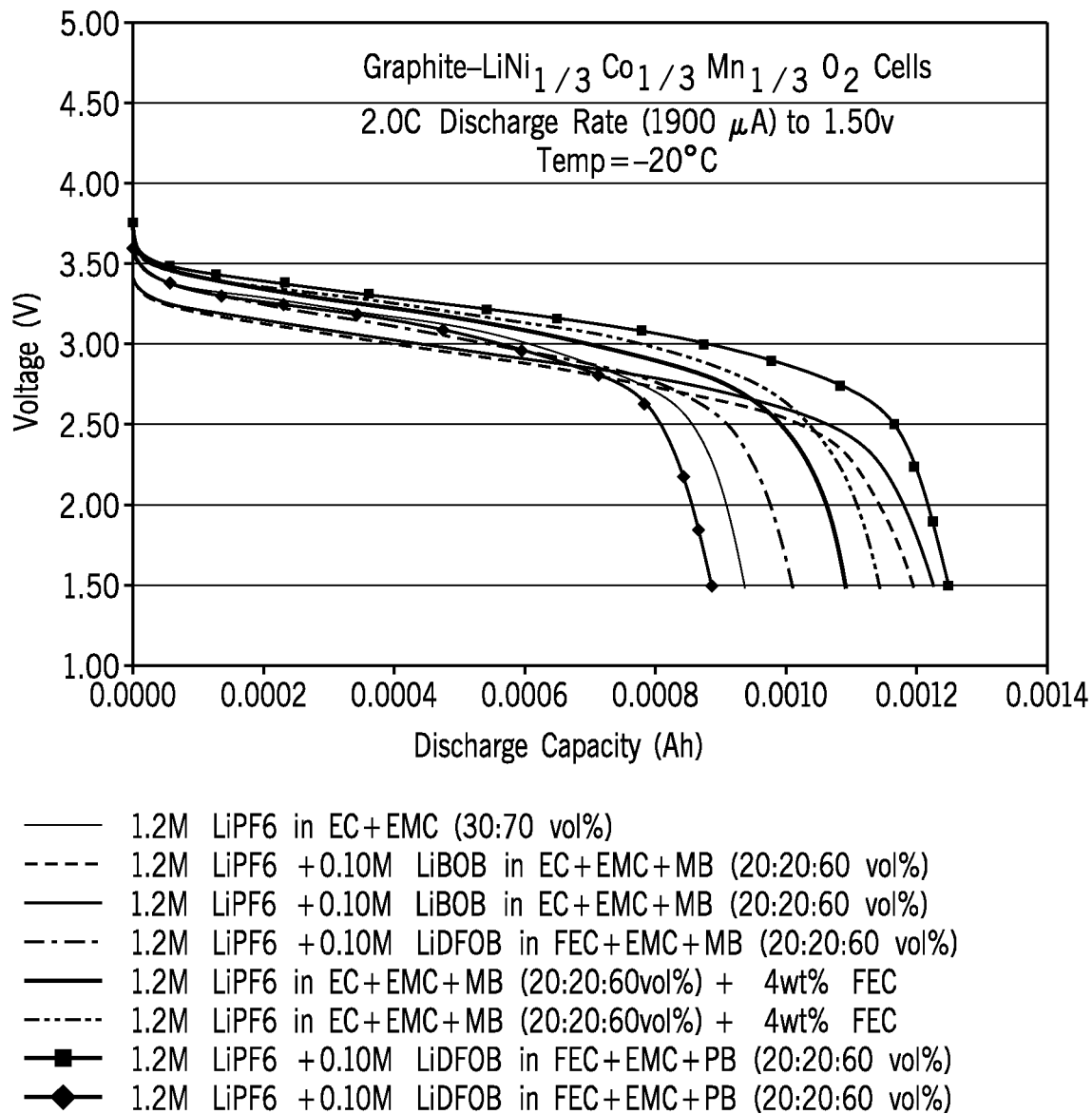
Figure 28:
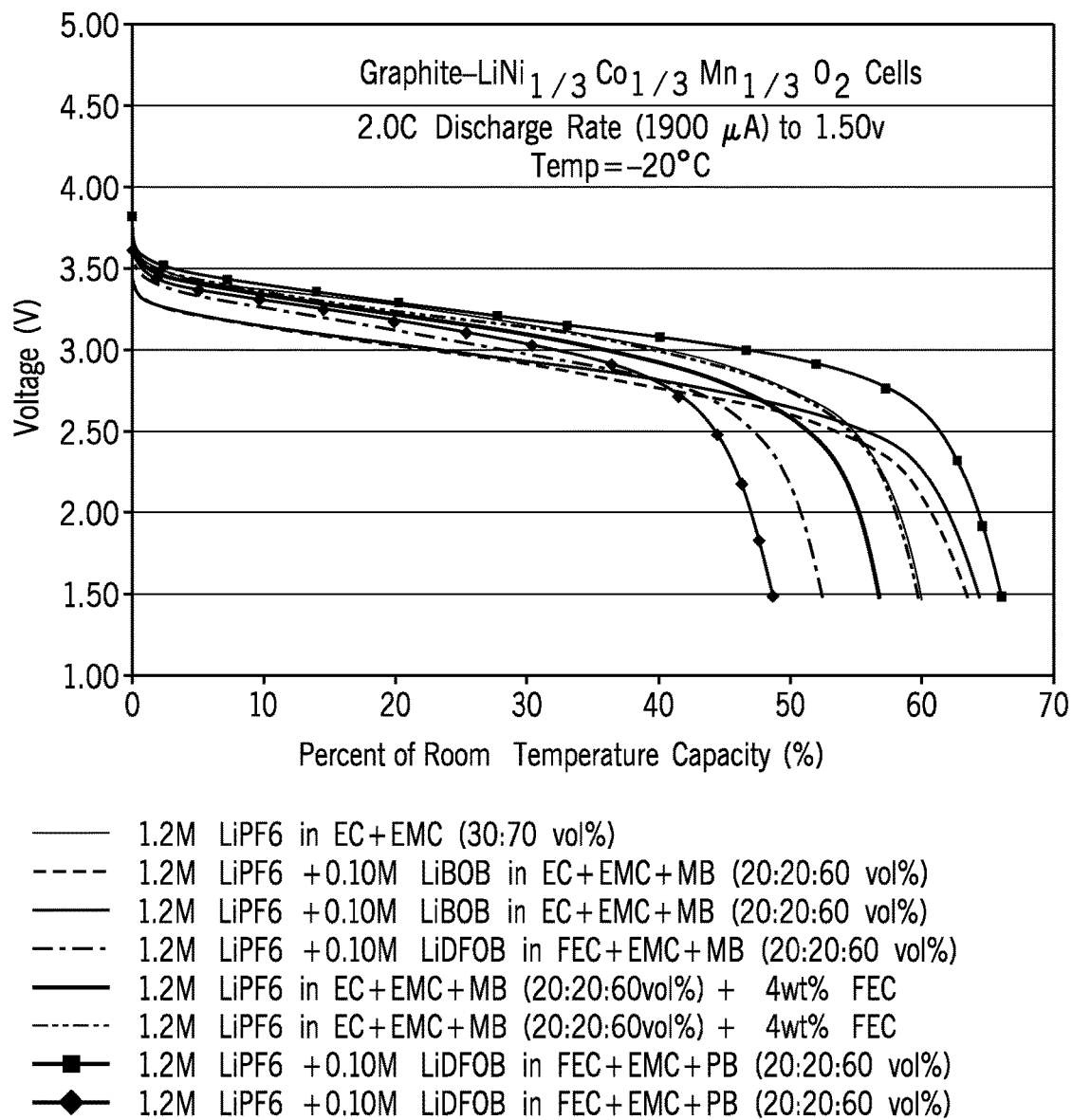
Figure 29:
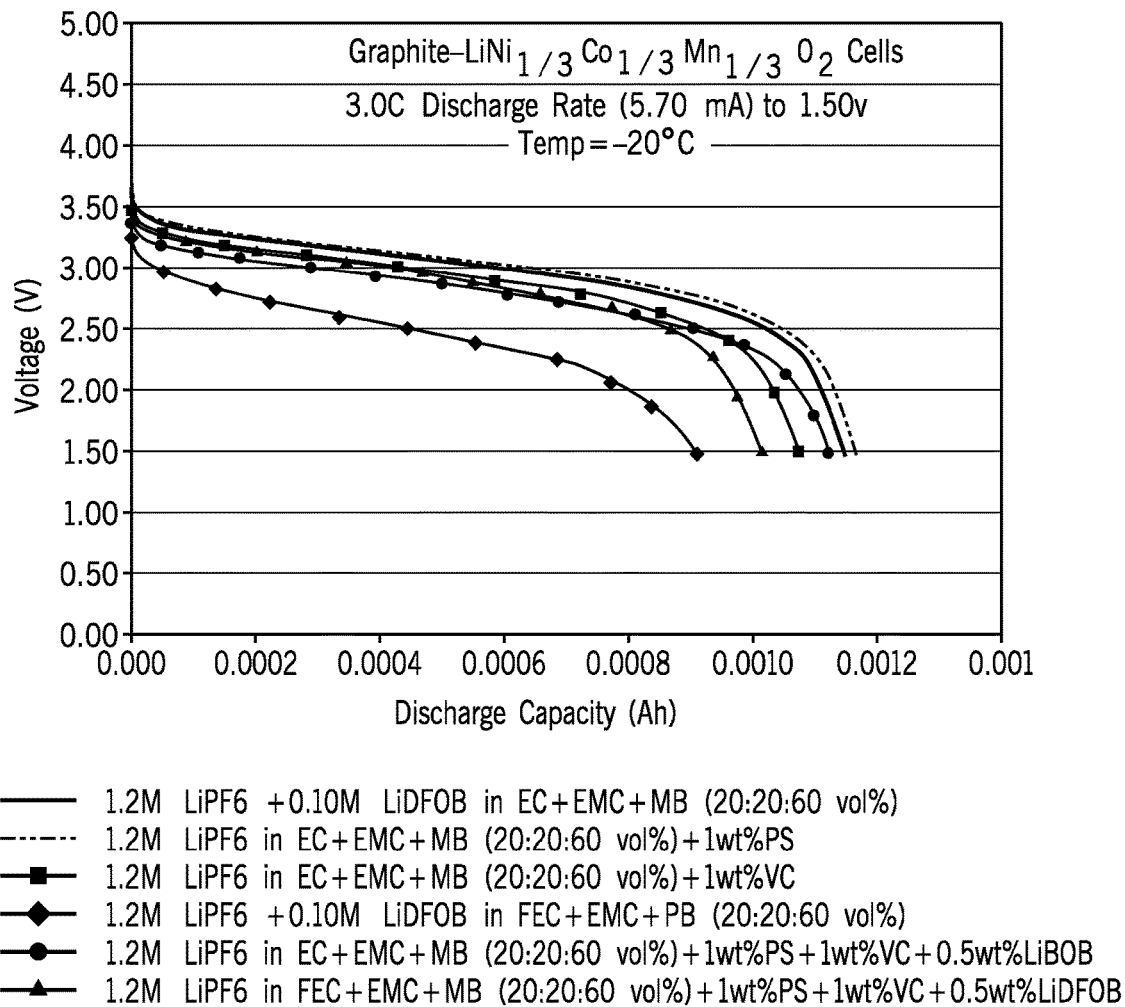
Figure 30:
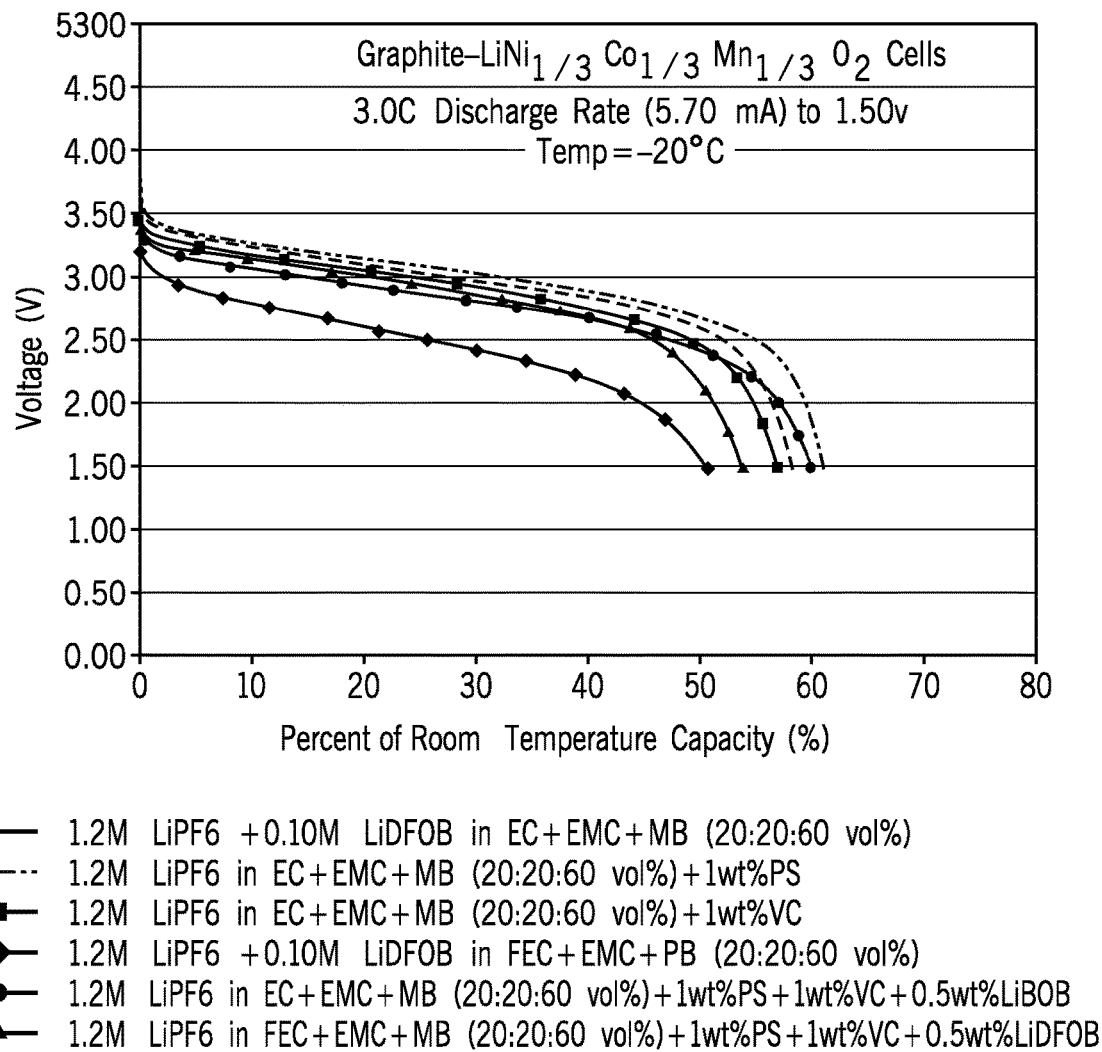
Figure 31:
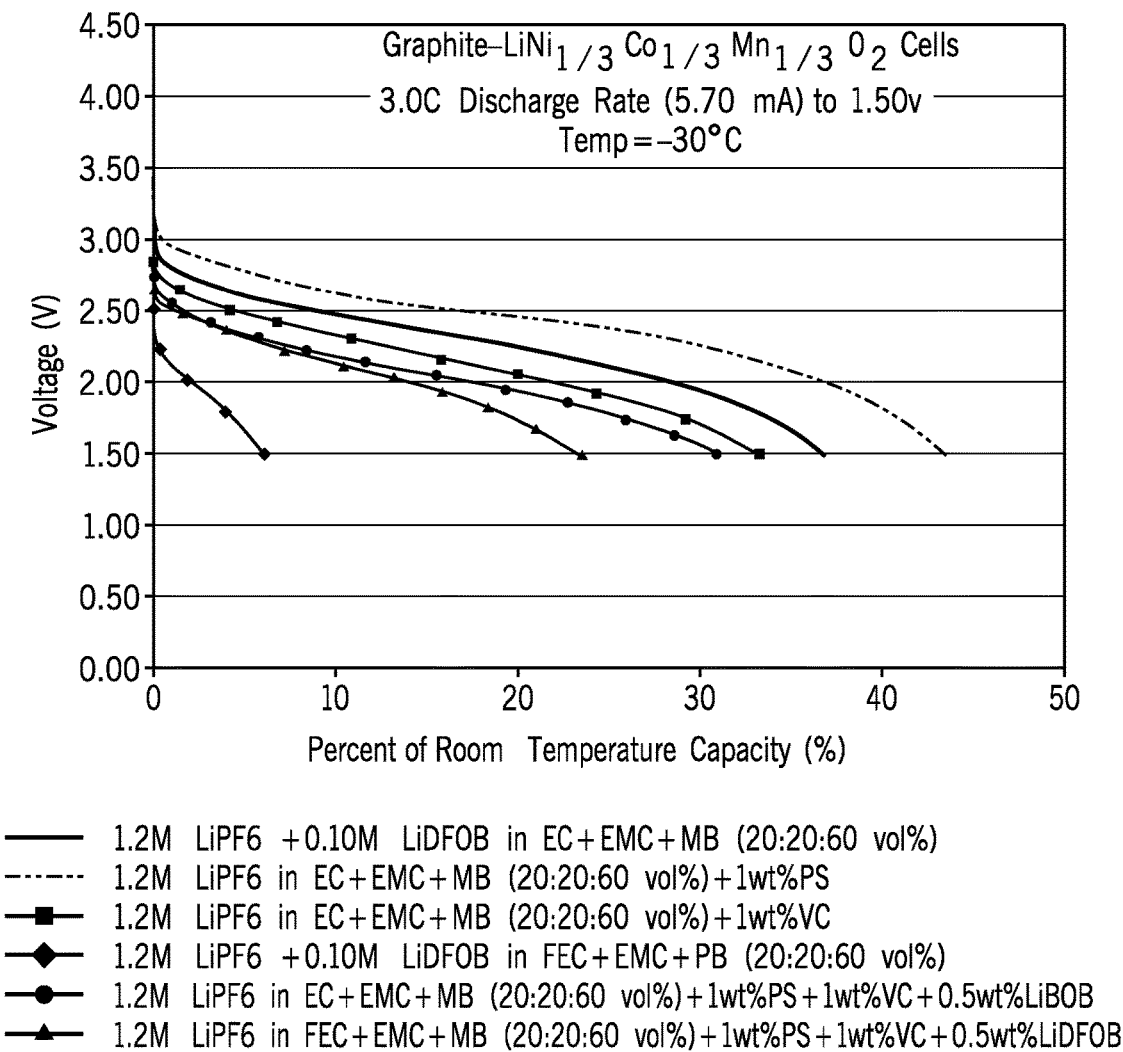
Figure 32:
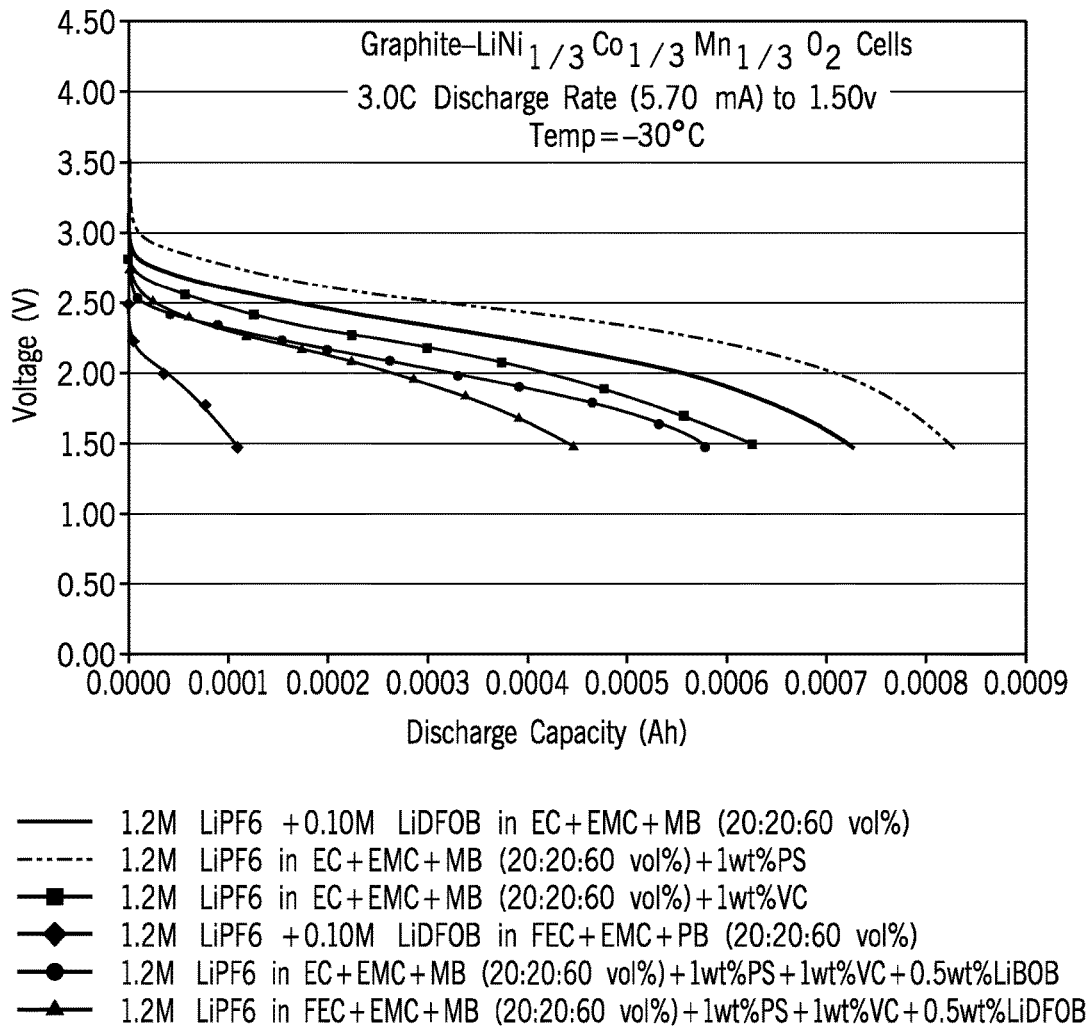
Figure 33:
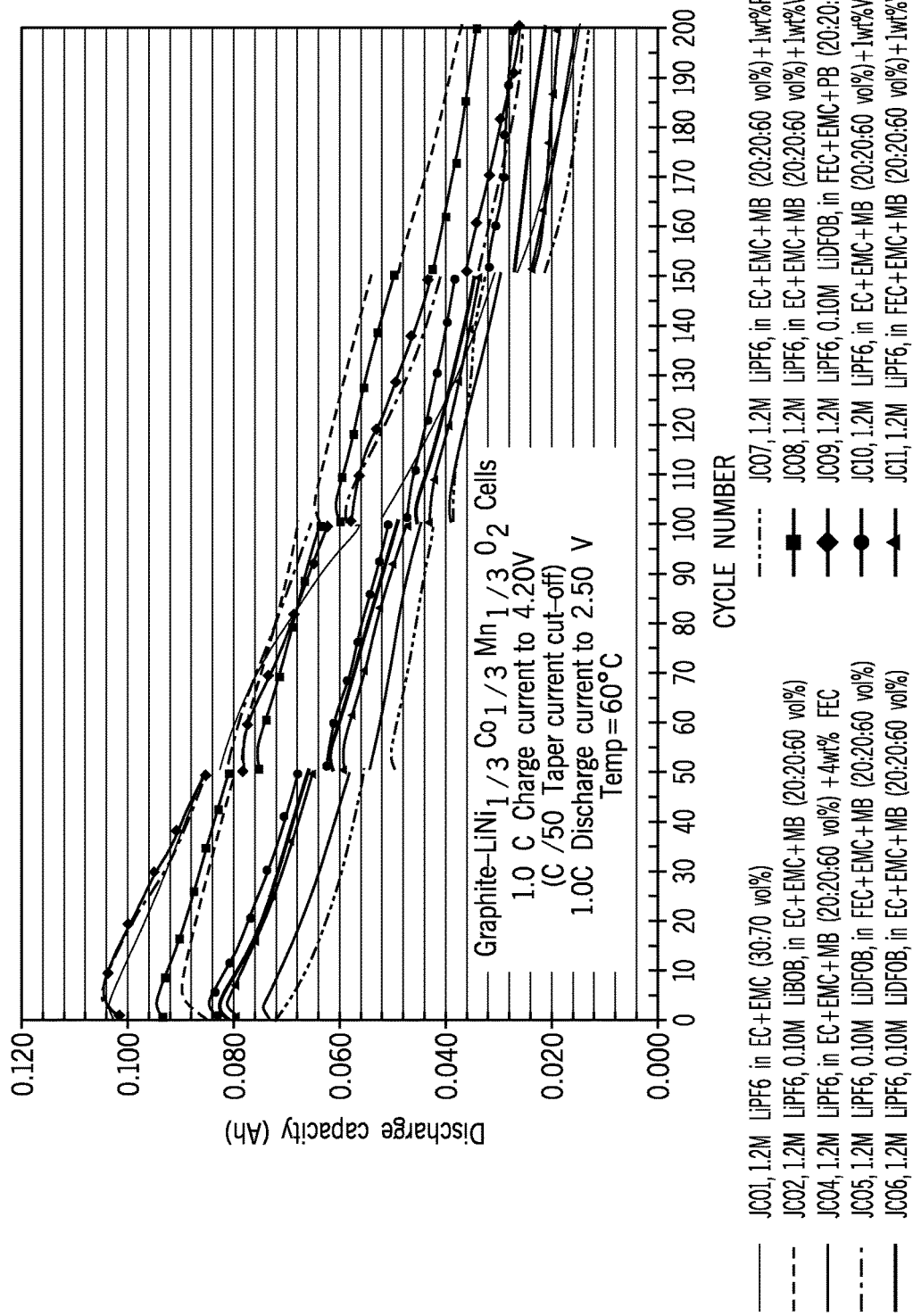
Figure 34:
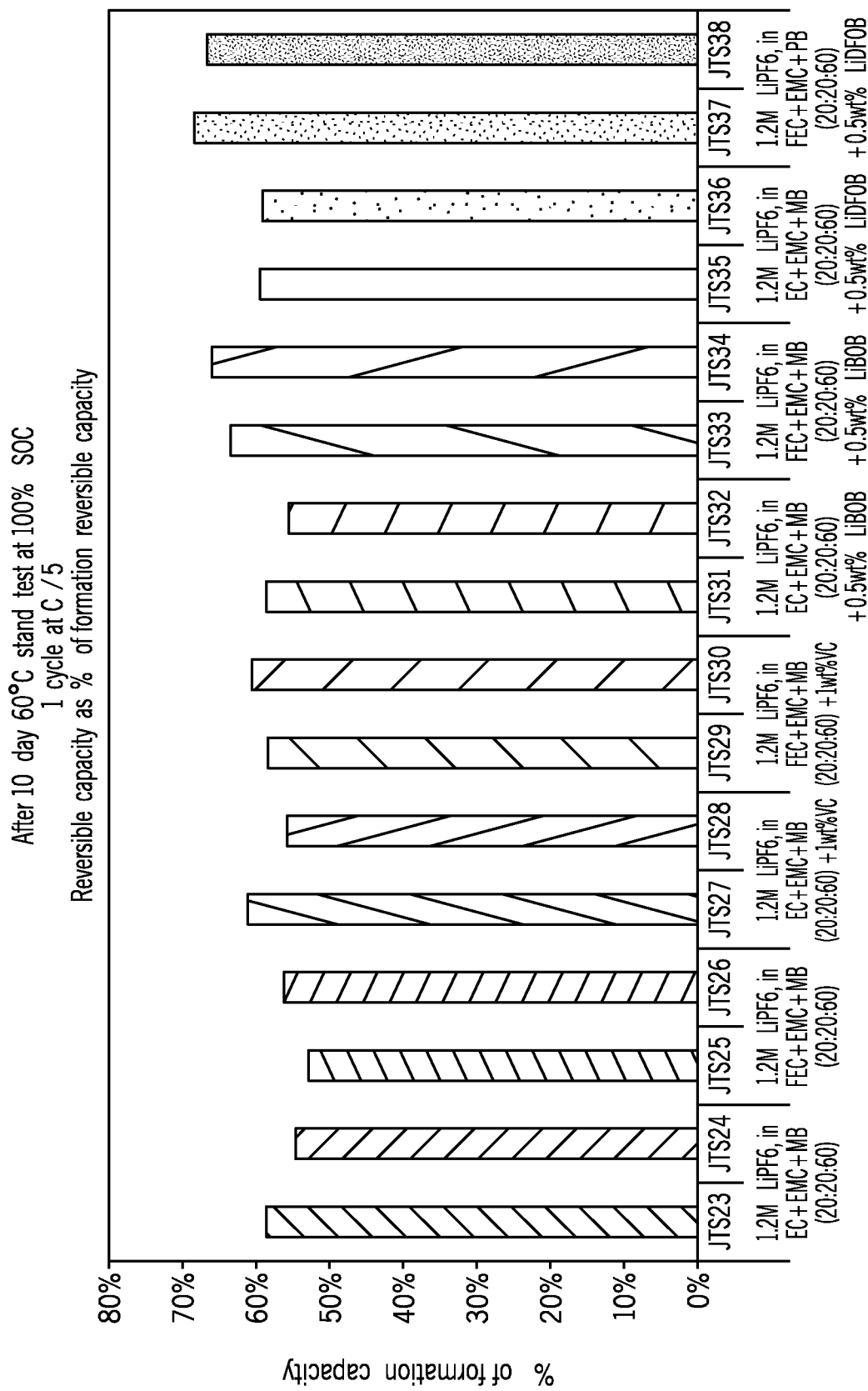
Figure 35:
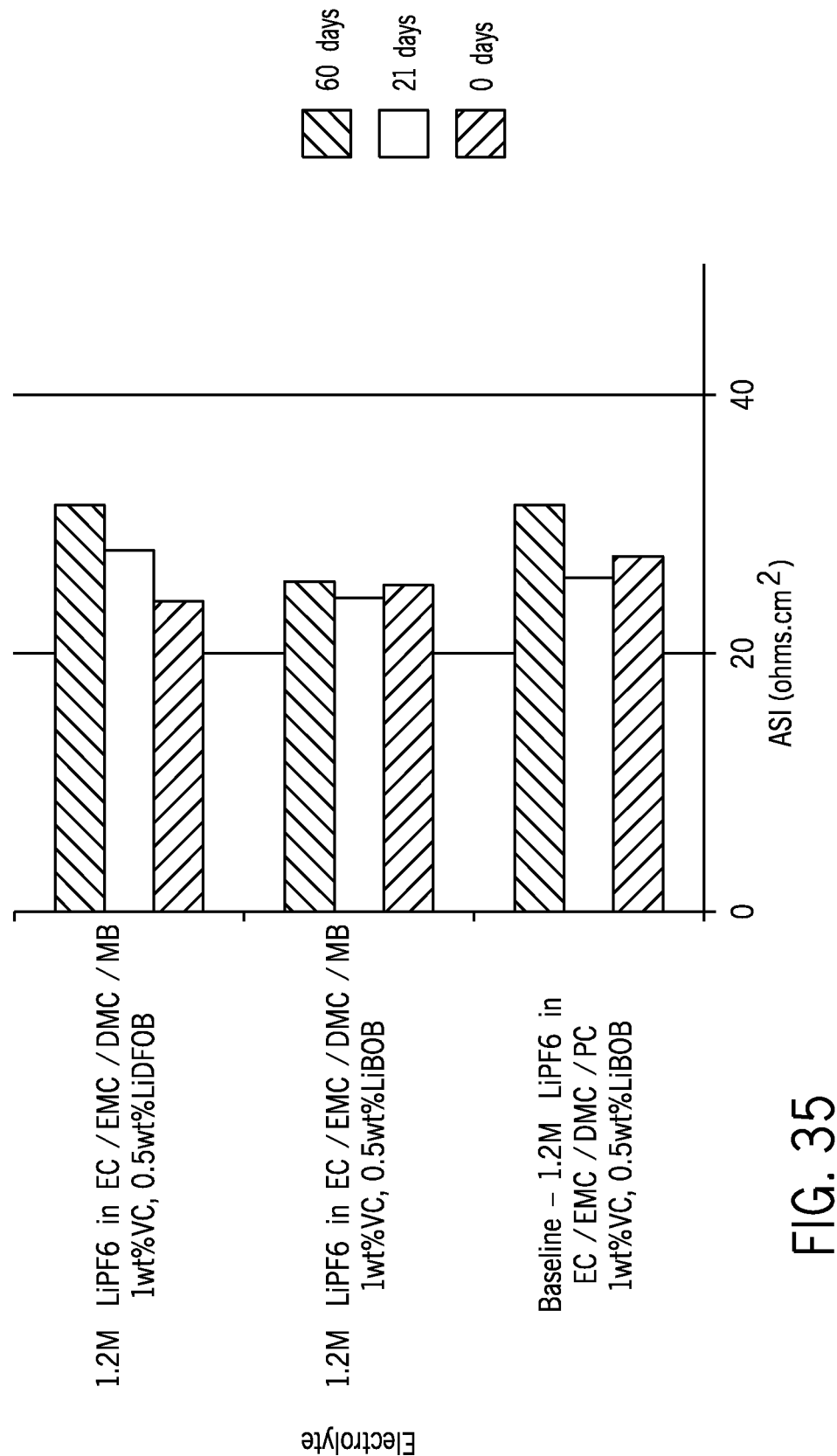
Figure 36:
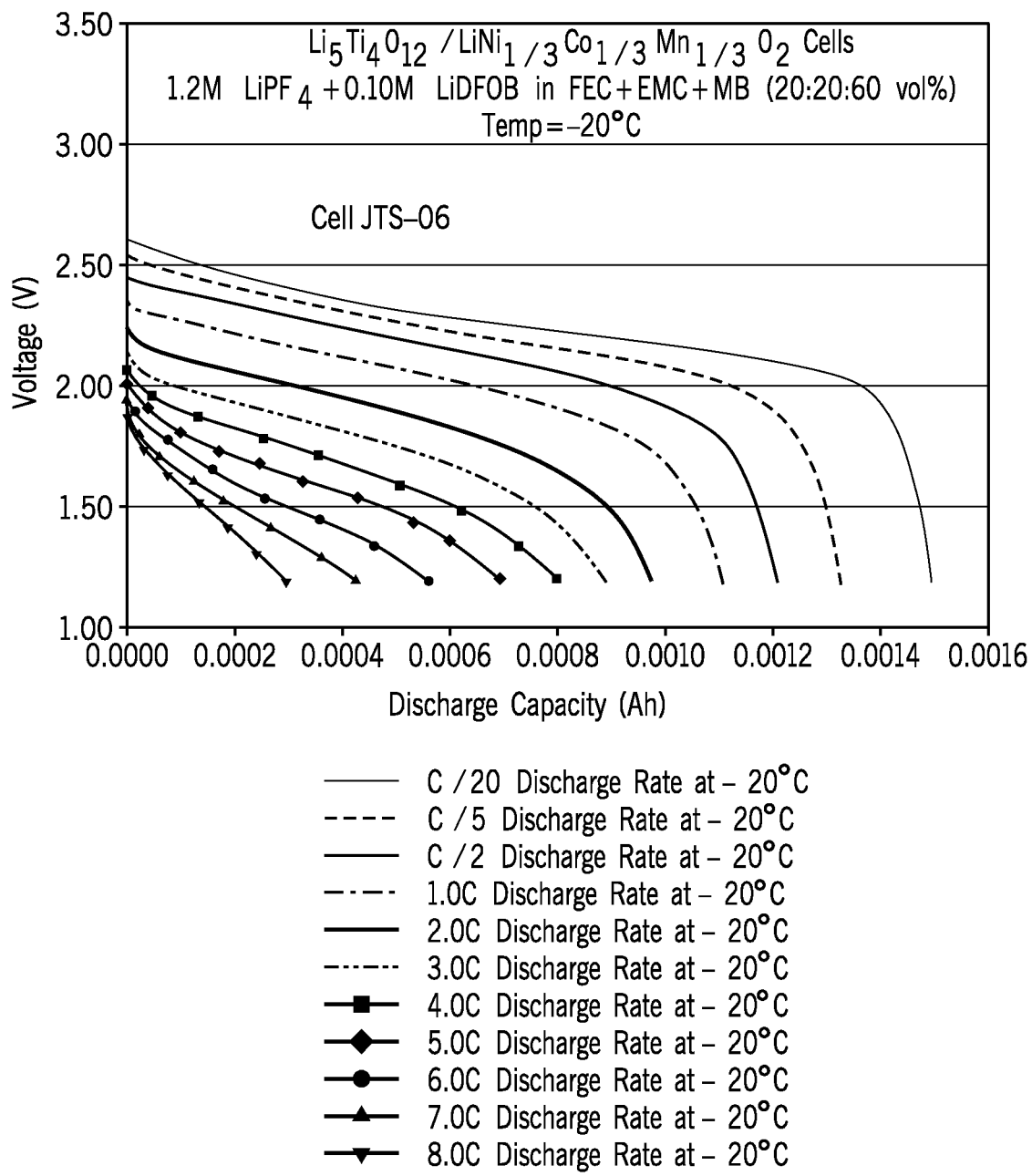
Figure 37:
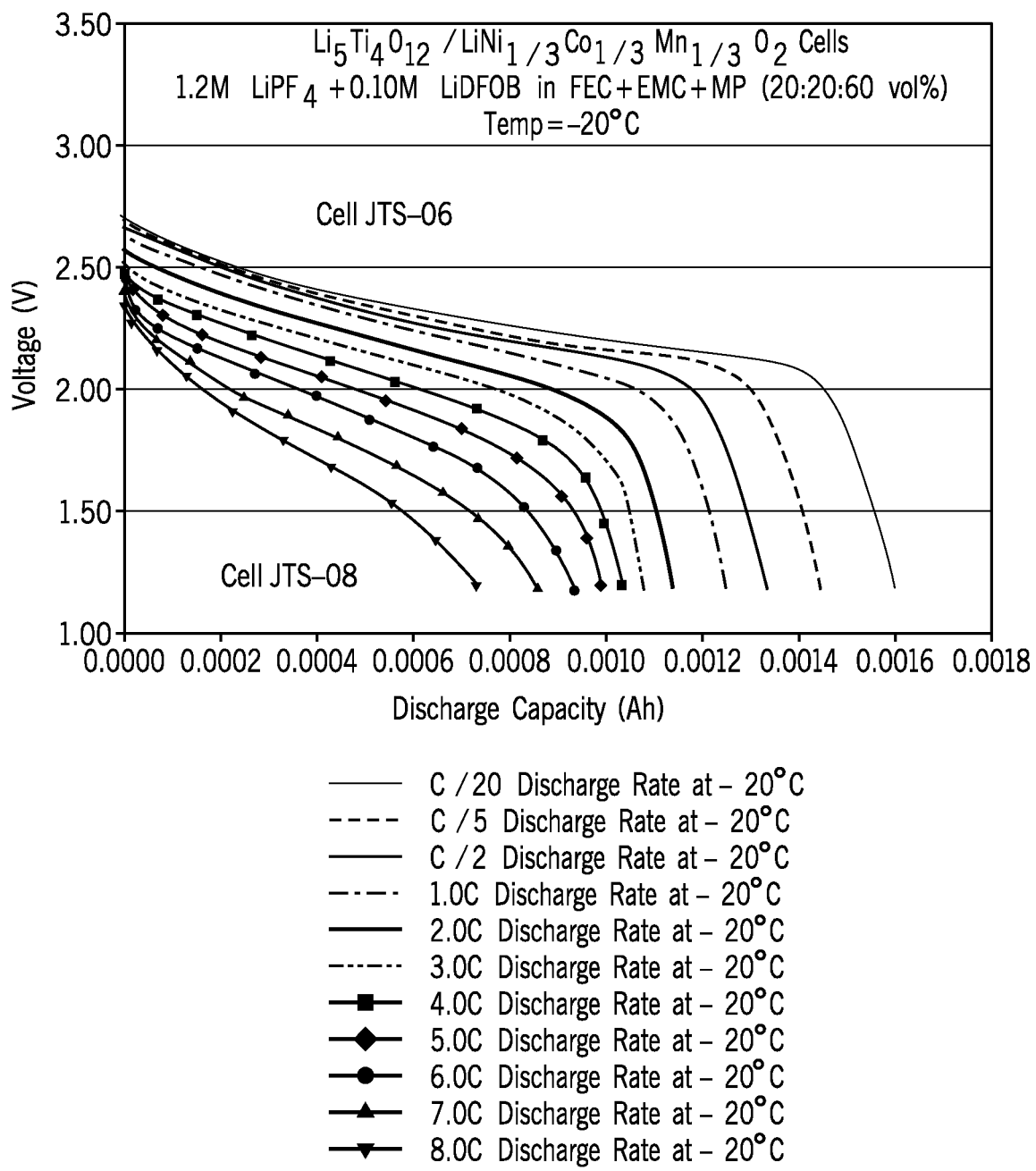
Figure 38:
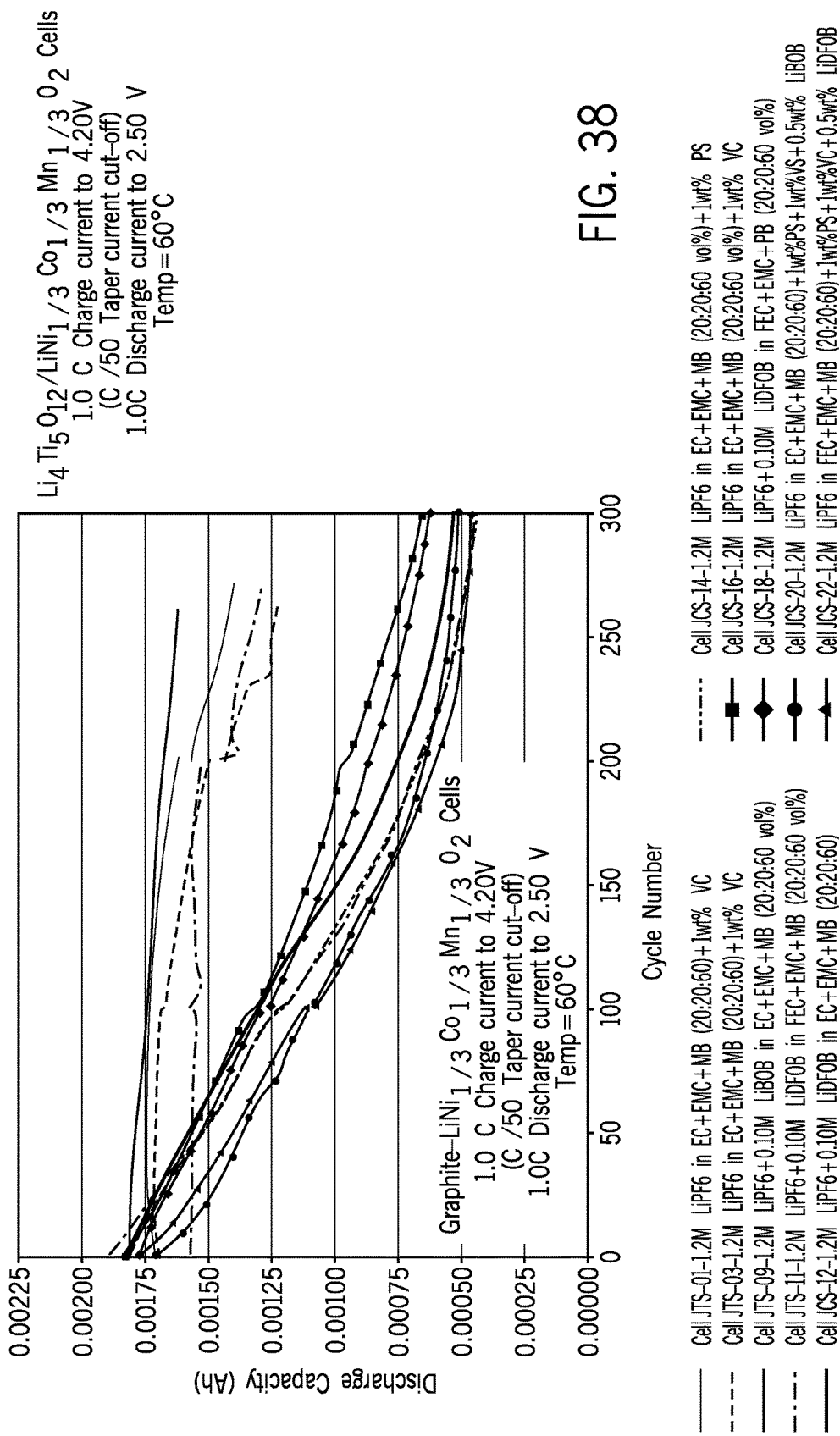
Figure 39:
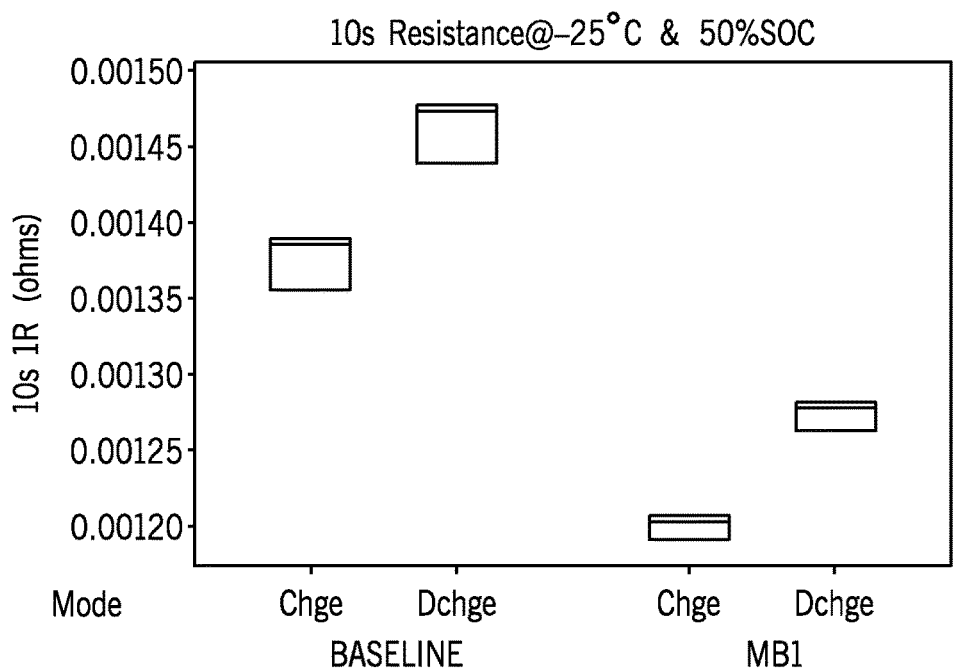
Figure 40:
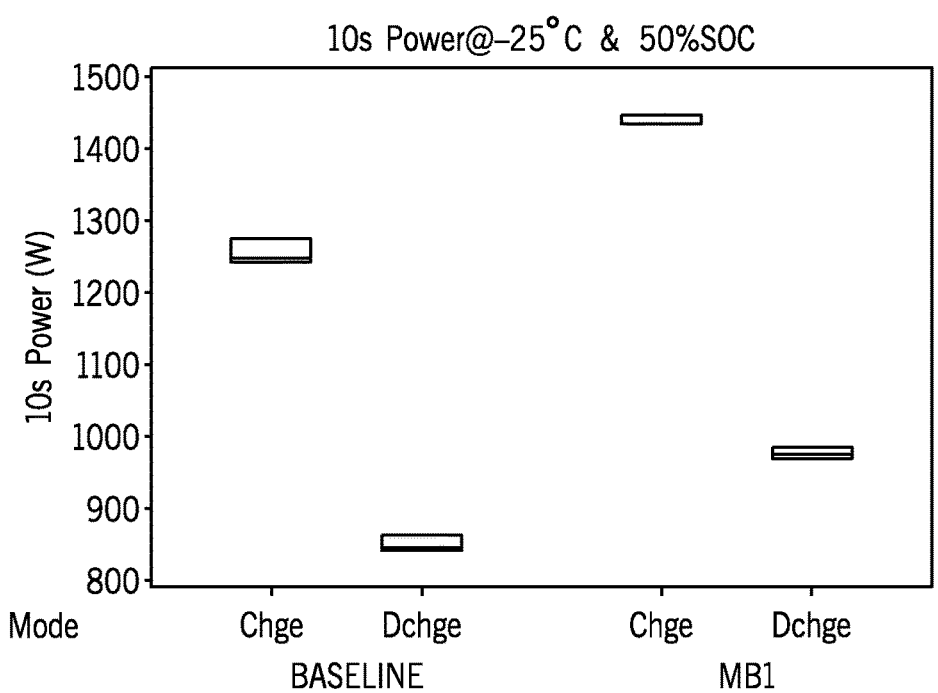
Figure 41:
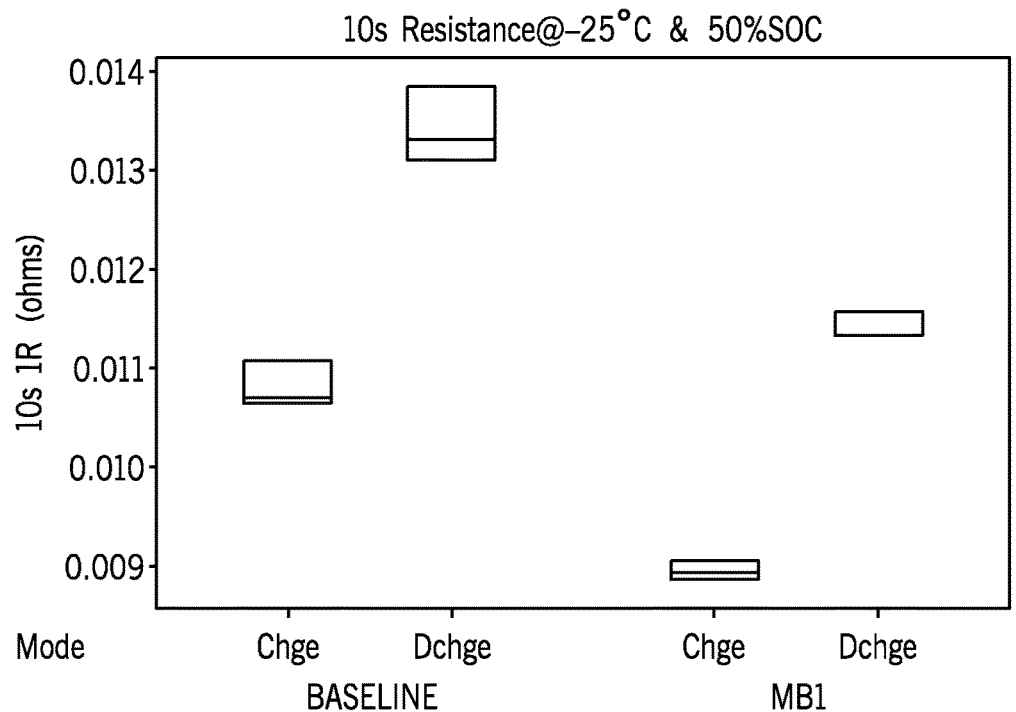
Figure 42:
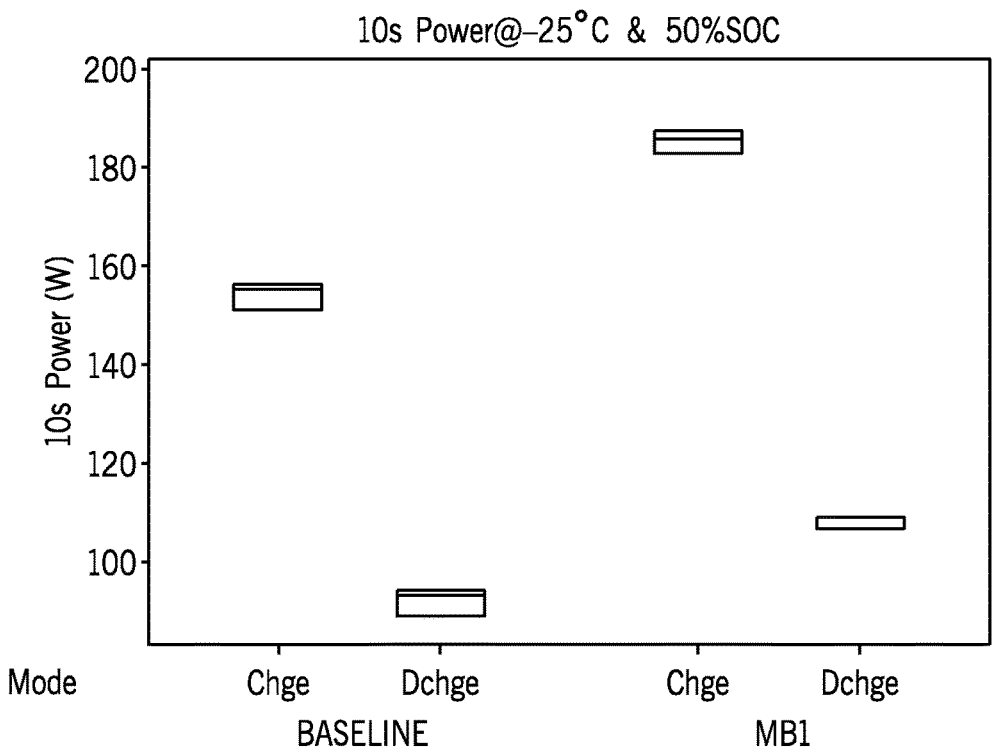
Figure 43:
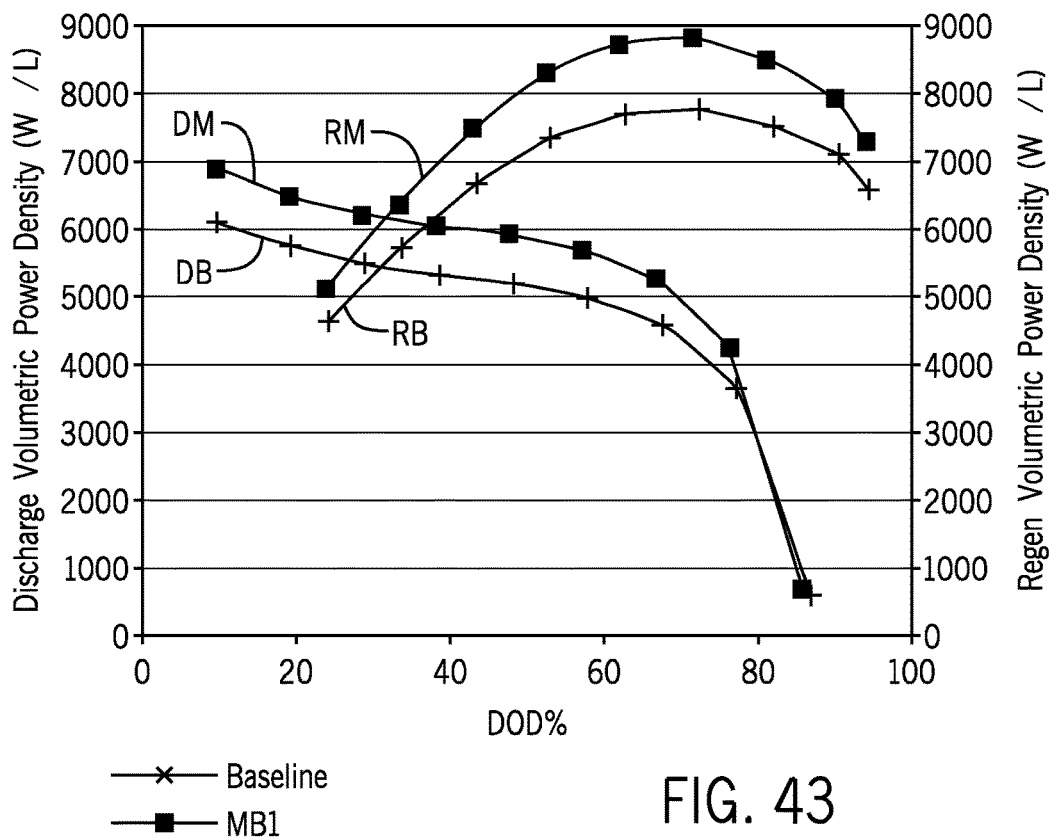
Figure 44:
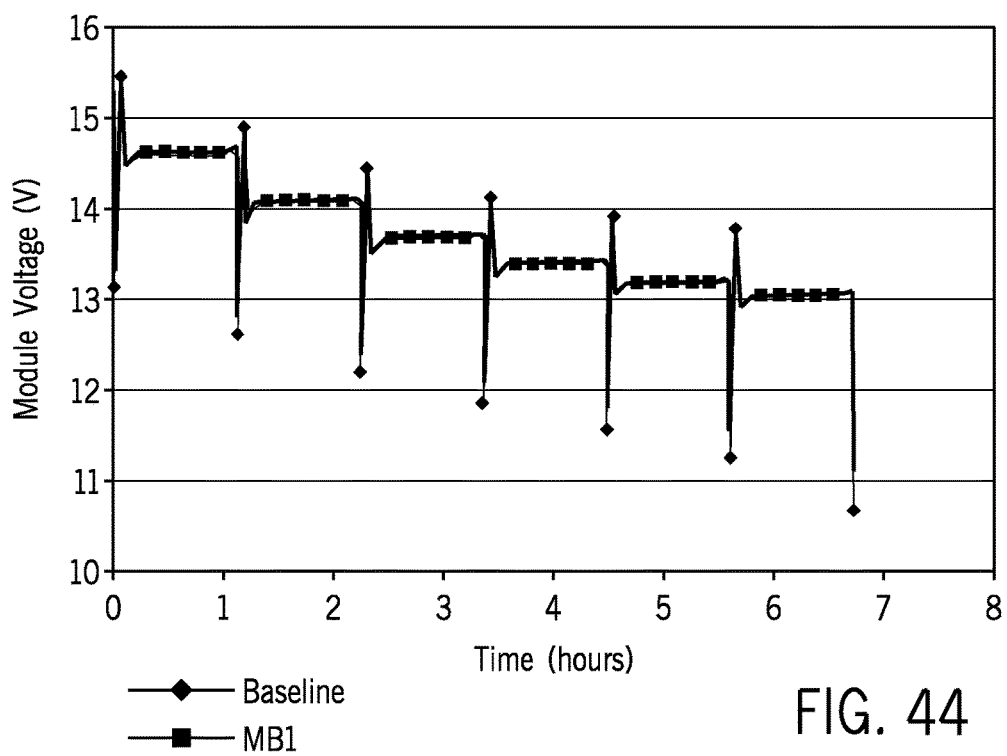
Figure 45:
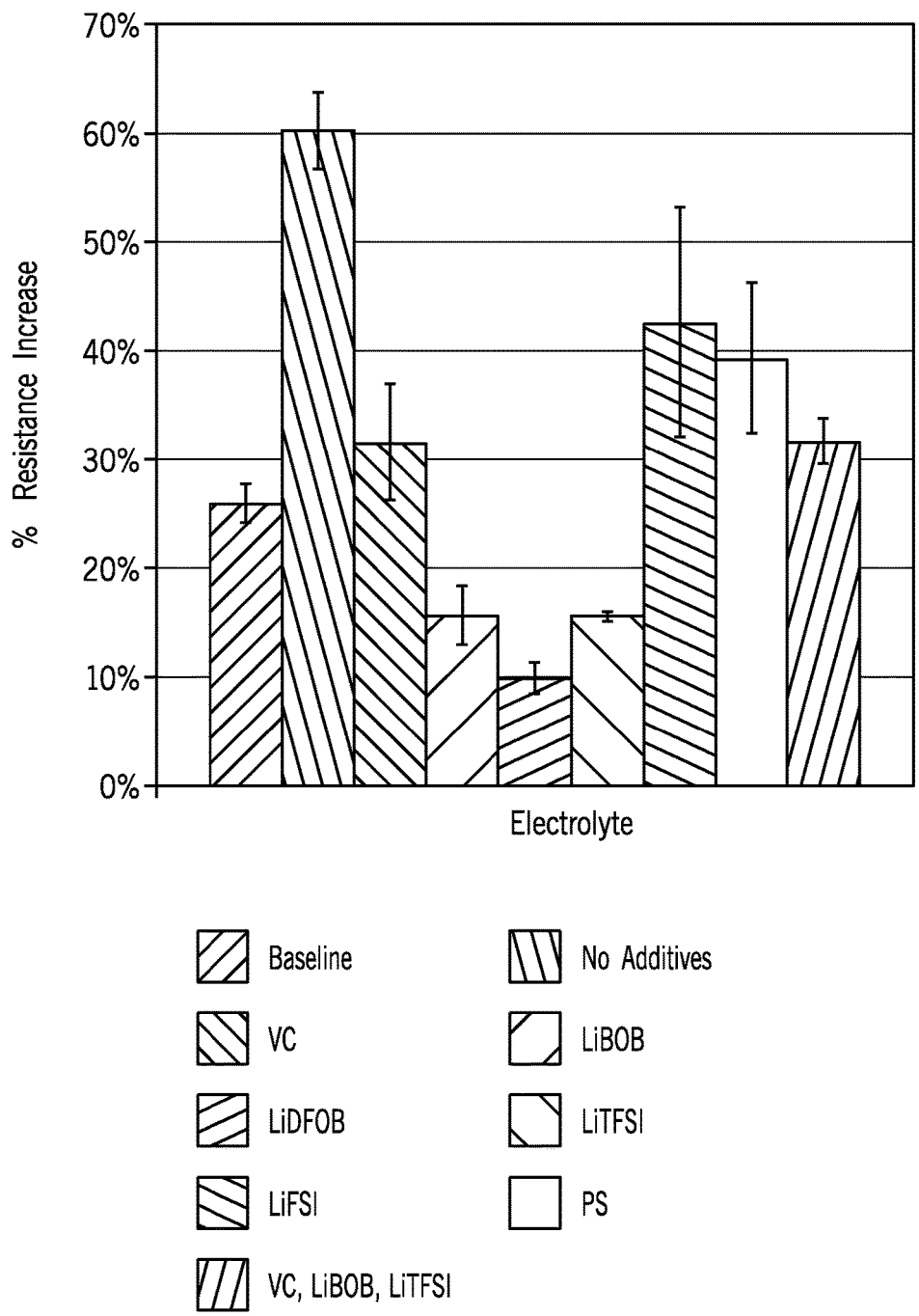
Figure 7:
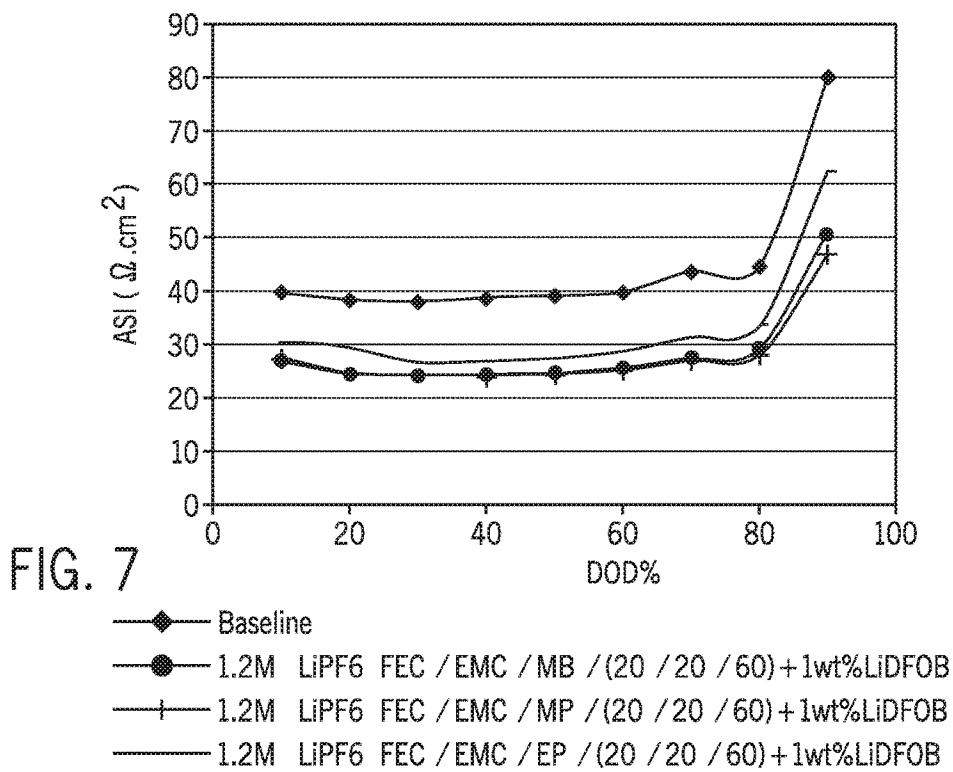
Figure 8:
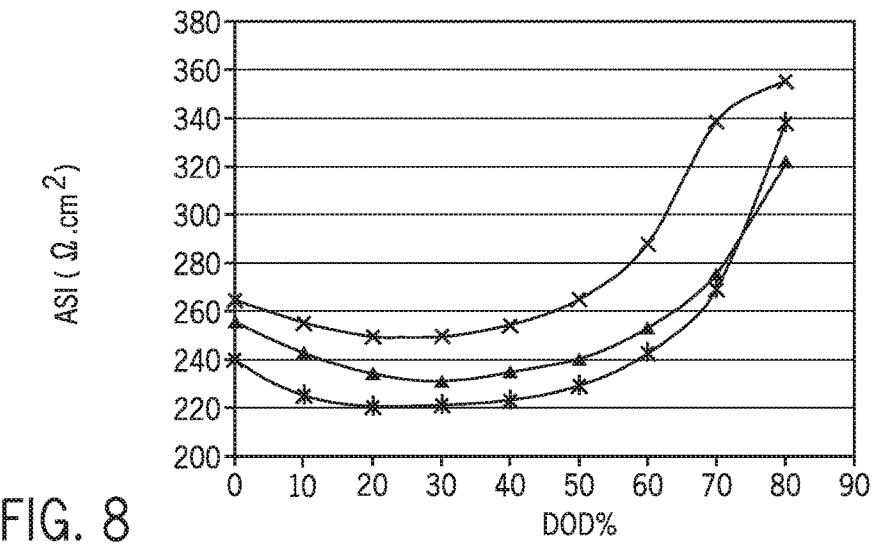
Figure 11:
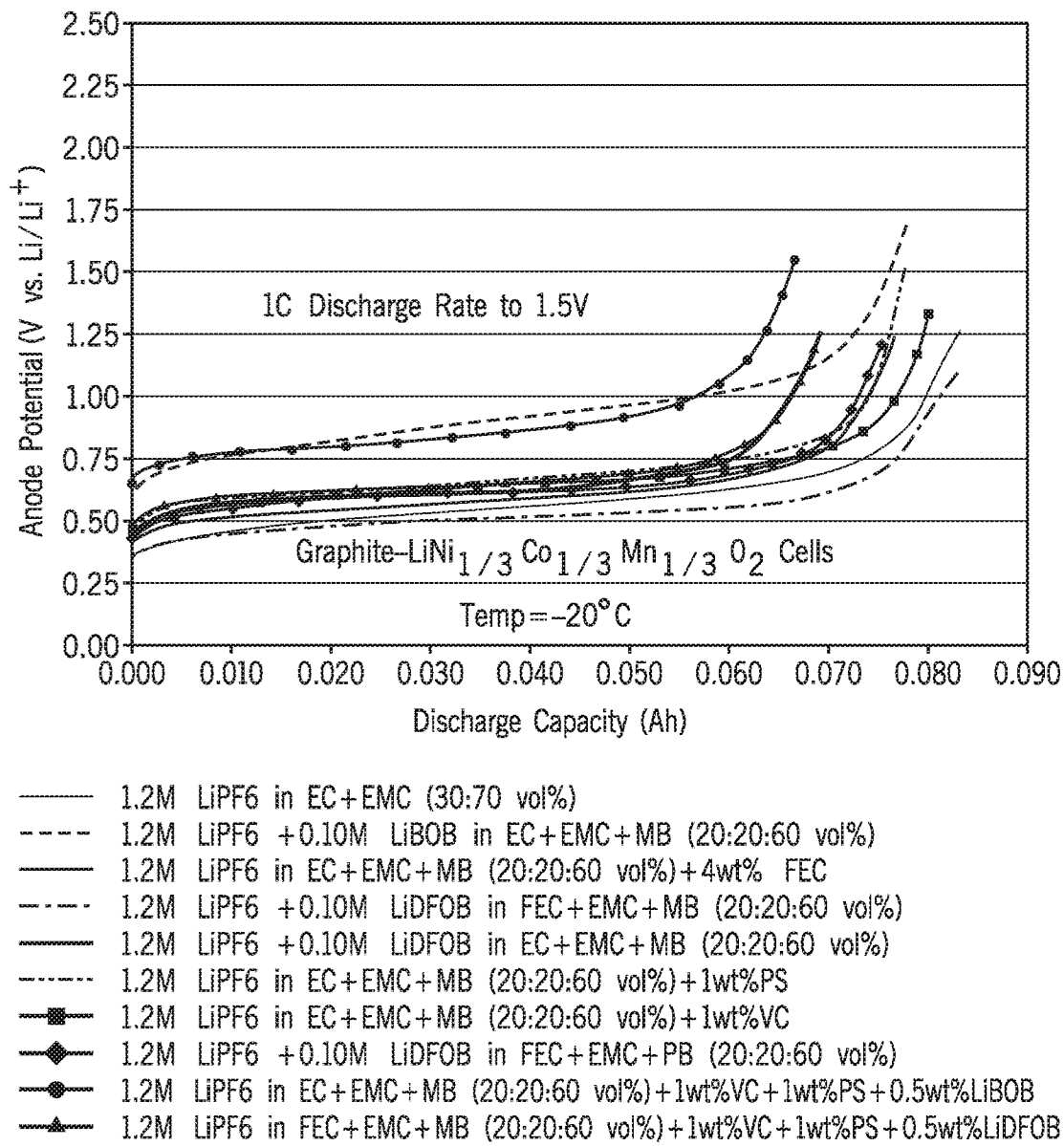
Figure 12:
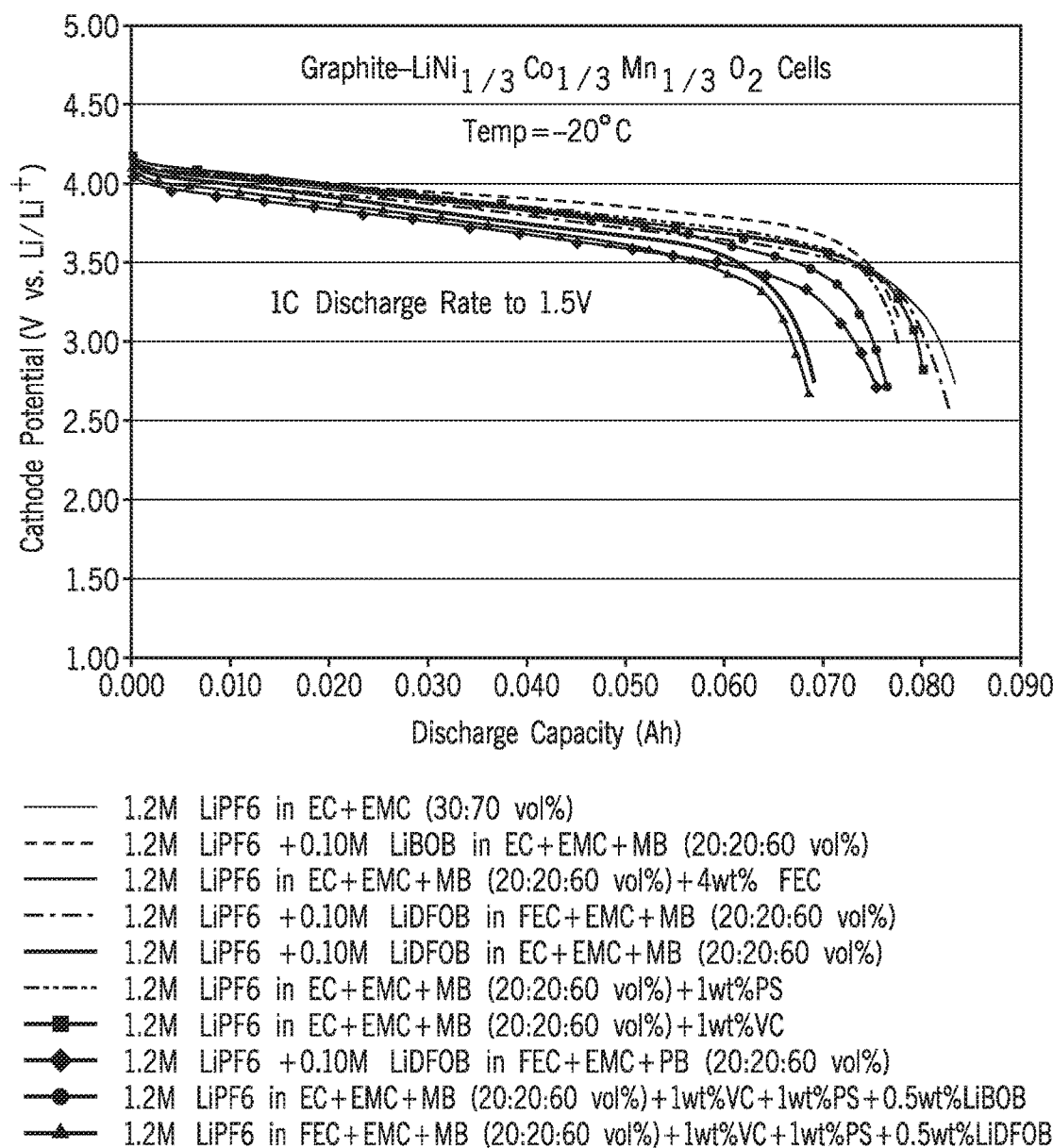
Figure 14:
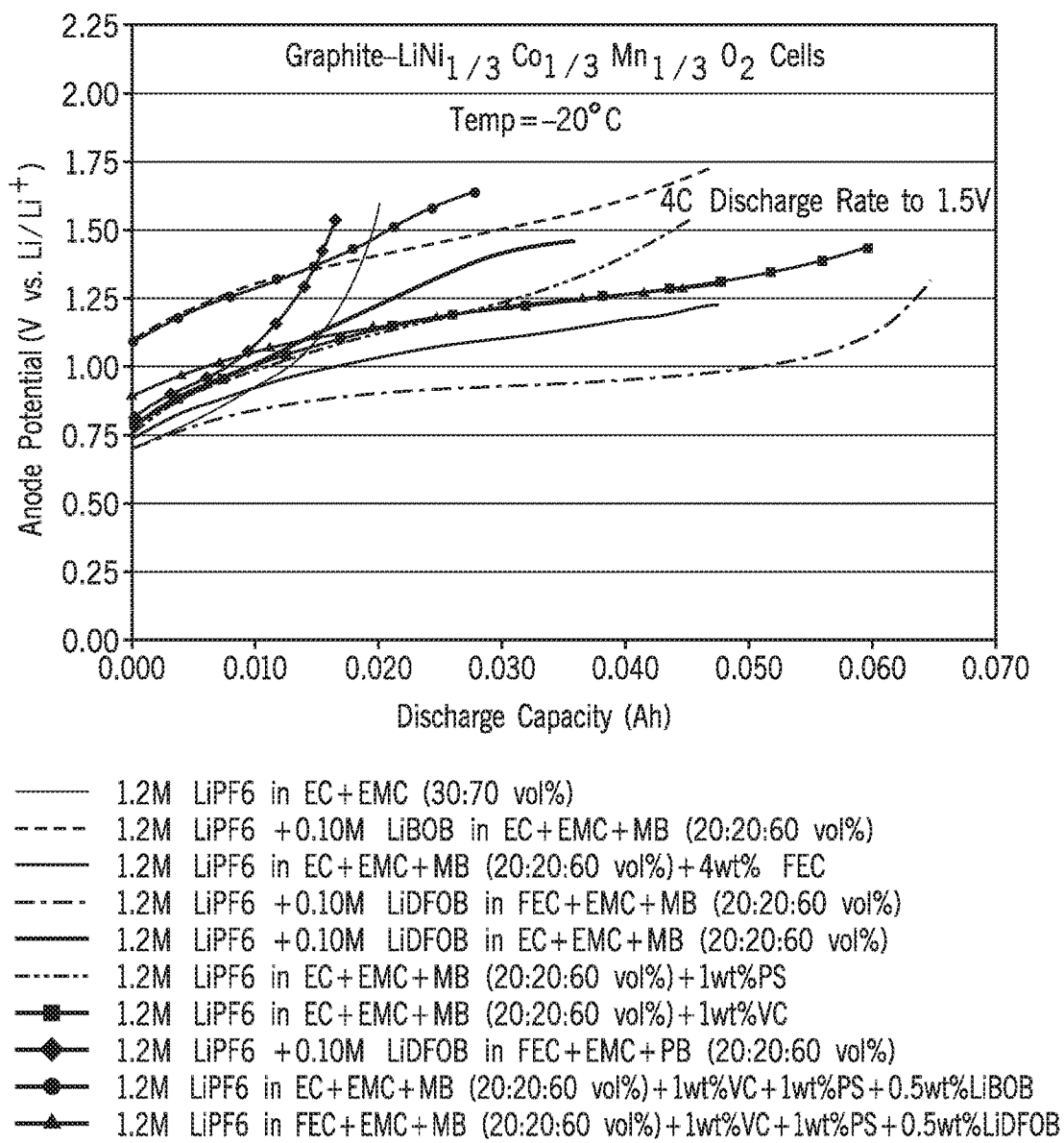
Figure 15:
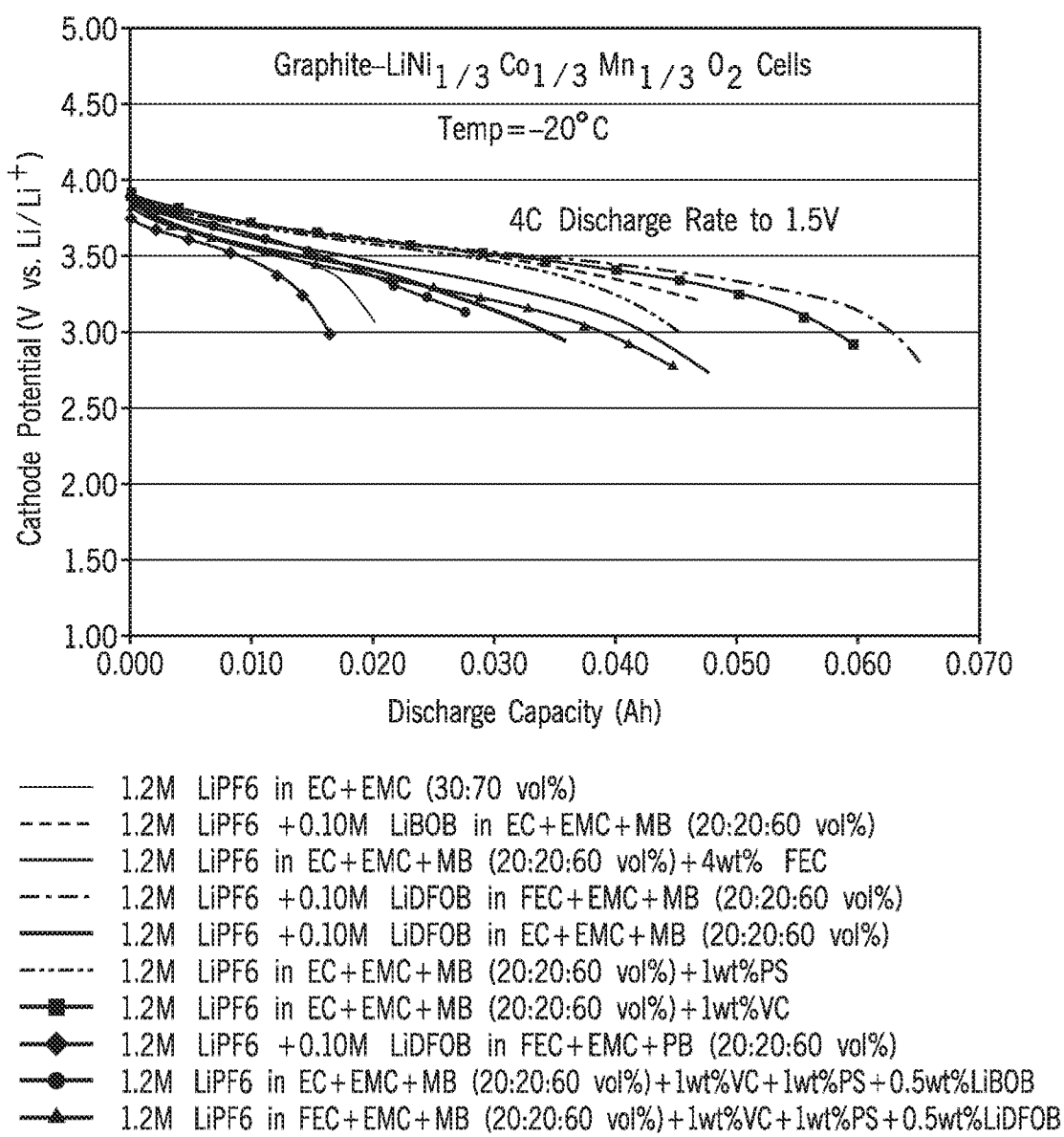
Figure 17:
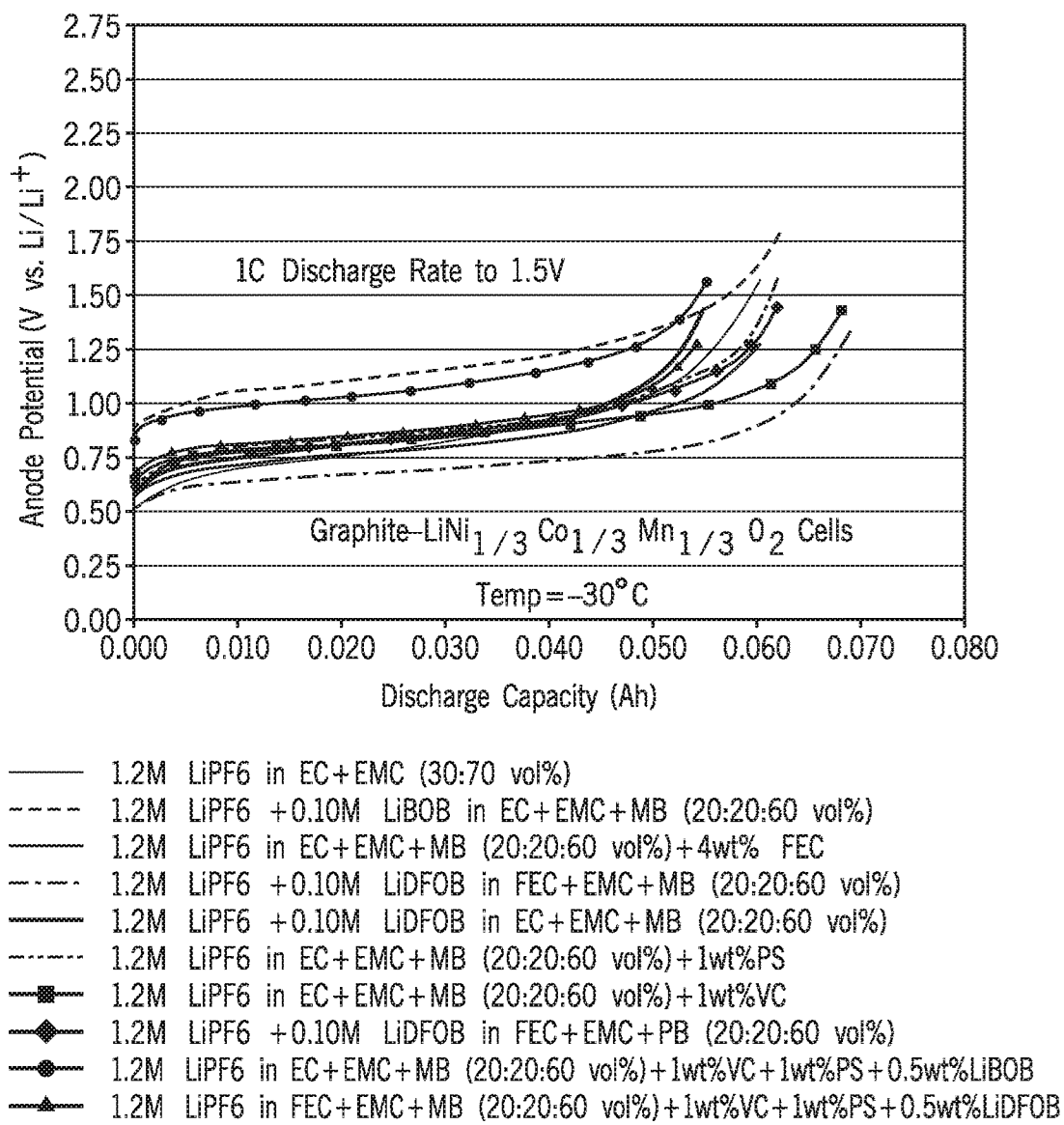
Figure 18:
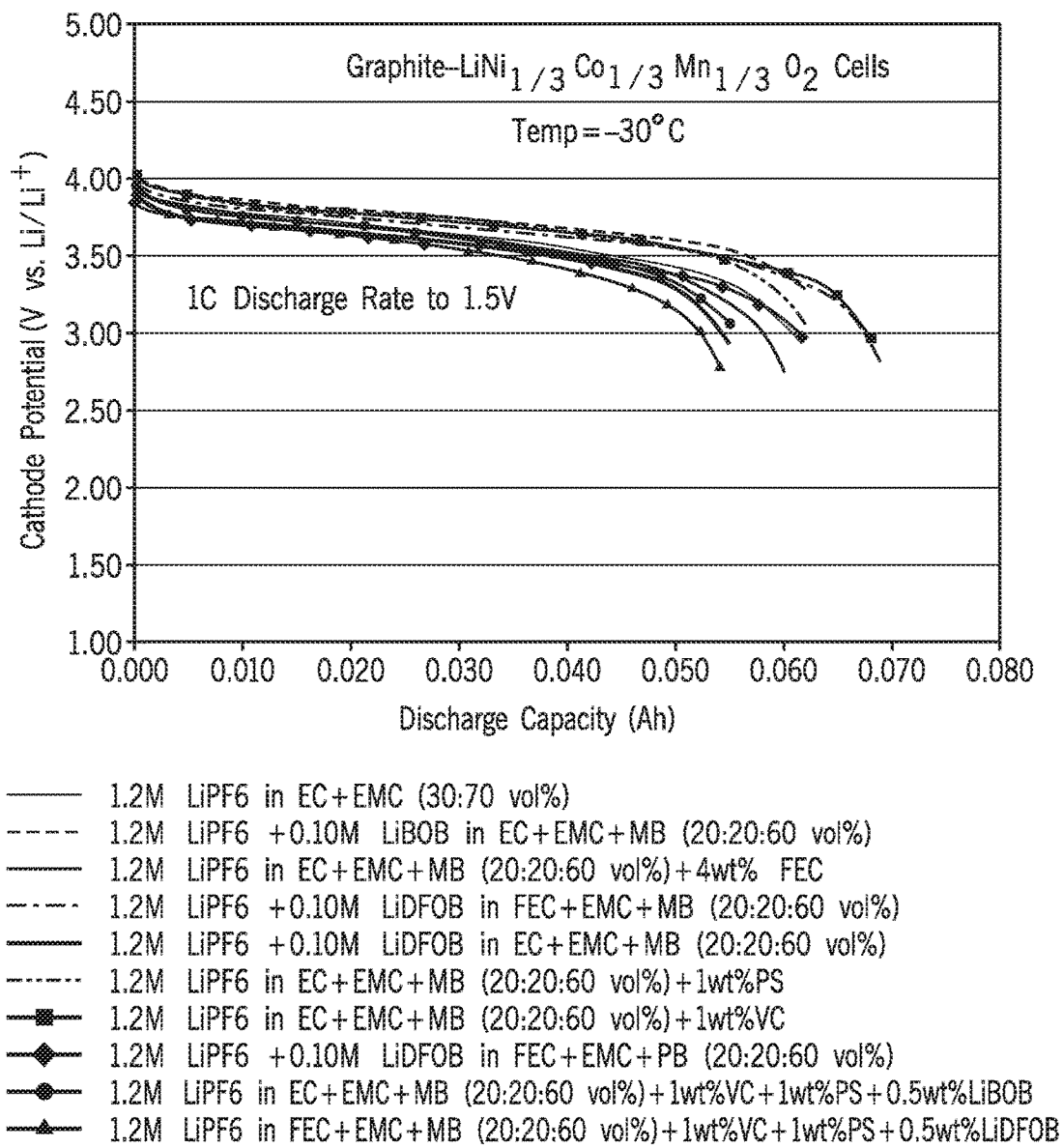
Figure 25:
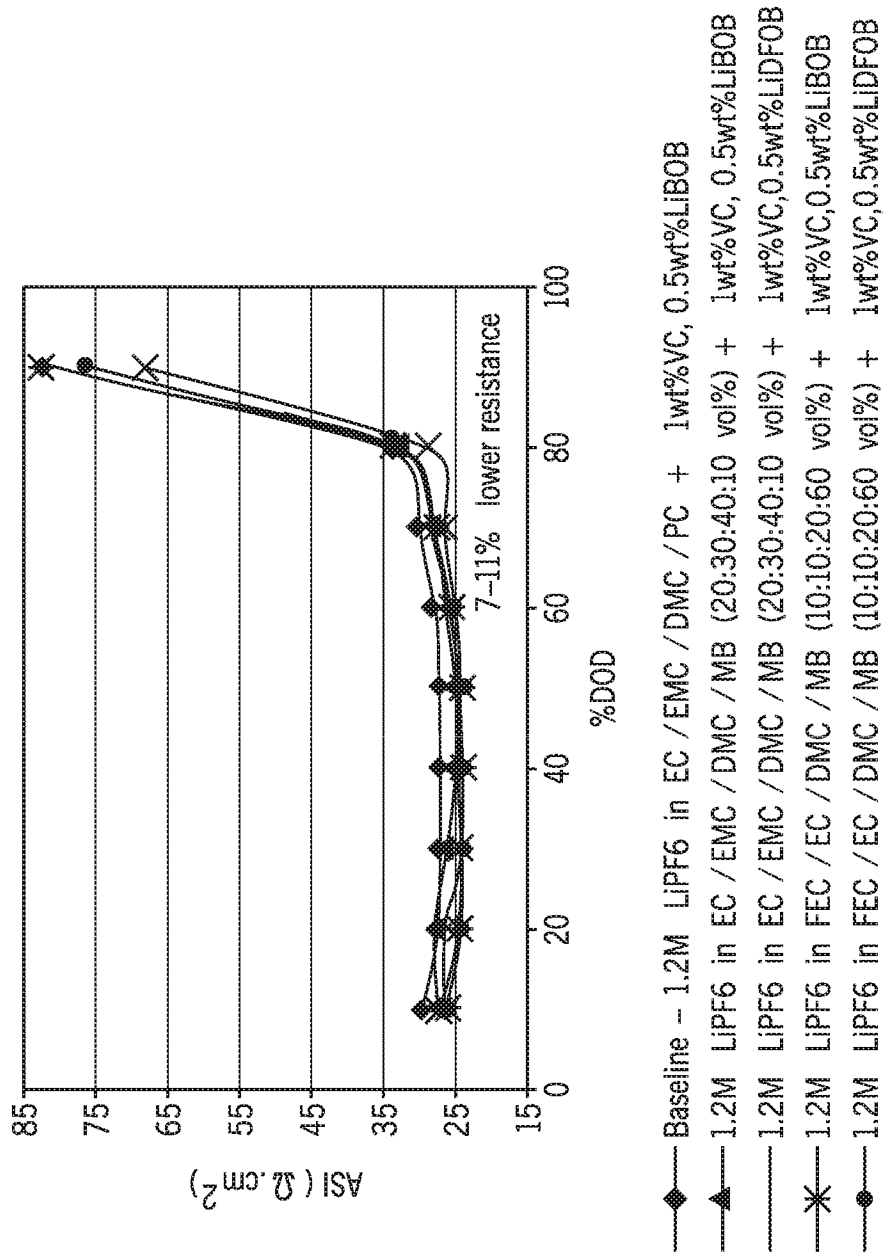
Figure 26:
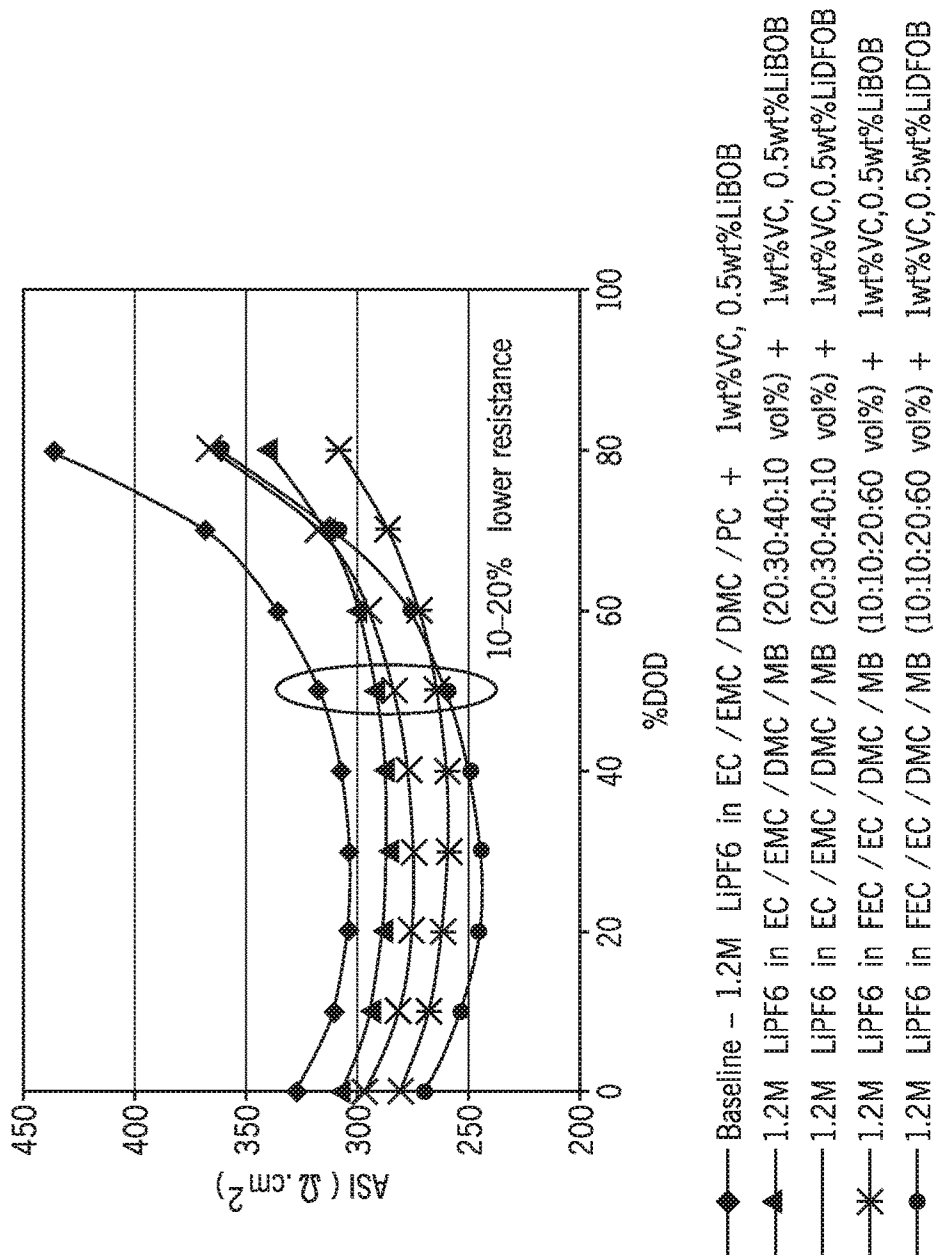
Figure 29:
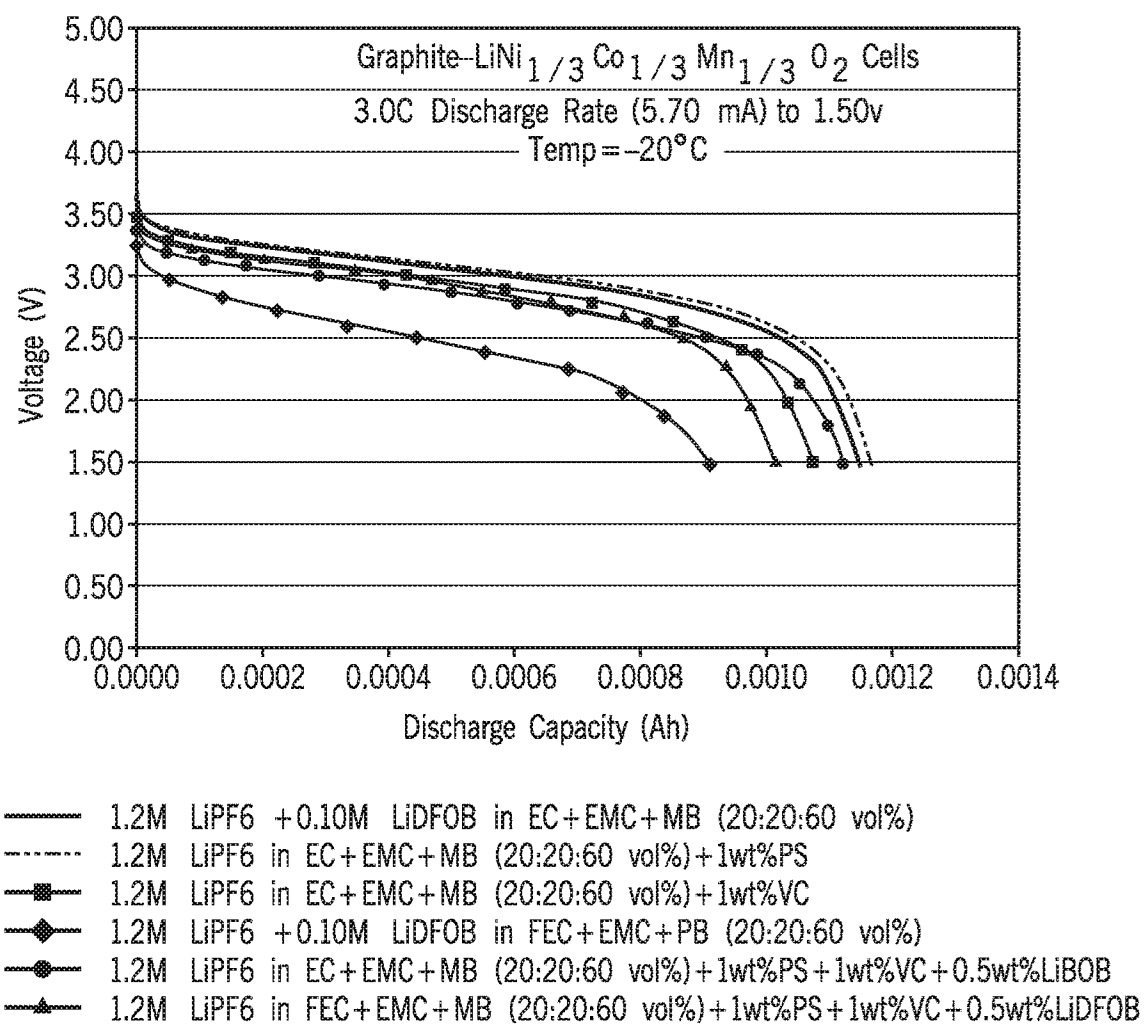
Figure 30:
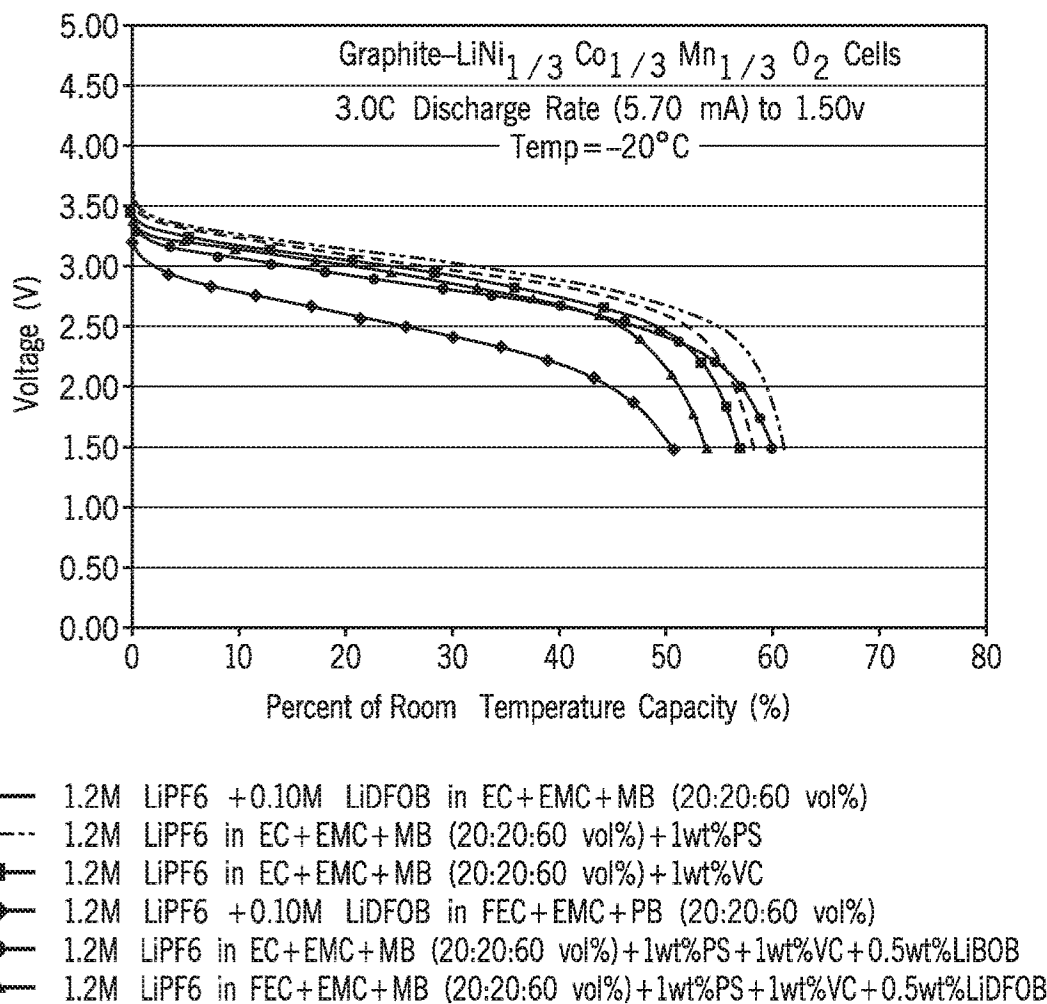
Figure 36:
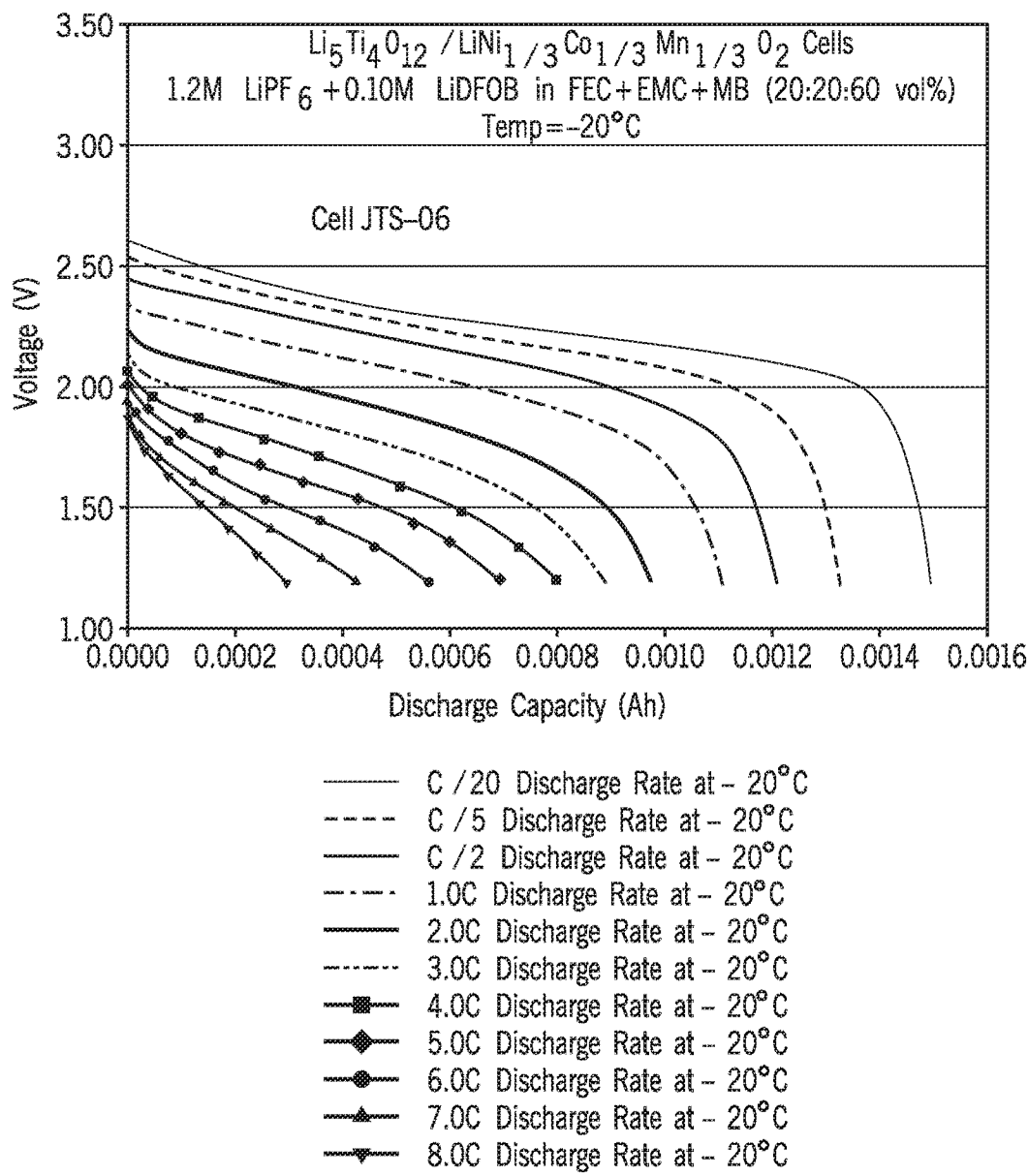
Figure 37:
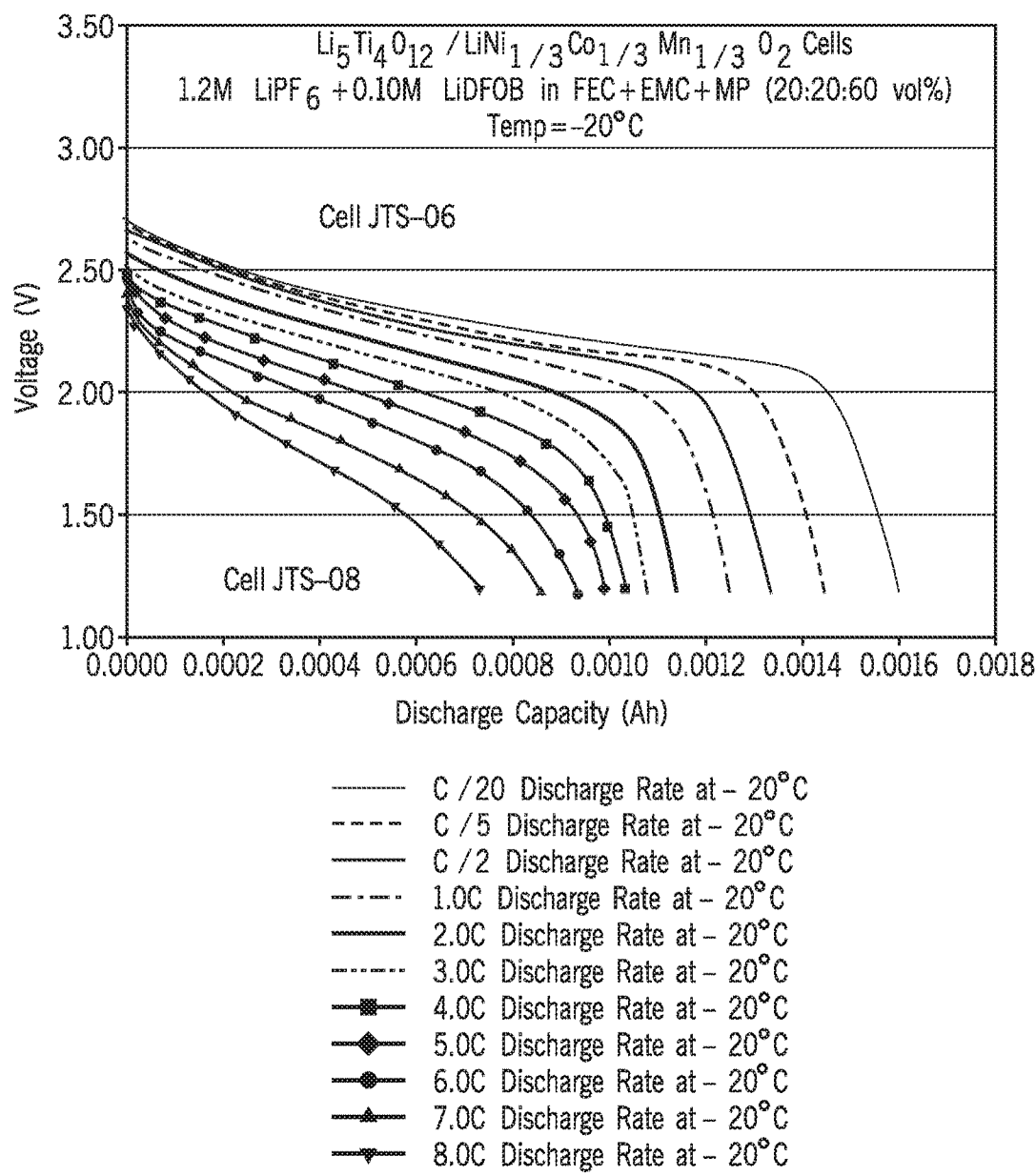
Figure 38:
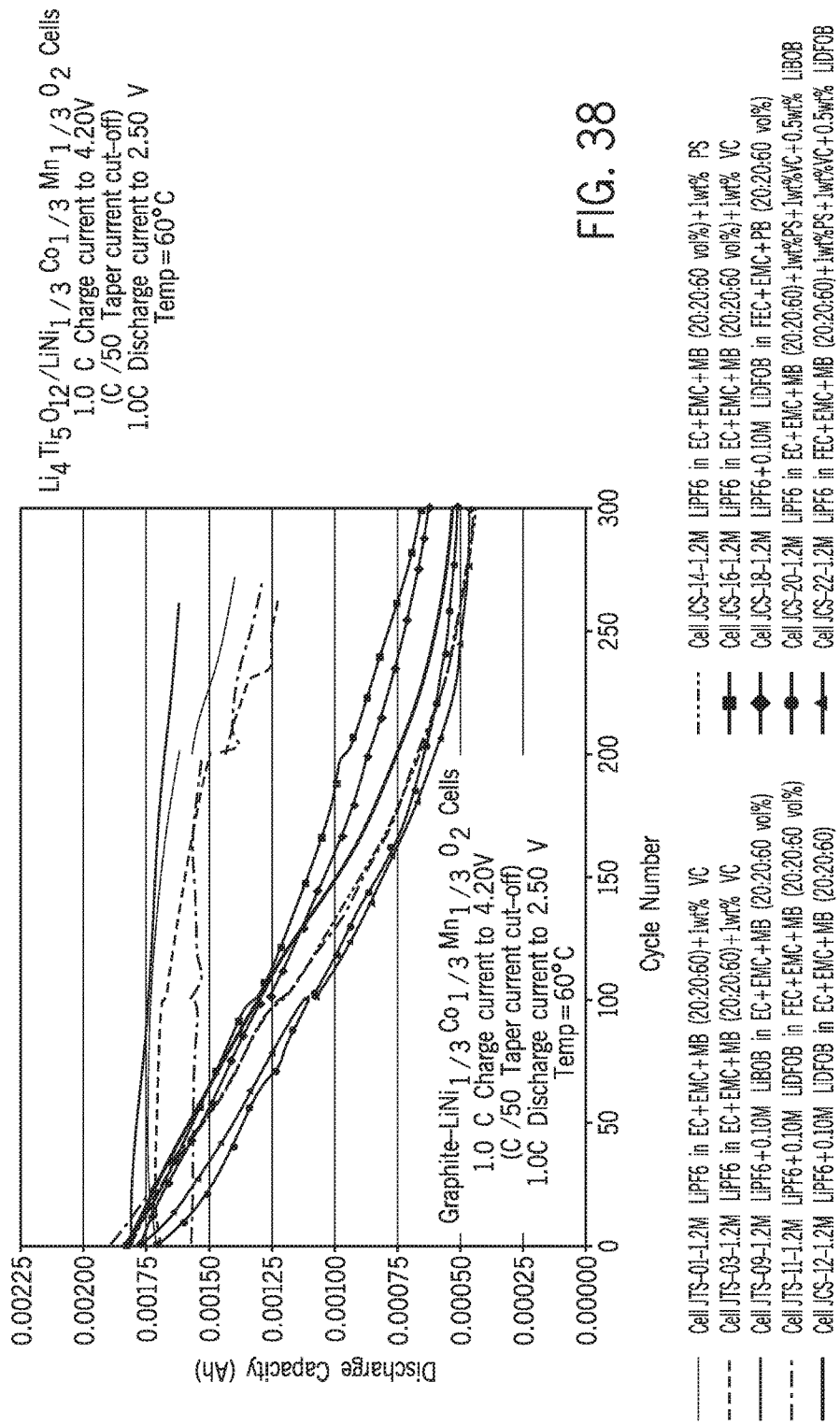
Figure 39:
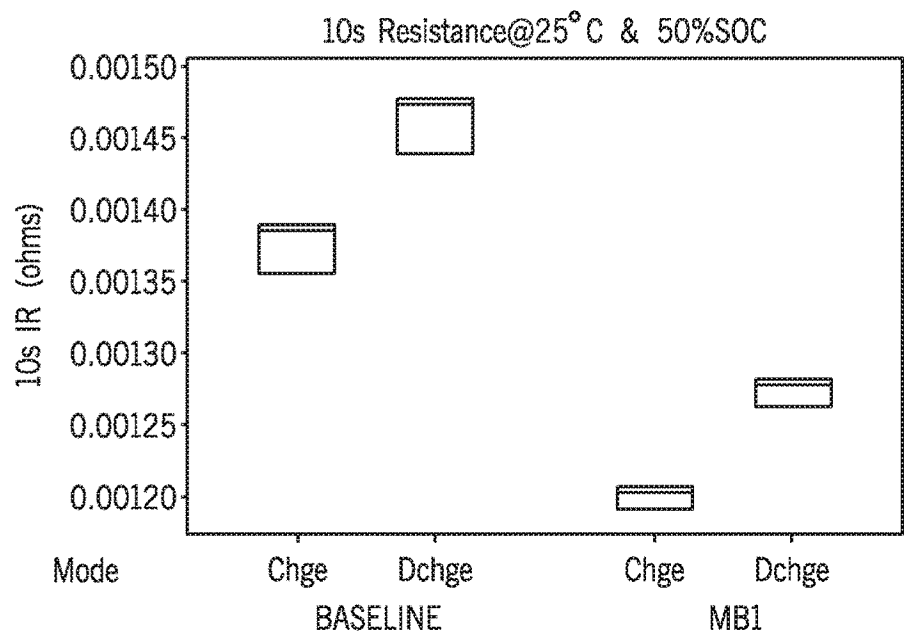
Figure 40:
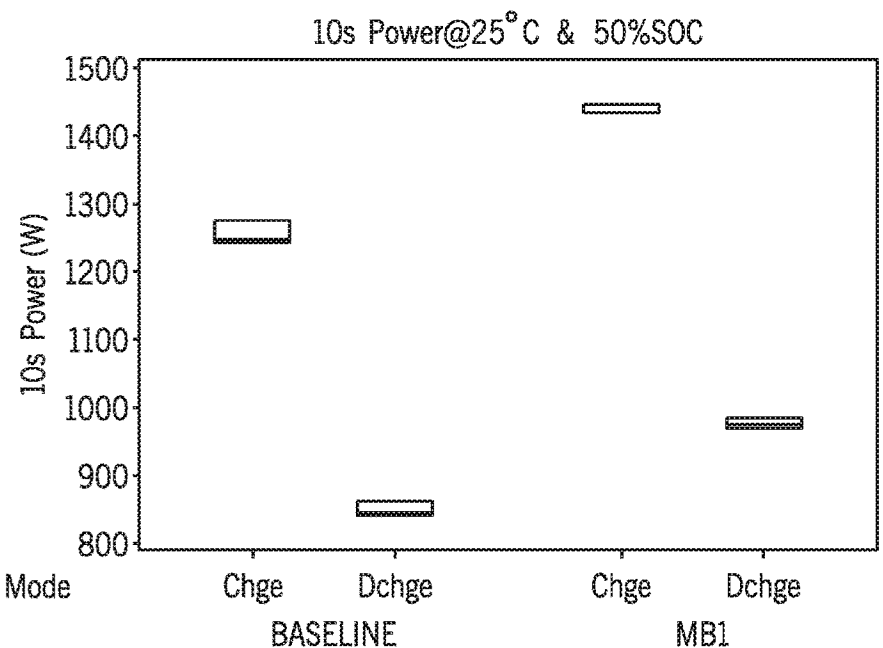
Figure 41:
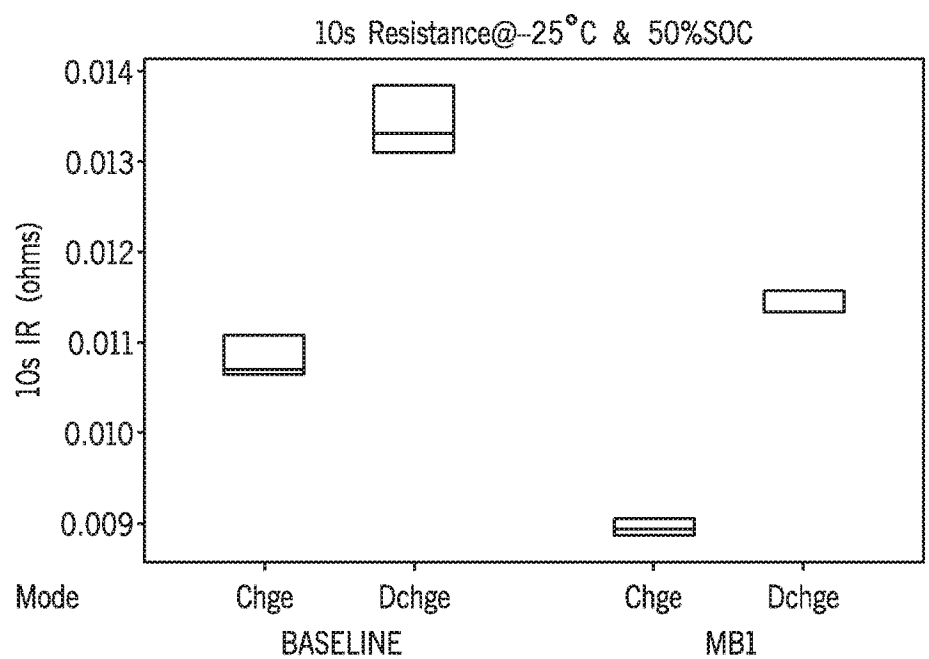
Figure 42:
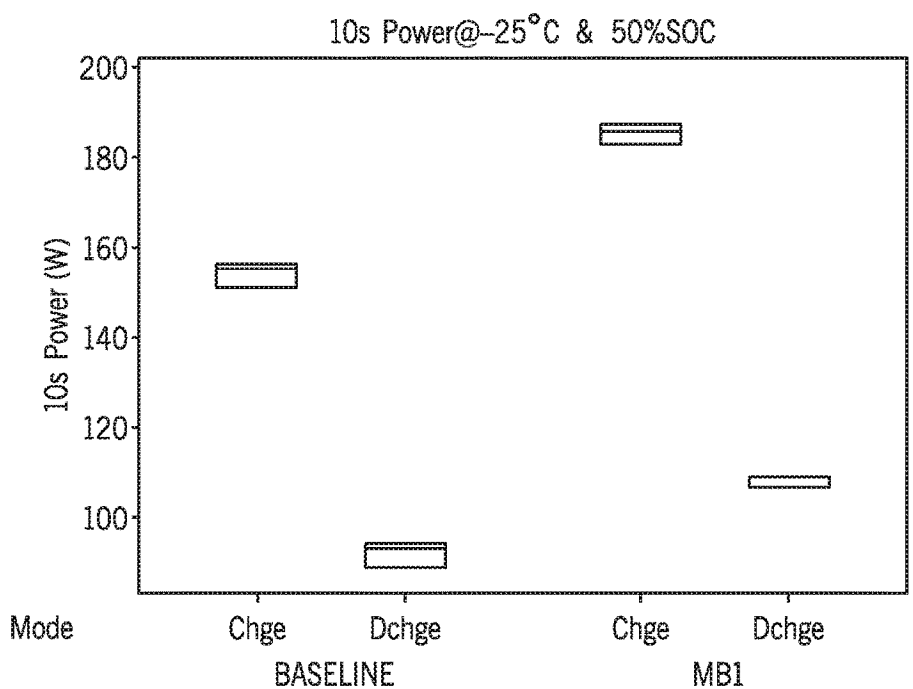

FIGS. 19, 20, and 21 are plots of battery cell impedance, anode impedance, and cathode impedance, respectively, obtained at −25° C. at a 5C discharge rate for a plurality of NMC/graphite battery cells and associated electrolyte formulations;

FIGS. 22, 23, and 24 are plots of battery cell impedance, anode impedance, and cathode impedance, respectively, obtained at −30° C. at a 5C discharge rate for a plurality of NMC/graphite battery cells having different electrolyte formulations;

FIGS. 25 and 26 are plots of overall battery cell impedance obtained at 25° C. and −25° C., respectively, for a plurality of NMC/graphite battery cells having different electrolyte formulations;

FIGS. 27 and 28 are plots of operating voltage as a function of discharge capacity and percentage of room temperature capacity, respectively, obtained at −20° C. and a discharge rate of 2C for a plurality of NMC/graphite battery cells having different electrolyte formulations;

FIGS. 29 and 30 are plots of operating voltage as a function of discharge capacity and percentage of room temperature capacity, respectively, obtained at −20° C. and a discharge rate of 3C for a plurality of NMC/graphite battery cells having different electrolyte formulations;

FIGS. 31 and 32 are plots of operating voltage as a function of discharge capacity and percentage of room temperature capacity, respectively, obtained at −30° C. and a discharge rate of 3C for a plurality of NMC/graphite battery cells having different electrolyte formulations;

FIG. 33 is a plot of discharge capacity as a function of cycle number obtained at 60° C. and a 1C charge/discharge rate for a plurality of NMC/graphite battery cells having different electrolyte formulations;

FIG. 34 is a bar graph of percentage of formation capacity as a function of battery cell electrolyte obtained upon performing a charge/discharge cycle at a C/5 rate after 10 day storage at 60° C. for a plurality of NMC/graphite battery cells having the listed formulations;

FIG. 35 is a chart depicting the ASI of different NMC/graphite battery cells as a function of their electrolyte and as a function of time;

FIG. 36 is a plot depicting operating voltage as a function of discharge capacity obtained for an NMC/LTO battery cell having a 1.2M LiPF6+0.1M LiDFOB in FEC/EMC/MB (20:20:60 vol %) electrolyte at different discharge rates at −20° C.;

FIG. 37 is a plot depicting operating voltage as a function of discharge capacity obtained for an NMC/LTO battery cell having a 1.2M LiPF6+0.1M LiDFOB in FEC/EMC/MP (20:20:60 vol %) electrolyte at different discharge rates at −20° C.;

FIG. 38 is a plot of discharge capacity as a function of cycle number obtained at 60° C. and a 1C charge/discharge rate for a plurality of NMC/LTO battery cells having different electrolyte formulations;

FIG. 39 is a chart comparing charge and discharge 10-second internal resistance (IR) obtained at 25° C. for a first NMC/LTO battery cell having a 1.15M LiPF$_6$ in EC/EMC/DMC/PC (25:30:40:5 vol %)+1 wt % VC, 0.5 wt % LiBOB electrolyte and a second NMC/LTO battery cell having a 1.0M LiPF$_6$ in PC/EMC/DMC/MB (20:30:40:10 vol %)+1 wt % LiDFOB electrolyte;

FIG. 40 is a chart comparing charge and discharge 10-second power obtained at 25° C. for the first NMC/LTO battery cell having the 1.15M LiPF$_6$ in EC/EMC/DMC/PC (25:30:40:5 vol %)+1 wt % VC, 0.5 wt % LiBOB electrolyte and the second NMC/LTO battery cell having the 1.0M LiPF$_6$ in PC/EMC/DMC/MB (20:30:40:10 vol %)+1 wt % LiDFOB electrolyte;

FIG. 41 is a chart comparing charge and discharge 10-second internal resistance (IR) obtained at −25° C. for the first NMC/LTO battery cell having the 1.15M LiPF$_6$ in EC/EMC/DMC/PC (25:30:40:5 vol %)+1 wt % VC, 0.5 wt % LiBOB electrolyte and the second NMC/LTO battery cell having the 1.0M LiPF$_6$ in PC/EMC/DMC/MB (20:30:40:10 vol %)+1 wt % LiDFOB electrolyte;

FIG. 42 is a chart comparing charge and discharge 10-second power obtained at 25° C. for the first NMC/LTO battery cell having the 1.15M LiPF$_6$ in EC/EMC/DMC/PC (25:30:40:5 vol %)+1 wt % VC, 0.5 wt % LiBOB electrolyte and the second NMC/LTO battery cell having the 1.0M LiPF$_6$ in PC/EMC/DMC/MB (20:30:40:10 vol %)+1 wt % LiDFOB electrolyte;

FIG. 43 is a combined plot depicting discharge volumetric power density and regenerative volumetric power density for an 8 amp-hour (Ah) battery module incorporating a plurality of the first NMC/LTO battery cells and an 8 Ah battery module incorporating a plurality of the second NMC/LTO battery cells, with the volumetric power densities being a function of % DOD;

FIG. 44 is a plot depicting voltage response on pulsing at a temperature of −25° C. for 6 of the first NMC/LTO cells in series and 6 of the second NMC/LTO cells in series; and FIG. 45 is a bar graph depicting percentage resistance increase as a function of electrolyte additive for a plurality of NMC/LTO battery cells each having a 1M LiPF$_6$+PC/EMC/DMC/MB (20/30/40/10 vol %)+1 wt % additive electrolyte.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion cells) arranged to provide particular voltages and/or currents useful to power, for example, one or more components of an xEV. Accordingly, presently disclosed are a number of systems and methods for the manufacture of battery cells that enable a wide range of operating temperatures, such as temperatures of −20° C. and below (e.g., −30° C.) and at temperatures of 45° C. and above (e.g., 60° C.). For example, one important limitation associated with traditional automotive lithium ion batteries are the poor sub-ambient temperature performance due to relatively high impedance at low temperatures (e.g., 0 to −40° C.). Indeed, impedance is an important consideration at both the anode and cathode side of a lithium ion battery cell, since it can determine how fast the cell can be charged and discharged.

Charge and discharge rates are of particular concern in configurations where lithium ion batteries are intended to be used in parallel with or instead of lead acid batteries. In fact, it has proven very challenging to construct lithium ion battery cells having a combination of an appropriate size, an appropriate capacity, and appropriate cold cranking capabilities at −30° C. and 10C charge/discharge rates, to match lead acid batteries. As one example, micro hybrid systems place high demands on power requirements, and batteries used in these applications should be capable of a pulse charge/discharge power of 12 kW, and an engine cranking power of 5 kW at −30° C. Indeed, it is now recognized that it may be desirable to produce a lithium ion battery module capable of, for example, meeting a 12C cranking performance target of 10 seconds of consecutive cranking, for 3 times, at a 12C rate at −18° C. and a 5C rate at −30° C., a high temperature cycling performance target at 60° C. using 4C discharge/1C charge cycles, for >1000 cycles, with 80% capacity retention, and a high temperature calendar life performance target at 60° C. for 6 months with a capacity retention >80% and cell impedance growth <50%.

In accordance with certain embodiments of the present disclosure, an electrolyte may incorporate low viscosity ester-based co-solvents and carbonate-based solvent blends. Methyl butyrate (MB), methyl propionate (MP), and propyl butyrate (PB) are examples of such ester co-solvents, due to their desirable physical properties (viscosity, melting points, and boiling points) and their favorable compatibility. Other ester co-solvents can be used in accordance with the present disclosure, including ethyl propionate (EP), butyl butyrate (BB), methyl acetate (MA), ethyl acetate (EA), propyl propionate (PP), butyl propionate (BP), propyl acetate (PA), and butyl acetate (BA), or combinations thereof.

In accordance with an aspect of the present disclosure, one or more electrolyte additives may be used in combination with these electrolyte solvents, for example to produce robust electrode surface films (both at the anode and the cathode), even at high temperatures (e.g., up to approximately 60° C.). Example electrolyte additives that may be used in accordance with present embodiments include mono-fluoroethylene carbonate (FEC), vinylene carbonate (VC), propane sultone (PS), lithium bis(oxalato) borate (LiBOB), and lithium difluoro(oxalato)borate (LiDFOB). In the present disclosure, it is now recognized that the low-viscosity solvent mixtures and their synergistic effects with certain of the additives noted above are believed to unexpectedly improve the performance of individual electrodes and overall battery cells. Indeed, several improvements in battery cell performance are described herein. For example, improvements in battery cells using either graphite-based anodes or titanate-based anodes are presently disclosed. In accordance with the present disclosure, only one additive may be used, or multiple additives may be used in combination with electrolyte solvents that include one or more carbonate and one or more ester solvents.

As is generally understood in the art, an "electrolyte," as used herein, is intended to denote a single composition having all solvents, co-solvents, additives, lithium salts, and so forth, used in a particular battery cell. Therefore, it should also be noted that the term "electrolyte" is understood in the art to denote a solution incorporating all such materials, and is not generally intended to be limited to only the lithium salt (or other ionic material) used to provide ionic conductivity to a solution. Rather, a "lithium salt" will generally denote the salt that is the main source of lithium of the electrolyte. Lithium salts are generally expressed in terms of their molarity (M) in the solvents of the electrolyte. However, certain additives may also be presented as being present in a certain molarity. The solvents of the electrolyte compositions, for lithium ion battery cells, are non-aqueous, and are generally expressed in terms of their relative volume percentages, based on the total volume of solvents in the electrolyte composition. In this way, the volume percentages of solvents in a particular electrolyte will total 100 volume percent (% v/v or vol %). Additives of the disclosed electrolytes are generally expressed in terms of weight percentage (wt %) of the total composition of the electrolyte. In this way, it may be possible to determine if a particular component of an electrolyte is a solvent, lithium salt, additive, or the like, with reference to the manner in which its amount is expressed. It should also be noted that an "electrolyte" may also be referred to as an "electrolyte composition" in some situations.

Battery cells in accordance with one aspect of the present disclosure include specific combinations of fluorinated non-aqueous solvents and certain additives that unexpectedly lower impedance in battery cells relative to battery cells using non-fluorinated versions of the solvents. In addition, battery cells in accordance with another aspect of the present disclosure include specific combinations of non-aqueous solvents and certain fluorinated additives that unexpectedly lower impedance in battery cells relative to battery cells using non-fluorinated versions of the additives. In yet a further aspect of the present disclosure, certain fluorinated solvents and certain fluorinated additives may be used in combination to unexpectedly lower impedance.

By way of example, in certain embodiments, the disclosed electrolyte compositions may include a solvent mixture including an ester solvent and certain carbonate solvents, where at least one of the carbonate solvents is fluorinated. The ester solvent may include, for example, an alkyl ester (e.g., methyl butyrate, methyl propionate, ethyl propionate). The carbonate solvents may include a fluorinated cyclic carbonate (e.g., FEC), a linear carbonate (e.g., ethyl methyl carbonate (EMC), dimethyl carbonate (DMC)), various esters, or a combination. Additives used in these electrolyte compositions may include LiBOB, LiDFOB, and others. Indeed, a variety of different combinations of non-aqueous solvents and additives may be used in accordance with the presently disclosed electrolyte compositions.

Figure 1:
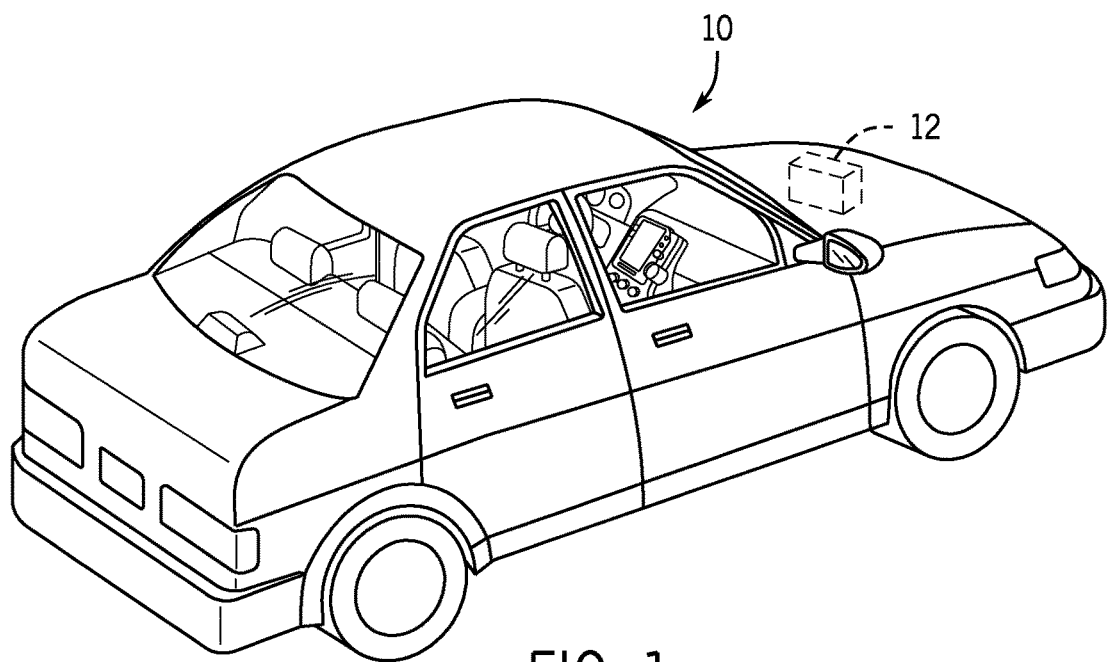
FIG. 1 is a perspective view of an xEV having a battery system configured in accordance with present embodiments to provide power for various components of the xEV, in accordance with an aspect of the present disclosure.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
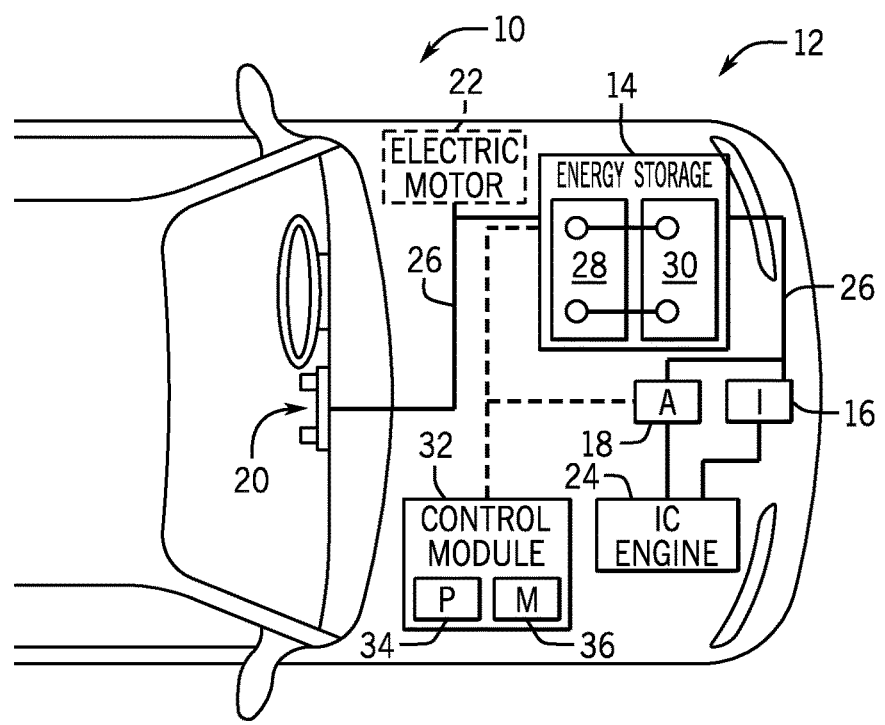
FIG. 2 is a cutaway schematic view of an embodiment of the xEV having a start-stop system that utilizes the battery system of FIG. 1, the battery system having a lithium ion battery module, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processor 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

It should be noted that presently disclosed embodiments may be applicable to any battery module having the same or different configurations and/or orientations described above and in detail below. One of ordinary skill in the art would recognize that the components and examples used to describe battery modules in accordance with the present disclosure should not be construed to limit the present disclosure to those components and examples alone. Rather, the disclosed examples are merely intended to serve as non-limiting examples to facilitate discussion of the present disclosure.

Figure 3:
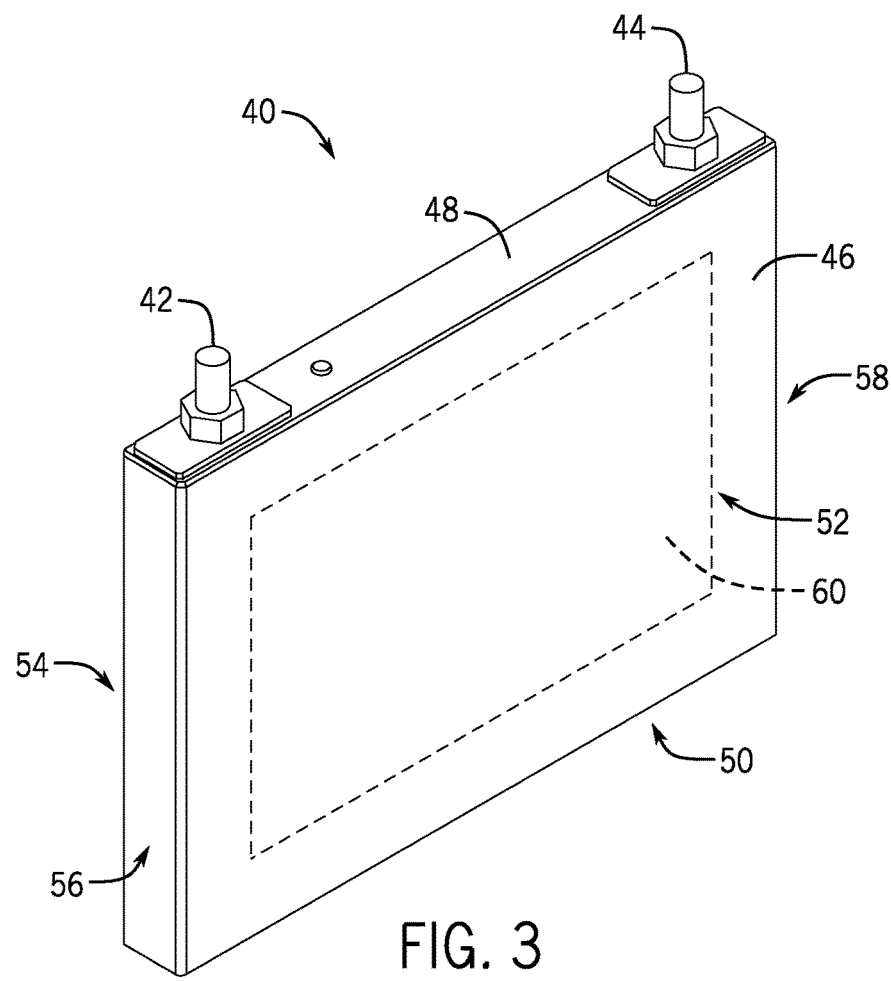
FIG. 3 is a perspective view of an embodiment of a lithium ion battery cell having a prismatic configuration.
Figure 4:
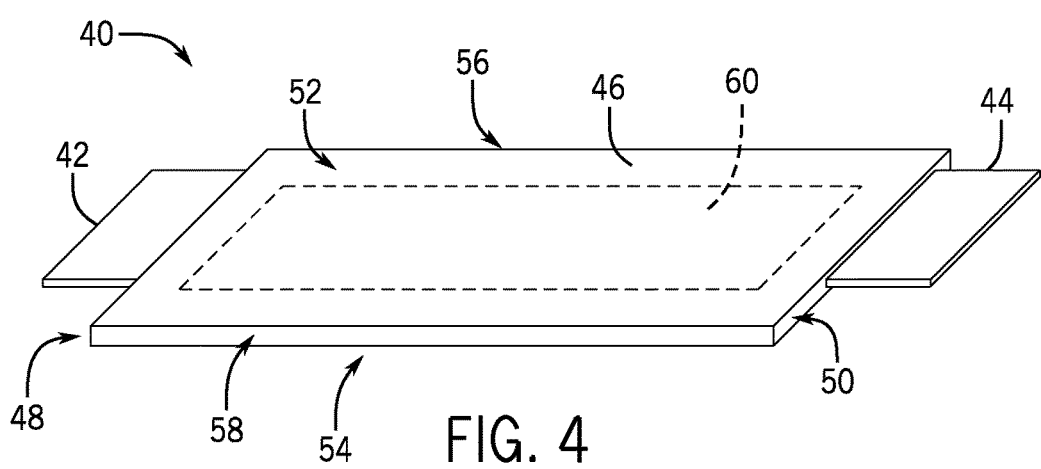
FIG. 4 is a perspective view of an embodiment of a lithium ion battery cell having a pouch configuration.

As set forth above, in accordance with the present disclosure, embodiments of the lithium ion battery module 28 may utilize specific chemistries to enable wide temperature operation, including operation at low temperatures (e.g., −20° C. and below). Embodiments of the lithium ion battery module 28 may include one or more battery cells connected so as to provide features for the acceptance, storage, and release of energy in the form of an electrical charge, electrical potential, and so forth. Illustratively, FIGS. 3 and 4 depict embodiments of a battery cell 40 that may each incorporate the electrolyte compositions of the present disclosure. Generally, and as discussed in further detail below, the battery cells 40 will include a positive cell terminal 42, a negative cell terminal 44, and a housing 46 (also referred to as a casing) that contains the electrochemically active elements. However, the embodiments of the battery cell 40 illustrated in FIGS. 3 and 4 are merely provided as examples. In other embodiments, other shapes (e.g., oval, cylindrical, polygonal), sizes, terminal configuration and positions, and other features may be used in accordance with the present approach.

Specifically, FIG. 3 illustrates an embodiment of the lithium ion battery cell 40 having a prismatic configuration (i.e., is a prismatic battery cell), while FIG. 4 illustrates an embodiment of the lithium ion battery cell 40 having a pouch configuration (i.e., is a pouch battery cell). As may be appreciated with reference to FIGS. 3 and 4, the prismatic and pouch configurations are similar from the standpoint of the cross-sectional geometries of their respective housings 40, illustrated as generally rectangular. From the standpoint of producing battery modules having multiple battery cells, this rectangular shape generally affords higher energy densities and arrangement flexibility for the prismatic and pouch lithium ion battery cells 40 compared to other shapes, such as cylindrical configurations. However, this higher energy density and flexibility is usually balanced against possible losses in operating efficiencies due to non-symmetrical swelling and heating, among others.

Regarding the external features of the embodiments of the lithium ion battery cell 40, the illustrated prismatic configuration of FIG. 3 includes both terminals 42, 44 on the same region of the lithium ion battery cell 40. This region is generally considered to correspond to a top portion 48 of the lithium ion battery cell 40. The prismatic configuration illustrated in FIG. 3 includes a bottom portion 50 opposite the top portion 48, two faces (including first and second faces 52, 54) corresponding to the broad portion of the lithium ion battery cell 40, and first and second sides 56, 58 interconnecting the top portion 48 with the bottom portion 50 and the first face 52 with the second face 54. While illustrated as being substantially flat, the first and second sides 56, 58 may have other geometries, such as curved geometries. Further, while illustrated as including posts as the positive and negative terminals 42, 44, the prismatic configuration may instead use the top portion 48, the bottom portion 50, or any other portion of the casing 46, as one of the terminals.

Also illustrated in FIG. 3 is a dashed rectangle corresponding to an active area 60 of the lithium ion battery cell 40. The active area 60 generally denotes the region in the lithium ion battery cell 40 where a cathode and an anode of the lithium ion battery cell 40 are located. However, the illustrated size of the active area 60 is not intended to denote any particular dimensions of the cathode and anode, only the general positioning of the electrodes within the casing 48. As discussed in further detail below, the active area 60 may be considered to include a cell element including the anode, cathode, and other electrically active components.

The pouch configuration of the lithium ion battery cell 40 depicted in FIG. 4 includes tabs as the negative and positive terminals 42, 44. For the illustrated lithium ion battery cells 40 of FIGS. 3 and 4, the anode and cathode may be in the form of an oblong coil. As with the prismatic version of the battery cell 40 discussed above, the pouch battery cell 40 includes electrolytes having combinations of solvents and additives that together unexpectedly reduce impedance, even at low temperatures (e.g., below 0° C.).

The lithium ion battery cell 40 of FIG. 4 also includes respective first and second faces 52, 54 corresponding to a portion of the cell 40 having the largest surface area relative to other sides or portions of the cell 40. While illustrated as also including respective top and bottom portions 48, 50, and first and second sides 56, 58, in other embodiments, the first and second faces 52, 54 may simply be coupled together via a seal (e.g., a laser or heat weld) extending around a periphery of the cell 40. The illustrated pouch version of the lithium ion battery cell 40 also includes a demarcation of the active area 60, which, as noted above, generally corresponds to a location of the anode and cathode of the lithium ion battery cell 40.

Regarding the construction of the anode and cathode, any suitable configuration may be used in combination with the presently disclosed electrolytes. As non-limiting examples, the anode and cathode may be in the form of an oblong coil or a series of stacked plates. For example, the anode may include a first active material coated onto a first conductive element (e.g., foil), and the cathode may include a second active material coated onto a second conductive element (e.g., foil). The anode active material and the cathode active material generally determine the operating voltage (or voltage range) of the lithium ion battery cell 40, with the electrolyte affecting the voltage as well.

In accordance with certain embodiments of the present disclosure, the anode active material may generally include any one or a combination of materials, such as carbon (e.g., graphite), natural graphite, artificial graphite, mesocarbon microbeads (MCMB), and coke based carbon, or lithium-titanium compounds such as lithium titanium oxide (LTO, $Li_4Ti_5O_{12}$). For example, in one embodiment, the anode active material may be graphite, which has an average voltage of less than 200 milliVolts (mV) versus $Li/Li^+$. However, in order to achieve enhanced stability against lithium plating, the anode active material may include a higher voltage material, such as titanate-based materials. The use of LTO may be desirable, as it has a voltage of approximately 1.55 V versus $Li/Li^+$, and operates well outside of the voltage range at which lithium plating generally occurs, even at lower temperatures (e.g., down to approximately −30° C.). Furthermore, the LTO may not undergo any major exothermic reactions with the electrolyte of the lithium ion battery cells 40, even at higher temperatures (e.g., up to approximately 170° C.). While certain anode active materials may be more suitable for certain applications than others and, indeed, may contribute to certain of the results disclosed herein, the present disclosure is not particularly limited to any one anode active material. That is, the anode active material may include any one or a combination of appropriate active materials.

The cathode active material may, in its most general sense, include any active material capable of undergoing lithium intercalation and deintercalation at appropriate voltages. By way of non-limiting example, the cathode active material (the one or more materials used to produce the cathode) may have a voltage versus $Li/Li^+$ of at least approximately 2.5 V, such as between approximately 3 V and approximately 5 V, such as between approximately 3.0 V and approximately 4.9 V, between approximately 3.0 V and approximately 4.8 V, between approximately 3.0 V and approximately 4.7 V, between approximately 3.0 V and approximately 4.6 V, between approximately 3.1 V and approximately 4.5 V, between approximately 3.1 V and approximately 4.4 V, between approximately 3.2 V and approximately 4.3 V, between approximately 3.2 V and approximately 4.2 V, between approximately 3.2 V and approximately 4.1 V, or between approximately 3.2 V and approximately 4.0 V.

By way of example, the cathode active material may be a lithium metal oxide component. As used herein, lithium metal oxides may refer to any class of materials whose formula includes lithium and oxygen as well as one or more additional metal species (e.g., nickel, cobalt, manganese, aluminum, iron, or another suitable metal). A non-limiting list of example lithium metal oxides may include: mixed metal compositions including lithium, nickel, manganese, and cobalt ions such as lithium nickel cobalt manganese oxide (NMC) (e.g., $LiN_{1/3}Co_{1/3}Mn_{1/3}O_2$), lithium nickel cobalt aluminum oxide (NCA) (e.g., $LiNi_{0.8}Co_{0.15}Al_{0.05}O_2$), lithium cobalt oxide (LCO) (e.g., $LiCoO_2$), and lithium metal oxide spinel (LMO-spinel) (e.g., $LiMn_2O_4$, such as high voltage spinel (HVS)). The cathode may include only a single active material (e.g., NMC), or may include a mixture of materials such as any one or a combination of: NMC, NCA, LCO, LMO-spinel, and the like.

Other cathode active materials may be utilized in addition to or in lieu of these materials, such as lithium metal phosphates. Examples of such active materials are generally defined by the formula $LiMPO_4$, wherein M is Fe, Ni, Mn, or Mg. Any one or a combination of these phosphates may be used as the cathode active material, in addition to or in lieu of any one or a combination of the lithium metal oxide materials encompassed by the description above. Thus, by way of example, the cathode active material may include any one or a combination of: NMC ($Li_xNi_aMn_bCo_cO_2$, x+a+b+c=2), $LiMn_2O_4$ (LMO) spinel, NCA ($LiNi_xCo_y$-$Al_zO_2$, x+y+z=1), $LiMn_{1.5}Ni_{0.5}O_2$, $LiCoO_2$ (LCO), or $LiMPO_4$, wherein M is Fe, Ni, Mn, or Mg. It should be noted, however, that a variety of cathode active materials may, in combination, be used at the cathode to achieve an appropriate voltage for the lithium ion battery cell 40.

Returning now to the architecture of the cells 40, the anode and cathode may be separated by a separator to prevent shorting, and may be wound around a mandrel to form an oblong coil. This forms a layered roll that, when combined with the electrolyte compositions of the present disclosure, may be referred to as a "jelly roll." Stacked plate configurations may generally have a similar arrangement, but are discontinuous, not wound around a mandrel and are, instead, crimpled at either end so that the cathode plates connect to the cathode tab and the anode plates connect to the anode tab. Generally, the presently disclosed electrolyte compositions may be placed into intimate contact with the anode and cathode via a filling procedure in which the electrolyte compositions are introduced into the casing 46 containing the anode and cathode.

Electrolyte

Present embodiments of the electrolytes, as noted above, may include specific combinations of lithium salts, carbonate and ester solvents, and certain additives that enable reduced impedance at relatively low temperatures and good capacity retention when used at elevated temperatures. In this way, the lithium ion battery cells 40 disclosed herein may be incorporated into battery modules (e.g., lithium ion battery module 28) that may be subject to charge and discharge cycles at low temperatures and high temperatures, and the electrolytes disclosed herein may enable such charging and discharging at rates and lifetimes that may not otherwise be appropriate. Presented below are certain example materials that may be used to produce electrolytes for use in the battery cells 40 disclosed above. It should be noted that an electrolyte may generally include a lithium salt present in a certain concentration, in a solvent mixture of solvents having respective volume percentages, based on the total volume of the solvent mixture. Certain electrolytes may also include an additive present within a certain concentration, denoted as a concentration (e.g., 0.1 M) or as a certain weight percentage, based on the total weight of the electrolyte (wt %).

Lithium Salt

The electrolytes disclosed herein generally include a lithium salt, which serves as a source of lithium ions for lithium intercalation/deintercalation processes at the cathode and anode during charging and discharging. The lithium salt may include any suitable source of lithium ions, with non-limiting, specific examples including lithium hexafluorophosphate ($LiPF_6$), lithium tetrafluoroborate ($LiBF_4$), lithium bis(oxalato) borate (LiBOB, $LiB(C_2O_4)_2$), lithium difluoro(oxalato) borate (LiDFOB), and lithium trifluoromethanesulfonate (lithium triflate, $LiCF_3SO_3$).

The amount of each lithium salt incorporated into the electrolyte may vary based on the number of lithium salts employed, and the chemical nature of the lithium salt. By way of non-limiting example, the total amount of lithium salts within the electrolyte may vary between 0.5 molar (M) and 2.0 M. As one specific example, a combination of lithium salts may include $LiPF_6$ and LiBOB, or $LiPF_6$ and LiDFOB, where $LiPF_6$ is present in an amount ranging between approximately 1.0 M and 1.6 M, (e.g., 1.2 M or 1.6 M), and LiBOB or LiDFOB is present in an amount ranging between approximately 0.05 M and approximately 0.2 M (e.g., 0.1 M). In such embodiments, the LiBOB and/or LiDFOB may be used as an additive, as opposed to one of the main sources of lithium ions. In still further embodiments, the lithium salts, aside from any additives, may use only $LiPF_6$ as the source of lithium ions, in any amount in the range from 1.0 M to 2.0 M, such as 1.0 M, 1.2 M, or 1.6 M.

Electrolyte Solvents

The solvents of the electrolytes may include one or more ester solvents, one or more carbonate solvents, or a combination thereof. Generally, the ester solvents may be linear esters, branched esters, or the electrolyte solvent mixture may include both linear and branched esters. A non-limiting list of example linear ester solvents include: methyl butyrate (MB), methyl propionate (MP), propyl butyrate (PB), ethyl propionate (EP), ethyl butyrate (EB), butyl butyrate (BB), methyl acetate (MA), ethyl acetate (EA), propyl propionate (PP), butyl propionate (BP), propyl acetate (PA), and butyl acetate (BA). The linear ester solvents may be selected based upon their viscosity, boiling point, melting point, and so forth. As one example, a single linear ester may be used in an electrolyte solvent mixture, the linear ester having a relatively low viscosity at temperatures lower than −10° C., such as MB, MP, or EP.

The carbonate solvents may be cyclic carbonates, acyclic (non-cyclic) carbonates, or the electrolyte solvent mixture may include both cyclic and non-cyclic carbonates. A non-limiting list of example carbonate solvents include cyclic carbonates such as ethylene carbonate (EC), fluoroethylene carbonate (FEC), and propylene carbonate (PC), and non-cyclic (e.g., straight-chain) carbonates such as ethyl methyl carbonate (EMC), dimethyl carbonate (DMC), and diethyl carbonate (DEC). Any combination of ester and carbonate solvents is encompassed by the present disclosure, but certain solvent mixtures have been found to result in better battery cell performance than others for certain electrolyte compositions, as described in further detail below. By way of non-limiting example, an electrolyte solvent mixture may include a combination of one or two cyclic carbonate solvents, one or two non-cyclic carbonate solvents, and one or two ester solvents. By way of more specific example, an electrolyte solvent mixture may include a combination of one cyclic carbonate solvent, two non-cyclic carbonate solvents, and one ester solvent. In one embodiment, the ester solvent, for example due to a lower viscosity relative to the carbonate solvents, or some other physical or electrical property, may represent a larger percentage by volume (vol %), based on the total volume of the solvent mixture, than the other solvents. Indeed, all volume percentages set forth for the solvents of the solvent mixture described herein should be considered to be based on the total volume of the solvent mixture. Volume percentages may, as an alternative to "vol %," be expressed as "v/v %" in certain formulations.

The ester solvent (e.g., MB) may be present in the electrolyte solvent mixture in an amount ranging from approximately 40 vol % to approximately 70 vol %, such as between approximately 50 vol % and approximately 70 vol %, or approximately 60 vol %, and the cyclic and non-cyclic carbonates may represent the remaining volume of solvent in the electrolyte. In particular, in certain embodiments, the one or more ester solvents may account for greater than approximately 40 vol %, approximately 50 vol %, or approximately 60 vol % of the electrolyte. However, any amount of the linear ester solvent may be utilized. Indeed, in certain other embodiments, the linear ester may be present in an amount ranging from approximately 5 vol % to approximately 50 vol %, such as between approximately 5 vol % and approximately 40 vol %, approximately 5 vol % and approximately 20 vol %, or approximately 10 vol %.

The carbonates may be present in equal volume percentages, or different volume percentages. As a further example, in embodiments where the linear ester represents the majority of the solvents in the electrolyte, the cyclic carbonate may be present in an amount ranging from approximately 5 vol % to approximately 40 vol %, such as approximately 10 vol %, approximately 15 vol %, approximately 20 vol %, approximately 25 vol %, or approximately 30 vol %. The non-cyclic carbonates may each be present in an amount ranging from approximately 5 vol % to approximately 40 vol %, such as approximately 10 vol %, approximately 15 vol %, approximately 20 vol %, approximately 25 vol %, or approximately 30 vol %. As yet another example, in embodiments where the linear ester does not represent the majority of the solvents in the electrolyte, the cyclic carbonate may be present in an amount ranging from approximately 5 vol % to approximately 80 vol %, such as between approximately 10 vol %, and approximately 70 vol %, or between approximately 20 vol % and approximately 60 vol %. The non-cyclic carbonates may each be present in an amount ranging from approximately 5 vol % to approximately 80 vol %, such as between approximately 10 vol %, and approximately 70 vol %, or between approximately 20 vol % and approximately 60 vol %. Example volume percentages for the cyclic carbonates and/or non-cyclic carbonates include approximately 5 vol %, approximately 10 vol %, approximately 20 vol %, approximately 25 vol %, approximately 30 vol %, approximately 40 vol %, approximately 50 vol %, or approximately 60 vol %.

In certain embodiments where multiple non-cyclic carbonates are utilized (e.g., a first non-cyclic carbonate and a second non-cyclic carbonate), the non-cyclic carbonates may, together, represent between approximately 50 vol % and approximately 80 vol % of the total volume of the solvent mixture. As another example, first and second cyclic carbonates may together represent between approximately 10 vol % and approximately 30 vol % of the total volume of the solvent mixture.

The particular chemistry of the electrolyte solvents used in the electrolyte compositions of the present disclosure may depend on a number of factors, including the active materials used for the cathode and anode, the chemistry of the additives used in the electrolyte, and so forth. As one example, it is commonly recognized that EC is used as a cyclic carbonate for battery cells that utilize graphite as an anode active material, since certain electrolytes, such as PC, exfoliate and degrade anodes that utilize graphite as an active material (e.g., via co-intercalation with $Li^+$). Indeed, if EC is not utilized, it has been found that the graphite active material at the anode can quickly degrade. In accordance with one aspect of the present disclosure, EC can be replaced, partially or entirely, by FEC to improve the performance of the battery cell 40 when used in combination with certain other electrolyte materials. This improvement is described in further detail below. On the other hand, battery cells that utilize titanate-based materials as an anode active material may not use EC in certain electrolyte embodiments. Rather, in accordance with another aspect of the present disclosure, it has been found that EC can be replaced, partially or entirely, with PC in battery cells that do not utilize graphite as an anode active material. Indeed, certain formulations using PC as the only cyclic carbonate, described in detail below, have been found to have improved properties with respect to battery cell performance when used in combination with certain other additives.

As one example, the electrolyte solvent or solvents, present as a solvent mixture, may consist essentially of a cyclic carbonate (e.g., FEC, EC, PC), a first non-cyclic carbonate (e.g., EMC), a second non-cyclic carbonate (e.g., DMC), and a linear ester (e.g., MB, MP, PB, EP). The cyclic carbonate may be present in an amount between approximately 5 vol % and approximately 30 vol % based on the total volume of the solvent mixture, the first and second non-cyclic carbonates together may represent between approximately 50 vol % and approximately 80 vol % of the total volume of the solvent mixture, and the linear ester may be present in an amount between approximately 5 vol % and approximately 20 vol %, based on the total volume of the solvent mixture. In certain embodiments, the volume percentage of the cyclic carbonate is greater than or approximately equal to the volume percentage of the linear ester.

As another example, the solvent mixture may include a cyclic carbonate, a non-cyclic carbonate (e.g., EMC, DMC), and a linear ester (e.g., MB, MP, EP), and the cyclic carbonate may consist essentially of FEC (e.g., there may be no other cyclic carbonates present in an amount that would affect the properties of the electrolyte). In certain embodiments in accordance with this example, the solvent mixture consists essentially of FEC, the non-cyclic carbonate, and the linear ester. The FEC may be present in an amount between approximately 5 vol % and approximately 30 vol % based on the total volume of the solvent mixture, the non-cyclic carbonate may be present in an amount between approximately 5 vol % and approximately 30 vol % based on the total volume of the solvent mixture, and the linear ester may be present in an amount between approximately 50 vol % and approximately 70 vol % based on the total volume of the solvent mixture.

As another example, the solvent mixture may consist essentially of a first cyclic carbonate (e.g., FEC, EC, PC), a second cyclic carbonate (e.g., FEC, EC, PC), a non-cyclic carbonate (e.g., EMC, DMC), and a linear ester (e.g., MB, MP, PB, EP). The first and second cyclic carbonates together represent between approximately 10 vol % and approximately 30 vol % of the total volume of the solvent mixture, and the non-cyclic carbonate is present in an amount between approximately 10 vol % and approximately 30 vol % of the total volume of the solvent mixture. The linear ester may be present in an amount between approximately 50 vol % and approximately 70 vol %, based on the total volume of the solvent mixture. In such an embodiment, the volume percentage of the non-cyclic carbonate may be approximately equal to the combined volume percentage of the first and second non-cyclic carbonates, and the volume percentage of the linear ester may be greater than the combined volume percentage of the first and second non-cyclic carbonates.

By way of specific, but non-limiting example, in embodiments where the battery cell 40 includes graphite as an anode active material, an electrolyte solvent mixture may include EC/EMC (30:70 vol %), EC/EMC/MB (20:20:60 vol %), FEC/EMC/MB (20:20:60 vol %), FEC/EMC/PB (20:20:60 vol %), EC/EMC/DMC/MB (20:30:40:10 vol %), FEC/EC/EMC/MB (10:10:20:60 vol %). By way of another specific, but non-limiting example, in embodiments where the battery cell 40 includes LTO or graphite as an anode active material, an electrolyte solvent mixture may include EC/EMC/MB (20:60:20 vol %), EC/EMC/MP (20:60:20 vol %), FEC/EMC/MB (20:20:60 vol %), EC/EMC/DMC/MB (20:30:40:10 vol %), EC/EMC/DMC (20:40:40 vol %), or EC/EMC/DMC/MP (20:30:40:10 vol %). In embodiments where the battery cell 40 includes LTO as an anode active material, an electrolyte solvent mixture may include PC/EMC/DMC/MB (20:30:40:10 vol %) or and PC/EMC/DMC/MB (30:30:30:10 vol %). Again, it should be noted that these are provided as examples, and while certain mixtures do provide better properties than others, are not intended to limit the scope of the present disclosure to these specific combinations. Rather, any and all combinations of any and all of the solvents disclosed above may be utilized.

Electrolyte Additives

Embodiments of the electrolytes disclosed herein also include one or more additives that enable improved cycle and calendar life throughout higher temperature operation (e.g., at temperatures of 45° C. or more), as well as lower temperature operation (e.g., at temperatures of 10° C. or less). In their most general sense, electrolyte additives used in accordance with the present disclosure may serve to stabilize the anode, cathode, or both, when the battery cell 40 is produced. Indeed, in certain embodiments, one or more additives may be utilized within the electrolytes of the present disclosure to form protective films over the anode and cathode, which may be susceptible to degradation during charging and/or discharging, at high temperatures, and so forth. Further still, it is believed that certain of the additives disclosed herein may produce a solid electrolyte interface (SEI) layer at the cathode and/or anode, which can prolong the life of the electrodes. Further, it should also be noted that certain of the solvents disclosed above may form beneficial SEI layers for electrodes, as described in further detail below. In addition, certain of the additives may enhance the lithium kinetics at the anode or cathode (intercalation/deintercalation at the anode or cathode), and may passivate the surface of the cathode or anode. Further still, certain of the additives may sequester certain chemical species generated during the electrochemical processes within the battery cell 40 that would otherwise decompose the electrodes. It should be noted that, oftentimes, high temperature calendar life must be balanced with low temperature performance. That is, additives that serve to stabilize cathodes or anodes at higher temperature can have a deleterious effect on impedance, which is a concern at low temperatures. Certain disclosed embodiments of the electrolytes may enable a good balance of both high temperature calendar life and low temperature performance.

The electrolytes of the present disclosure may utilize one, two, three, or more additives, depending on the chemistry of the anode and cathode, as well as the particular electrolyte solvents and lithium salts utilized. Also, the additives may each be incorporated into the electrolytes of the present disclosure in amounts ranging from between 0.1% by weight (wt %) to 5 wt %, based on the weight of the electrolyte composition. Indeed, the weight percentages provided herein are all intended to denote a weight percentage based on the total weight of the overall electrolyte. In certain embodiments, each of these additives may be included, alone or in combination, at a concentration between approximately 0.5 wt % and approximately 2.0 wt %, such as between approximately 0.5 wt % and approximately 1.5 wt %, or approximately 1 wt %. If the concentration of the one or more additives is too great, the impedance at the anode and/or cathode of the battery cell 40 may detrimentally increase. On the other hand, if the concentration of the one or more additives is too low, the high-temperature longevity of the anode and/or cathode of the battery cell 40 may suffer (e.g., the beneficial properties of the additives may not be realized). In certain embodiments, as noted above, certain additives may be represented in a molarity. For example, certain compositions may include LiDFOB or LiBOB in amounts of between approximately 0.05 M and 0.2 M, such as approximately 0.1 M.

A non-limiting list of example classes of additives include: sultone-based additives, imide-based additives, borate-based additives, cyclic carbonate-based additives, fluorinated cyclic carbonate-based additives, fluorinated ester-based additives, sulfone-based additives, fluorinated borate-based additives, amide-based additives, linear carbonate-based additives, and fluorinated linear carbonate-based additives. A non-limiting list of example additives include: lithium bis(oxalato)borate (LiBOB), vinylene carbonate (VC), propane sultone (PS), lithium bistrifluoromethylsulfonylimide (LiTFSI), lithium bisfluorosulfonyl imide (LiFSI), lithium difluoro(oxalato)borate (LiDFOB) and fluoroethylene carbonate (FEC). Again, each of these additives may affect the performance of the battery cell 40 in different ways. Further, it should be emphasized that the selection of the particular additives for use in the presently disclosed electrolytes is not simply a matter of selection based on their individual properties. Rather, their selection is based on a synergistic effect with the other compounds present within the electrolyte. Indeed, it should be noted that the performance resulting from the selection of specific additives in combination with specific solvent mixtures, as well as their relative amounts, can be very difficult to predict.

For example, as set forth below, it should be noted that an additive mixture may include only selected additives, such as a combination of VC and LiDFOB, or a combination of VC and LiBOB. In certain embodiments, an additive mixture may be considered to consist essentially of VC and LiDFOB, or consist essentially of LiDFOB, where VC and LiDFOB are present as the only additives in the electrolyte, or only LiDFOB is present as an additive in the electrolyte. In certain embodiments, the addition of other additives to certain of the electrolytes disclosed below may have a marked (e.g., deleterious) effect on the performance of the lithium ion battery cells.

Formation of the Electrolyte

In certain embodiments, the electrolyte may be formed by first forming an initial solution of the lithium salt (the main source of lithium ions) in a carbonate and ester solvent mixture, to which a number of additives are added to yield the final electrolyte. In certain other embodiments, such as when an additive is a lithium salt (e.g., LiDFOB), the additive and the lithium salt that is the main source of lithium ions may be provided to the solvent mixture separately or as a mixture. Indeed, the order in which these materials are added to one another may vary, depending on various considerations, such as the processability (e.g. solubility) of certain materials.

Electrolytes produced in accordance with certain embodiments of the present disclosure may utilize any one or a combination of the lithium salts, electrolyte solvents, and electrolyte additives disclosed above. Example electrolyte formulations produced in accordance with certain embodiments of the present disclosure may include, but are not limited to electrolytes with no fluorinated solvents and no fluorinated additives, but including a linear ester solvent in combination with a carbonate solvent (e.g., cyclic and non-cyclic carbonates), as set forth in the following non-limiting list of examples:

1. 1.20M $LiPF_6$+0.10M LiBOB in EC/EMC/MB (20:20:60 vol %)
2. 1.20M $LiPF_6$ in EC/EMC/MB (20:20:60 vol %)+1 wt % PS
3. 1.20M $LiPF_6$ in EC/EMC/MB (20:20:60 vol %)+1 wt % VC
4. 1.20M $LiPF_6$ in EC/EMC/MB (20:20:60 vol %)+1 wt % VC, 1 wt % PS, 0.5 wt % LiBOB
5. 1.20M $LiPF_6$ in EC/EMC/MB (20:20:60 vol %)+1 wt % VC, 0.5 wt % LiBOB
6. 1.20M $LiPF_6$ in EC/EMC/DMC/MB (20:30:40:10 vol %)+1 wt % VC, 0.5 wt % LiBOB
7. 1.20M $LiPF_6$ in EC/EMC/MB (20:60:20 vol %)+1 wt % VC
8. 1.20M $LiPF_6$ in EC/EMC/MP (20:60:20 vol %)+1 wt % VC
9. 1.20M $LiPF_6$ in EC/EMC/DMC/MB (20:30:40:10 vol %)
10. 1.20M $LiPF_6$ in EC/EMC/DMC/MB (30:30:30:10 vol %)+1 wt % VC+0.5 wt % LiBOB
11. 1.20M $LiPF_6$ in EC/EMC/DMC/MP (20:30:40:10 vol %))+1 wt % VC+0.5 wt % LiBOB Electrolyte formulations produced in accordance with other embodiments of the present disclosure may include, but are not limited to electrolytes that incorporate FEC, either as a replacement for EC or in addition to EC (e.g., as an additive). Such formulations may also include a linear ester solvent in combination with a carbonate solvent (e.g., cyclic and non-cyclic carbonates), as set forth in the following non-limiting list of examples:
12. 1.20M LiPF$_6$ in EC/EMC/MB (20:20:60 vol %)+4 wt % FEC
13. 1.20M LiPF$_6$ in FEC/EC/EMC/MB (10:10:20:60 vol %), 1 wt % VC, 0.5 wt % LiBOB
14. 1.20M LiPF$_6$ in FEC/EMC/MB (20:20:60 vol %)+1 wt % VC, 0.5 wt % LiBOB In still further embodiments of the present disclosure, electrolytes that incorporate FEC, or EC, or both, may also include LiDFOB as an additive. The LiDFOB may be provided in combination with another lithium salt as measured by molarity, or may be provided as an additive in weight percentage. Such formulations may also include a linear ester solvent in combination with a carbonate solvent (e.g., cyclic and non-cyclic carbonates), as set forth in the following non-limiting list of examples:
15. 1.20M LiPF$_6$+0.10M LiDFOB in EC/EMC/MB (20:20:60 vol %)
16. 1.20M LiPF$_6$ in EC/EMC/DMC/MB (20:30:40:10 vol %), 1 wt % VC, 0.5 wt % LiDFOB
17. 1.20M LiPF$_6$+0.10M LiDFOB in FEC/EMC/MB (20:20:60 vol %)
18. 1.20M LiPF$_6$+0.10 M LiDFOB in FEC/EMC/PB (20:20:60 vol %)
19. 1.20M LiPF$_6$+0.10M LiDFOB in FEC/EMC/MP (20:20:60 vol %)
20. 1.20M LiPF$_6$ in FEC/EC/EMC/MB (10:10:20:60 vol %), 1 wt % VC, 0.5 wt % LiDFOB
21. 1.20M LiPF$_6$ in FEC/EMC/MB (20:20:60 vol %)+1 wt % VC, 1 wt % PS, 0.5 wt % LiDFOB While the formulations set forth above may be useful for battery cells that utilize graphite or other materials (e.g., LTO) as an anode active material, in certain embodiments, it may be desirable to replace EC and FEC with another cyclic carbonate, such as PC, where possible. It has been found that certain battery cells that utilize LTO as an anode active material may utilize such solvent mixtures without undergoing graphite-like degradation due to an absence of EC or FEC. Indeed, certain of the disclosed embodiments of battery cell electrolytes may include a solvent mixture using PC instead of or in addition to EC or FEC, with fluorinated additives (e.g., LiDFOB, LiTFSI, LiFSI) and/or non-fluorinated additives (e.g., LiBOB, VC). Such formulations may also include a linear ester solvent in combination with other carbonate solvents (e.g., another cyclic carbonate and/or one or more non-cyclic carbonates), as set forth in the following non-limiting list of examples:
22. 1.20M LiPF$_6$ in PC/EMC/DMC/MB (20:30:40:10)+1 wt % LiBOB
23. 1.20M LiPF$_6$ in PC/EMC/DMC/MB (20:30:40:10)+1 wt % VC+0.5 wt % LiBOB
24. 1.20M LiPF$_6$ in PC/EMC/DMC/MB (30:30:30:10)+1 wt % VC+0.5 wt % LiBOB
25. 1.20M LiPF$_6$ in PC/EMC/DMC/MB (20:30:40:10)+1 wt % LiDFOB
26. 1.20M LiPF$_6$ in PC/EMC/DMC/MB (20:30:40:10)+1 wt % LiFSI
27. 1.20M LiPF$_6$ in PC/EMC/DMC/MB (20:30:40:10)+1 wt % LiTFSI Again, the electrolytes produced in accordance with the present disclosure may, in some embodiments, be particularly useful in LiNi$_{1/3}$Mn$_{1/3}$Co$_{1/3}$O$_2$ (NMC)/graphite Li-ion battery cells (i.e., where the cathode active material includes NMC, the anode active material includes graphite), and the electrolyte solvents include at least EC or FEC. Further, the additives of such formulations may, in certain embodiments, include LiDFOB, either alone or in combination with other additives. However, it should be noted that the components set forth above may also be useful for other battery cell chemistries. Indeed, the electrolytes produced in accordance with the present disclosure may, in certain other embodiments, be particularly useful in NMC/Li$_4$Ti$_5$O$_{12}$ (LTO) Li-ion battery cells (i.e., where the cathode active material includes NMC and the anode active material includes LTO). Such formulations may include electrolyte solvent mixtures that use PC instead of EC or FEC, or PC in addition to EC or FEC. Further, the additives of such formulations may, in certain embodiments, include LiDFOB, either alone or in combination with other additives. The formulations provided above, however, are merely provided as examples, and are not intended to limit the scope of the disclosed formulations.

To help illustrate the effect of certain solvent and solvent/additive combinations, several graphical representations are presented in FIGS. 5-45, which present battery cell and electrode performance data for various electrolytes produced in accordance with certain embodiments of the present disclosure. Further, while presented in the context of certain battery cell chemistries, the formulations disclosed above may have utility in other Li-ion battery cell chemistries that use different cathode and anode active material combinations.

Figure 5:
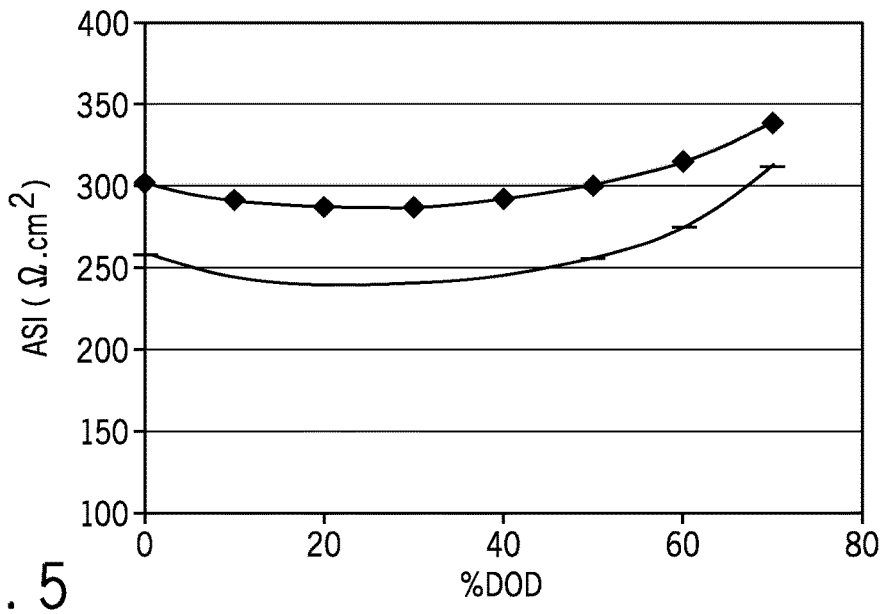
FIG. 5 is a plot of area specific impedance (ASI) as a function of percent depth of discharge (% DOD) for battery cells having EC/EMC/MB or FEC/EMC/MB in 20/20/60 vol %, with 1 wt % VC and 0.5 wt % LiBOB.

In certain embodiments, FEC, when used as a co-solvent in place of EC, may produce an SEI with lower resistance and better lithium kinetics for NMC/graphite battery cells (e.g., at the graphite anode). An example of this is shown in FIG. 5, which depicts a plot 80 of area specific impedance (ASI) as a function of percent depth of discharge (% DOD) for battery cells having EC/EMC/MB or FEC/EMC/MB in 20/20/60 vol %, with 1 wt % VC and 0.5 wt % LiBOB, with the data collected at −25° C. As can be seen, the use of FEC in place of EC results in lower ASI throughout the charge range of the battery cell for the formulation.

Figure 6:
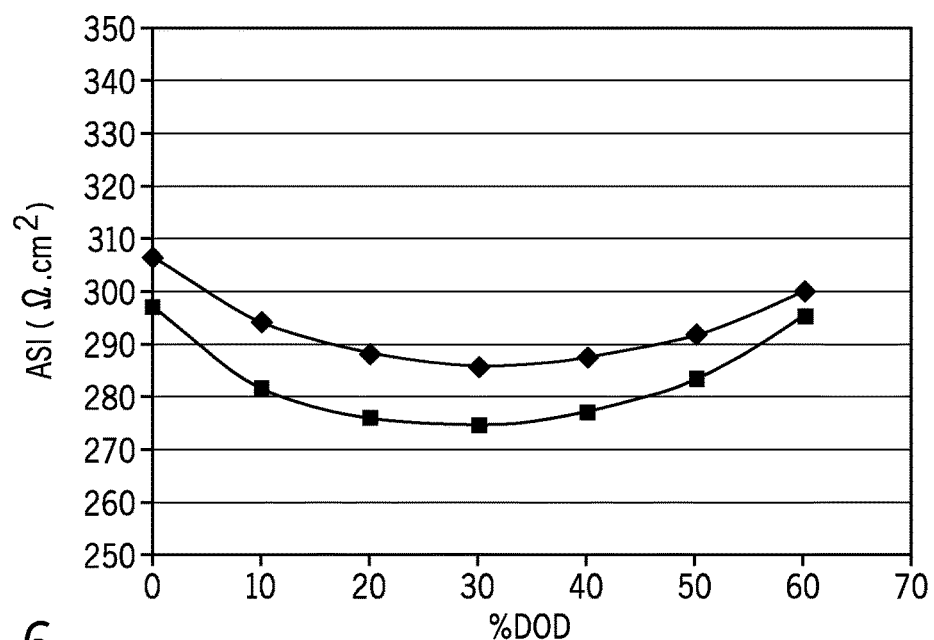
FIG. 6 is a plot of ASI as a function of % DOD obtained at −25° C. for NMC/graphite battery cells having EC/EMC/DMC/MB (20/30/40/10 vol %), with 1 wt % VC and 0.5 wt % LiBOB or LiDFOB.

In a similar fashion, in certain embodiments, it is believed that LiDFOB may produce a thinner and more conductive SEI layer compared to LiBOB. For example, FIG. 6 depicts a plot 90 of ASI as a function of % DOD for NMC/graphite battery cells having EC/EMC/DMC/MB (20/30/40/10 vol %), with 1 wt % VC and 0.5 wt % LiBOB or LiDFOB, with the data collected at −25° C. As can be seen, the use of LiDFOB in place of LiBOB results in lower ASI throughout the charge range of the battery cell for the formulation.

Figure 7:
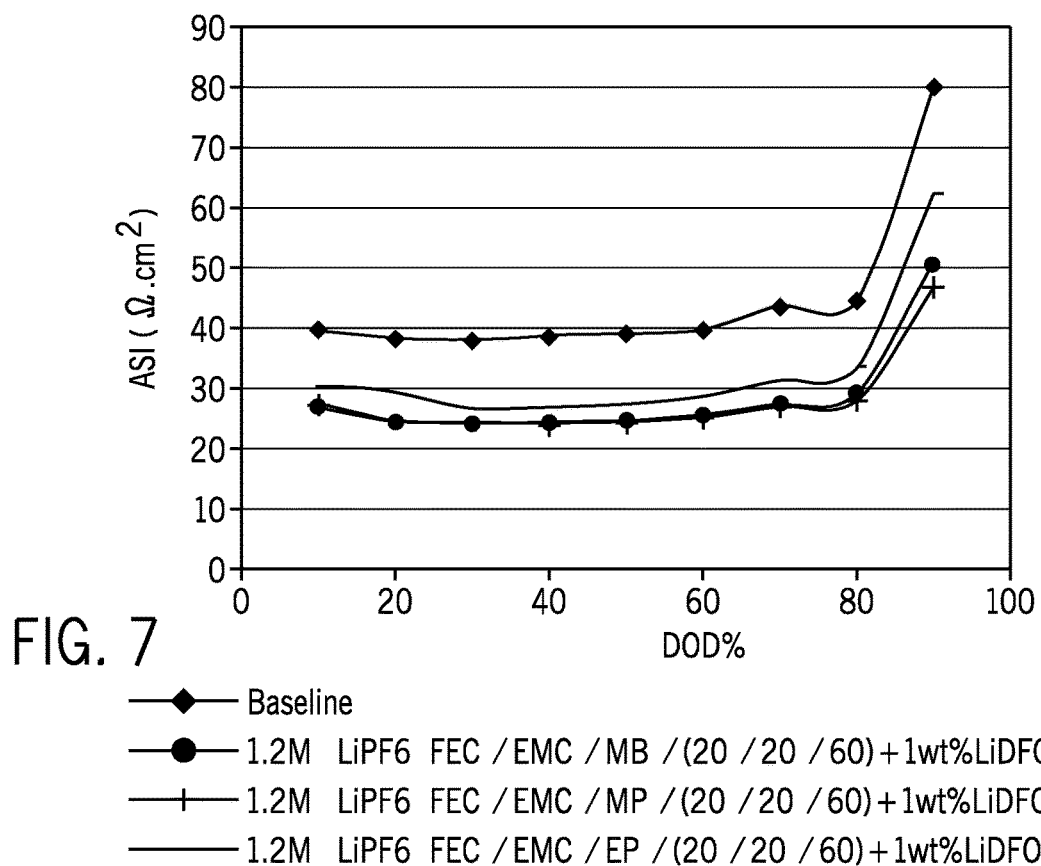
FIGS. 7 and 8 are graphs of ASI as a function of % DOD obtained at temperatures of 25° C. and −25° C., respectively, for different battery cells having different electrolyte formulations, where each formulation includes LiDFOB as an additive.
Figure 8:
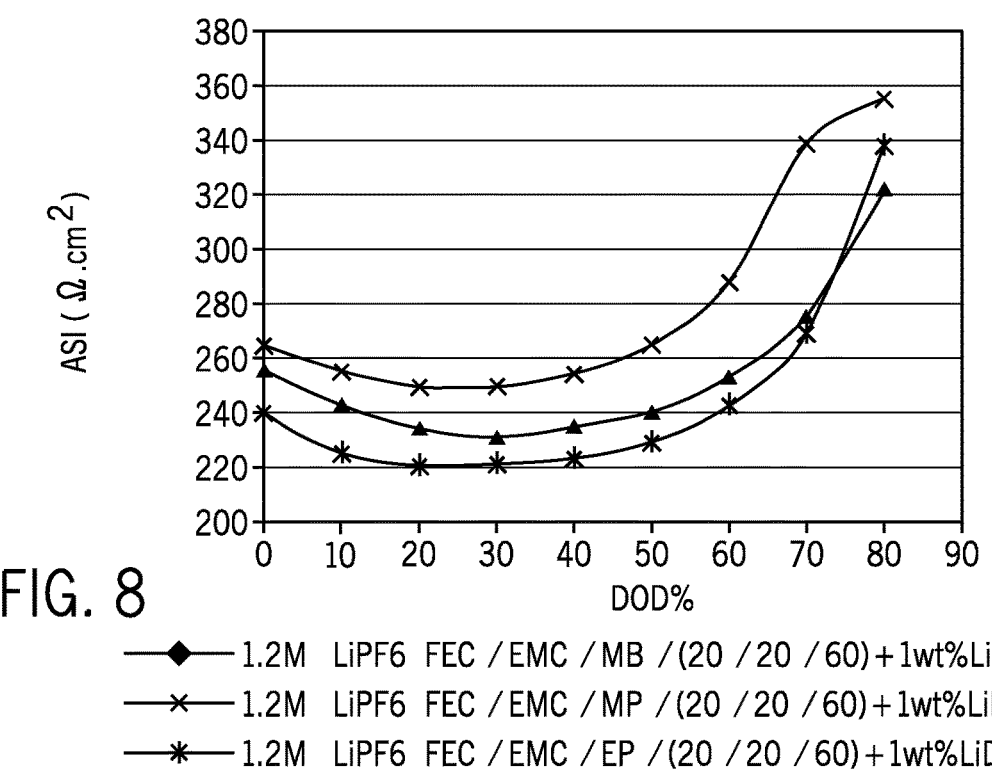

In accordance with an aspect of the present disclosure, FEC and LiDFOB may also be used in combination. However, it should be noted that the performance ultimately obtained for a particular battery cell is may depend on the combined use of FEC and LiDFOB as well as the particular materials selected for use as the solvents of the electrolyte, among other considerations. For example, as shown in FIGS. 7 and 8, the use of different linear solvents may have an effect on the high temperature performance and the low temperature performance of battery cells incorporating FEC and LiDFOB. More specifically, FIG. 7 depicts a graph 100 of ASI as a function of % DOD for different battery cell electrolyte formulations obtained at a temperature of 25° C., where each formulation includes LiDFOB as an additive, and 1.2M LiPF$_6$ in a solvent mixture of FEC/EMC/linear ester (20:20:60 vol %). The baseline formulation is 1.2M LiPF$_6$ in EC/EMC (20:80 vol %) (no ester)+1 wt % VC (no fluorinated additive). As shown in the graph 110, MP and MB, when used as the linear ester, provide slightly better performance at room temperature compared to EP.

FIG. 8 depicts a graph 110 of ASI as a function of % DOD for battery cells with the same formulations as set forth in FIG. 7, but obtained at a relatively low temperature of −25° C. As shown in the graph 120, EP and MB both provide slightly better performance compared to MP, with EP providing the best performance when used in the formulation as the linear ester.

In view of the foregoing, it may be appreciated that performance evaluation of battery cells may be viewed from the standpoint of low temperature performance and high temperature performance, with both being subject to change over time. This change may be due, for example, to electrode degradation, electrolyte degradation, and other processes. Accordingly, it is recognized that it may be desirable for electrolytes to enable a desirable balance between low and high temperature performance, with a reasonable calendar life.

As an example of how differences in electrolyte formulations may manifest based on a variety of factors (e.g., temperature, charge/discharge rates), presented below are tables and graphs generated from data obtained experimentally on NMC/graphite and NMC/LTO battery cells with different electrolytes. First, data obtained for NMC/graphite cells will be presented.

Formation Studies of Example Electrolytes in NMC/Graphite Battery Cells

Table 1 presents a set of data obtained for various NMC/graphite battery cells having different electrolyte formulations, including a baseline electrolyte having only carbonate solvents ("Cell JC01"), and various other solvents incorporating methyl butyrate as a linear ester solvent in combination with carbonate solvents and different additives, such as fluorinated carbonate solvents (e.g., FEC) and/or fluorinated additives (e.g., LiDFOB). The additives are generally intended to improve high temperature resilience and cycle life performance of the cells, while the use of the linear ester may provide enhanced performance at low temperatures (e.g., −20° C.). The data set forth below was obtained by constructing three electrode cells (including a third reference lithium electrode) and performing the various measurements. The battery cells included double sided anodes that were 1.75" wide and 7.00" long (141.1 cm$^2$, double sided) and displayed a typical mass of 2.09 g, where the cathodes were 1.75" wide and 6.25" long (158.1 cm$^2$, double sided) and displayed a typical mass of 1.36 g.

TABLE 1

Formation Characteristics of NMC/graphite Battery Cells with Different Electrolytes

| Cell Number | Electrolyte Type | Charge Capacity (Ah) 1st Cycle | Discharge Capacity (Ah) 1st Cycle | Irreversible Capacity (1st Cycle) | Coulombic Efficiency (1st Cycle) | Charge Capacity (Ah) 5th Cycle | Reversible Capacity (Ah) 5th Cycle | Cumulative Irreversible Capacity (1st-5th Cycle) | Coulombic Efficiency (5th Cycle) |
|---|---|---|---|---|---|---|---|---|---|
| Cell JC01 | 1.2M LiPF$_6$ in EC + EMC (30:70 vol %) | 0.1501 | 0.1329 | 0.017 | 88.52 | 0.1305 | 0.1289 | 0.0254 | 98.79 |
| Cell JC02 | 1.2M LiPF$_6$ + 0.10M LiBOB in EC + EMC + MB (20:20:60 vol %) | 0.1509 | 0.1354 | 0.016 | 89.67 | 0.1267 | 0.1247 | 0.0249 | 98.46 |
| Cell JC04 | 1.2M LiPF$_6$ in EC + EMC + MB (20:20:60 vol %) + 4 wt % FEC | 0.1534 | 0.1286 | 0.025 | 83.89 | 0.1293 | 0.1276 | 0.0341 | 98.69 |
| Cell JC05 | 1.2M LiPF$_6$ + 0.10M LiDFOB in FEC + EMC + MB (20:20:60 vol %) | 0.1603 | 0.1305 | 0.030 | 81.40 | 0.1325 | 0.1306 | 0.0384 | 98.56 |
| Cell JC06 | 1.20M LiPF$_6$ + 0.10M LiDFOB in EC + EMC + MB (20:20:60 vol %) | 0.1537 | 0.1309 | 0.023 | 85.19 | 0.1251 | 0.1224 | 0.0362 | 97.80 |
| Cell JC07 | 1.20M LiPF$_6$ in EC + EMC + MB (20:20:60 vol %) + 1 wt % PS | 0.1543 | 0.1306 | 0.024 | 84.63 | 0.1226 | 0.1190 | 0.0421 | 97.06 |
| Cell JC08 | 1.20M LiPF$_6$ in EC + EMC + MB (20:20:60 vol %) + 1 wt % VC | 0.1538 | 0.1313 | 0.022 | 85.40 | 0.1247 | 0.1224 | 0.0348 | 98.16 |
| Cell JC09 | 1.20M LiPF$_6$ + 0.10M LiDFOB in FEC + EMC + PB (20:20:60 vol %) | 0.1519 | 0.1289 | 0.023 | 84.86 | 0.1253 | 0.1234 | 0.0332 | 98.49 |
| Cell JC10 | 1.20M LiPF$_6$ in EC + EMC + MB (20:20:60 vol %) + 1 wt % VC, 1 wt % PS, 0.5 wt % LiBOB | 0.1545 | 0.1313 | 0.023 | 85.02 | 0.1213 | 0.1186 | 0.0379 | 97.79 |
| Cell JC11 | 1.20M LiPF$_6$ in FEC + EMC + MB (20:20:60 vol %) + 1 wt % VC, 1 wt % PS, 0.5 wt % LiDFOB | 0.1578 | 0.1330 | 0.025 | 84.30 | 0.1254 | 0.1224 | 0.0389 | 97.67 |

As may be appreciated with reference to Table 1, generally good performance characteristics were observed after completing five formation cycles with the electrolytes evaluated, as determined from the coulombic efficiency on the first cycle (being an indication of the inherent stability and the electrode film forming process) and the cumulative irreversible capacity losses. As shown, the cumulative irreversible capacity loss for the battery cells with the electrolytes utilizing LiBOB was very comparable with the baseline all carbonate blend, suggesting that it participates in efficient SEI film formation. From the data, LiDFOB and FEC result in modestly more irreversible capacity loss. While capacity losses during formation are generally not desirable (because it is associated with high film resistance and impedance growth), sacrificial electrolyte additives are generally understood to result in such losses. Accordingly, the capacity losses noted above in Table 1 for LiDFOB and FEC may be acceptable, since they are balanced with subsequent interfacial stability of the electrodes (e.g., stability at higher temperatures), which is believed to prolong the calendar life of the battery cells. Indeed, as set forth below, the advantages associated with using LiDFOB in place of LiBOB may be manifest in different charging, discharging, and temperature regimes. Indeed, electrochemical analysis throughout the life of the battery cells noted above suggests that LiDFOB and FEC may provide enhanced performance characteristics compared to other additives and compared to the use of LiBOB and EC (their non-fluorinated counterparts).

Low Temperature Studies of Example Electrolytes in Three-Electrode NMC/Graphite Cylindrical Battery Cells The battery cells described above were subjected to systematic discharge rate characterization testing over a wide temperature range, with discharge rates ranging from C/20 to 6C at some temperatures. These tests included charging the cells at ambient temperature and then soaking the cells for at least four hours prior to discharging at the desired temperatures. The results of these studies are summarized in Table 2 shown below.

TABLE 2

Low Temperature Discharge Characteristics of NMC/graphite Battery Cells with Different Electrolytes

| | | JC-01 | | JC-02 | | JC-04 | | JC-05 | | JC-06 | | JC-07 | |
|---|---|---|---|---|---|---|---|---|---|---|---|---|---|
| | | \multicolumn{12}{c}{Electrolyte} |
| | | 1.2M $LiPF_6$ in EC + EMC (30:70 vol %) | | 1.20M $LiPF_6$ + 0.10M LiBOB in EC + EMC + MB (20:20:60 vol %) | | 1.2M $LiPF_6$ in EC + EMC + MB (20:20:60 vol %) + 4% FEC | | 1.20M $LiPF_6$ + 0.10M LiDFOB in FEC + EMC + MB (20:20:60 vol %) | | 1.2M $LiPF_6$ + 0.10M LiDFOB in EC + EMC + MB (20:20:60 vol %) | | 1.2M $LiPF_6$ in EC + EMC + MB (20:20:60 vol %) + 1 wt % PS | |
| Temp. | Discharge Rate | Capacity (Ah) | Percent (%) | Capacity (Ah) | Percent (%) | Capacity (Ah) | Percent (%) | Capacity (Ah) | Percent (%) | Capacity (Ah) | Percent (%) | Capacity (Ah) | Percent (%) |
| 20° C. | C/20 | 0.12890 | 100.00 | 0.12474 | 100.00 | 0.12765 | 100.00 | 0.13055 | 100.00 | 0.12237 | 100.00 | 0.11902 | 100.00 |
| -20° C. | C/20 | 0.10830 | 84.02 | 0.10450 | 83.77 | 0.10677 | 83.65 | 0.11250 | 86.17 | 0.09791 | 80.01 | 0.09966 | 83.73 |
| | C/5 | 0.10466 | 81.19 | 0.10042 | 80.50 | 0.09602 | 75.22 | 0.10250 | 78.51 | 0.08438 | 68.95 | 0.09159 | 76.95 |
| | C/2 | 0.09233 | 71.62 | 0.08625 | 69.14 | 0.08459 | 66.27 | 0.09101 | 69.71 | 0.07557 | 61.75 | 0.08357 | 70.21 |
| | 1.0 C | 0.08305 | 64.43 | 0.07786 | 62.41 | 0.07633 | 59.80 | 0.08274 | 63.38 | 0.06911 | 56.47 | 0.07757 | 65.17 |
| | 2.0 C | 0.07179 | 55.69 | 0.06921 | 55.48 | 0.06762 | 52.97 | 0.07416 | 56.81 | 0.06270 | 51.24 | 0.07118 | 59.80 |
| | 3.0 C | 0.04548 | 35.28 | 0.06178 | 49.52 | 0.06053 | 47.42 | 0.06861 | 52.56 | 0.05706 | 46.62 | 0.06416 | 53.91 |
| | 4.0 C | 0.02005 | 15.56 | 0.04675 | 37.48 | 0.04746 | 37.18 | 0.06478 | 49.62 | 0.03583 | 29.28 | 0.04511 | 37.90 |
| | 5.0 C | 0.01588 | 12.32 | 0.02631 | 21.09 | 0.02418 | 18.94 | 0.05959 | 45.65 | 0.01668 | 13.63 | 0.02457 | 20.65 |
| | 6.0 C | 0.01349 | 10.46 | 0.01686 | 13.52 | 0.01727 | 13.53 | 0.02920 | 22.36 | 0.01271 | 10.38 | 0.01753 | 14.73 |
| -30° C. | C/20 | 0.09564 | 74.19 | 0.09123 | 73.13 | 0.09528 | 74.64 | 0.10034 | 76.86 | 0.08223 | 67.20 | 0.08728 | 73.33 |
| | C/5 | 0.08431 | 65.41 | 0.07954 | 63.76 | 0.07906 | 61.94 | 0.08562 | 65.58 | 0.07064 | 57.73 | 0.07838 | 65.86 |
| | C/2 | 0.07395 | 57.37 | 0.06934 | 55.58 | 0.06913 | 54.15 | 0.07624 | 58.40 | 0.06215 | 50.79 | 0.06933 | 58.25 |
| | 1.0 C | 0.06017 | 46.68 | 0.06201 | 49.71 | 0.05995 | 46.97 | 0.06882 | 52.72 | 0.05486 | 44.83 | 0.06187 | 51.99 |
| | 2.0 C | 0.01963 | 15.23 | 0.03901 | 31.27 | 0.03845 | 30.12 | 0.05789 | 44.34 | 0.03571 | 29.18 | 0.04102 | 34.46 |
| | 3.0 C | 0.01045 | 8.11 | 0.01365 | 10.94 | 0.01420 | 11.12 | 0.04862 | 37.24 | 0.01577 | 12.88 | 0.01911 | 16.05 |
| | 4.0 C | 0.00695 | 5.39 | 0.00617 | 4.94 | 0.00784 | 6.14 | 0.01902 | 14.57 | 0.01070 | 8.75 | 0.01211 | 10.17 |
| | 5.0 C | 0.00489 | 3.80 | 0.00319 | 2.55 | 0.00527 | 4.13 | 0.01173 | 8.99 | 0.00829 | 6.78 | 0.00924 | 7.76 |
| | 6.0 C | 0.00246 | 1.91 | 0.00023 | 0.18 | 0.00285 | 2.23 | 0.00857 | 6.57 | 0.00675 | 5.52 | 0.00675 | 5.67 |
| -40° C. | C/20 | 0.05613 | 43.54 | 0.06219 | 49.86 | 0.05222 | 40.91 | 0.07305 | 55.96 | 0.06687 | 54.64 | 0.06861 | 57.65 |
| | C/5 | 0.02935 | 22.77 | 0.04903 | 39.30 | 0.03209 | 25.14 | 0.05457 | 41.80 | 0.05376 | 43.93 | 0.05792 | 48.67 |
| | C/2 | 0.01357 | 10.53 | 0.03540 | 28.38 | 0.01753 | 13.74 | 0.04224 | 32.35 | 0.03884 | 31.74 | 0.04649 | 39.06 |
| | 1.0 C | 0.00417 | 3.24 | 0.01238 | 9.92 | 0.00522 | 4.09 | 0.02809 | 21.52 | 0.02213 | 18.09 | 0.02456 | 20.63 |
| | 2.0 C | 0.00085 | 0.66 | 0.00109 | 0.87 | 0.00131 | 1.02 | 0.00510 | 3.90 | 0.00772 | 6.31 | 0.00735 | 6.17 |
| | 3.0 C | 0.00056 | 0.43 | 0.00076 | 0.61 | 0.00024 | 0.19 | 0.00080 | 0.61 | 0.00366 | 2.99 | 0.00361 | 3.03 |

TABLE 2-continued

Low Temperature Discharge Characteristics of NMC/graphite Battery Cells with Different Electrolytes

| | | Cell | | | | | | | |
|---|---|---|---|---|---|---|---|---|---|
| | | JC-08 | | JC-09 | | JC-10 | | JC-11 | |
| | | Electrolyte | | | | | | | |
| | | 1.2M LiPF$_6$ in EC + EMC + MB (20:20:60 vol %) + 1 wt % VC | | 1.20M LiPF$_6$ + 0.10M LiDFOB in FEC + EMC + PB (20:20:60) | | 1.20M LiPF$_6$ in EC + EMC + MB (20:20:60) + 1 wt % VC, 1 wt % PS, 0.5 wt % LiBOB | | 1.20M LiPF$_6$ in FEC + EMC + MB (20:20:60) + 1 wt % VC, 1 wt % PS, 0.5 wt % LiDFOB | |
| Temp. | Discharge Rate | Capacity (Ah) | Percent (%) | Capacity (Ah) | Percent (%) | Capacity (Ah) | Percent (%) | Capacity (Ah) | Percent (%) |
| 20° C. | C/20 | 0.12238 | 100.00 | 0.12336 | 100.00 | 0.11860 | 100.00 | 0.12245 | 103.25 |
| −20° C. | C/20 | 0.10237 | 83.65 | 0.10827 | 87.77 | 0.09510 | 80.19 | 0.09630 | 81.20 |
| | C/5 | 0.09305 | 76.03 | 0.09490 | 76.93 | 0.08228 | 69.38 | 0.08357 | 70.46 |
| | C/2 | 0.08575 | 70.07 | 0.08399 | 68.08 | 0.07328 | 61.79 | 0.07504 | 63.27 |
| | 1.0 C | 0.08005 | 65.41 | 0.07537 | 61.10 | 0.06667 | 56.22 | 0.06852 | 57.78 |
| | 2.0 C | 0.07416 | 60.59 | 0.06685 | 54.19 | 0.05996 | 50.56 | 0.06140 | 51.77 |
| | 3.0 C | 0.06919 | 56.53 | 0.05151 | 41.75 | 0.05389 | 45.44 | 0.05581 | 47.06 |
| | 4.0 C | 0.05991 | 48.96 | 0.01662 | 13.47 | 0.02774 | 23.39 | 0.04480 | 37.77 |
| | 5.0 C | 0.02858 | 23.35 | 0.01238 | 10.03 | 0.01500 | 12.65 | 0.02045 | 17.25 |
| | 6.0 C | 0.01894 | 15.47 | 0.01086 | 8.80 | 0.01174 | 9.90 | 0.01304 | 10.99 |
| −30° C. | C/20 | 0.09199 | 75.17 | 0.09366 | 75.92 | 0.08060 | 67.96 | 0.08191 | 69.07 |
| | C/5 | 0.08277 | 67.63 | 0.08017 | 64.99 | 0.06988 | 58.92 | 0.07082 | 59.72 |
| | C/2 | 0.07448 | 60.86 | 0.07026 | 56.96 | 0.06223 | 52.47 | 0.06143 | 51.80 |
| | 1.0 C | 0.06806 | 55.61 | 0.06190 | 50.18 | 0.05509 | 46.45 | 0.05418 | 45.69 |
| | 2.0 C | 0.05622 | 45.94 | 0.03437 | 27.86 | 0.03984 | 33.59 | 0.03994 | 33.68 |
| | 3.0 C | 0.03478 | 28.42 | 0.01177 | 9.54 | 0.01426 | 12.02 | 0.01447 | 12.20 |
| | 4.0 C | 0.01657 | 13.54 | 0.00885 | 7.18 | 0.00883 | 7.44 | 0.00873 | 7.36 |
| | 5.0 C | 0.01163 | 9.51 | 0.00724 | 5.87 | 0.00608 | 5.12 | 0.00649 | 5.48 |
| | 6.0 C | 0.00881 | 7.20 | 0.00570 | 4.62 | 0.00406 | 3.42 | 0.00512 | 4.31 |
| −40° C. | C/20 | 0.07896 | 64.52 | 0.07759 | 62.89 | 0.06710 | 56.58 | 0.06690 | 56.41 |
| | C/5 | 0.06644 | 54.29 | 0.06106 | 49.50 | 0.05383 | 45.39 | 0.05353 | 45.14 |
| | C/2 | 0.05528 | 45.17 | 0.04851 | 39.33 | 0.04166 | 35.13 | 0.04171 | 35.16 |
| | 1.0C | 0.04522 | 36.95 | 0.03513 | 28.48 | 0.02471 | 20.83 | 0.02623 | 22.12 |
| | 2.0 C | 0.01484 | 12.13 | 0.00750 | 6.08 | 0.00478 | 4.03 | 0.00541 | 4.56 |
| | 3.0 C | 0.00516 | 4.21 | 0.00355 | 2.87 | 0.00064 | 0.54 | 0.00203 | 1.71 |

Figure 9:
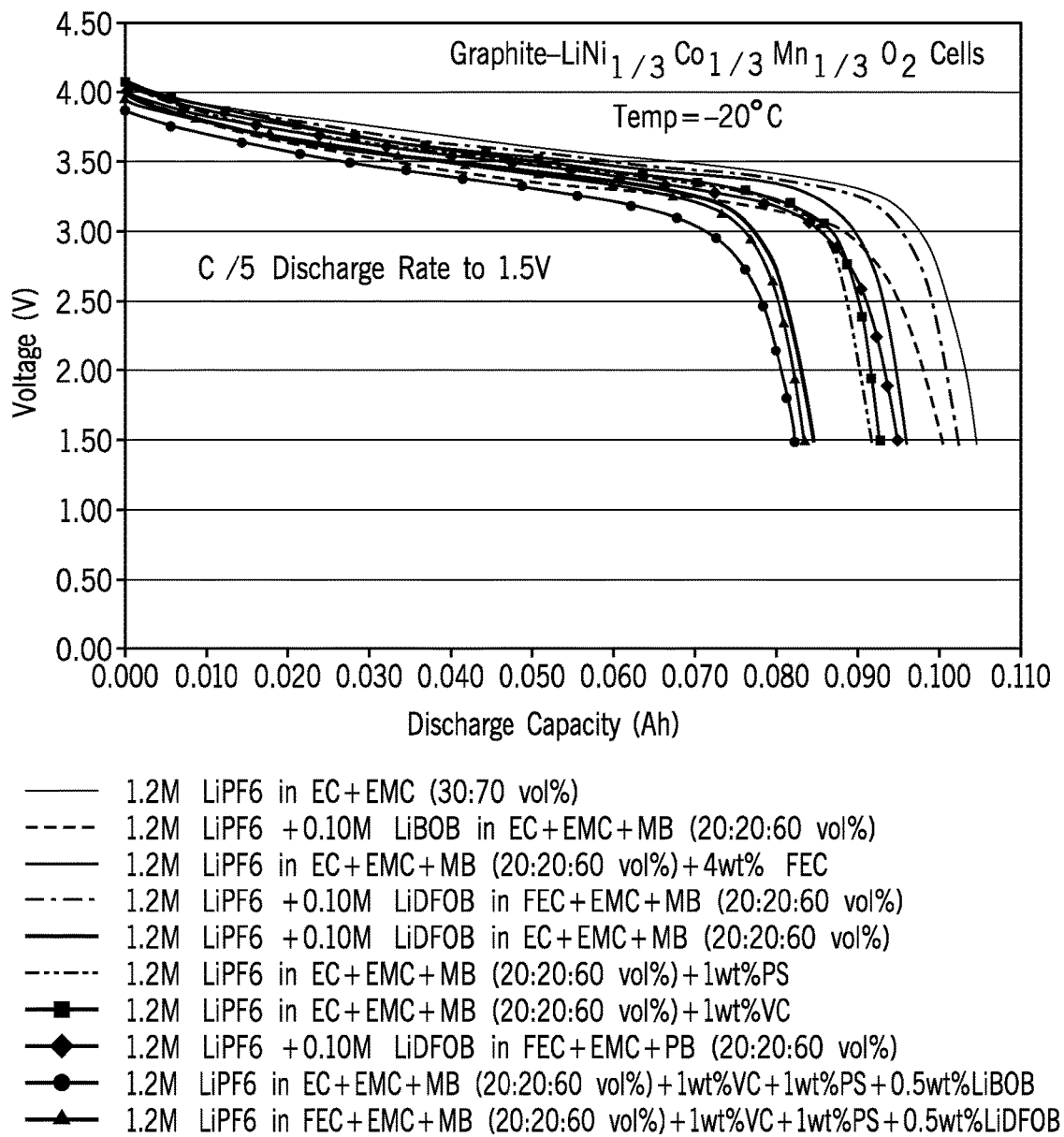
FIGS. 9 and 10 are plots of operating voltage as a function of discharge capacity obtained at −20° C. at a C/5 discharge rate and a 1C discharge rate, respectively, for a plurality of NMC/graphite battery cells having different electrolyte formulations.

In general, at more moderate rates and at warmer temperatures (e.g., 20° C.) all of the electrolytes resulted in similar characteristics in terms of the capacity delivered. When the cells were evaluated at a C/5 discharge rate at −20° C., as shown in FIG. 9, the battery cell containing the baseline all carbonate-based electrolyte (1.0M LiPF$_6$ in EC+EMC (30:70 vol %) and the battery cell possessing the 1.0M LiPF$_6$+0.10M LiDFOB in FEC+EMC+MB (20:60:20 vol %) delivered the highest discharge capacity and highest operating voltage throughout the discharge. The battery cell containing a comparable MB-based electrolyte with LiBOB instead of LiDFOB (and EC rather than FEC) delivered comparable capacity, but displayed somewhat lower operating voltage throughout the discharge. Further, for the electrolytes containing LiDFOB where either EC or FEC is employed as the cyclic carbonate, the EC-based variant delivered much lower capacity at these moderate discharge rates.

Figure 10:
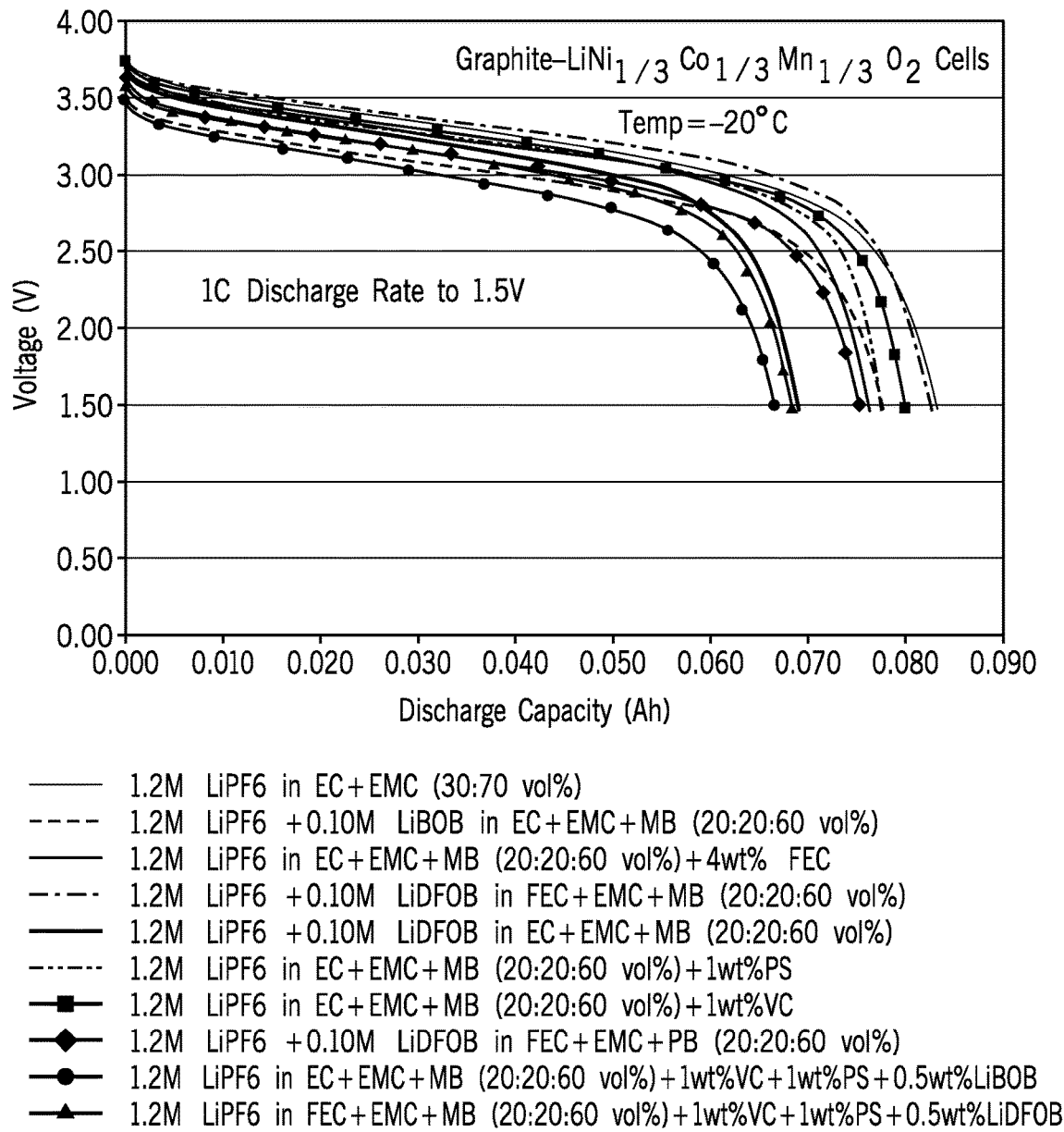
Figure 11:
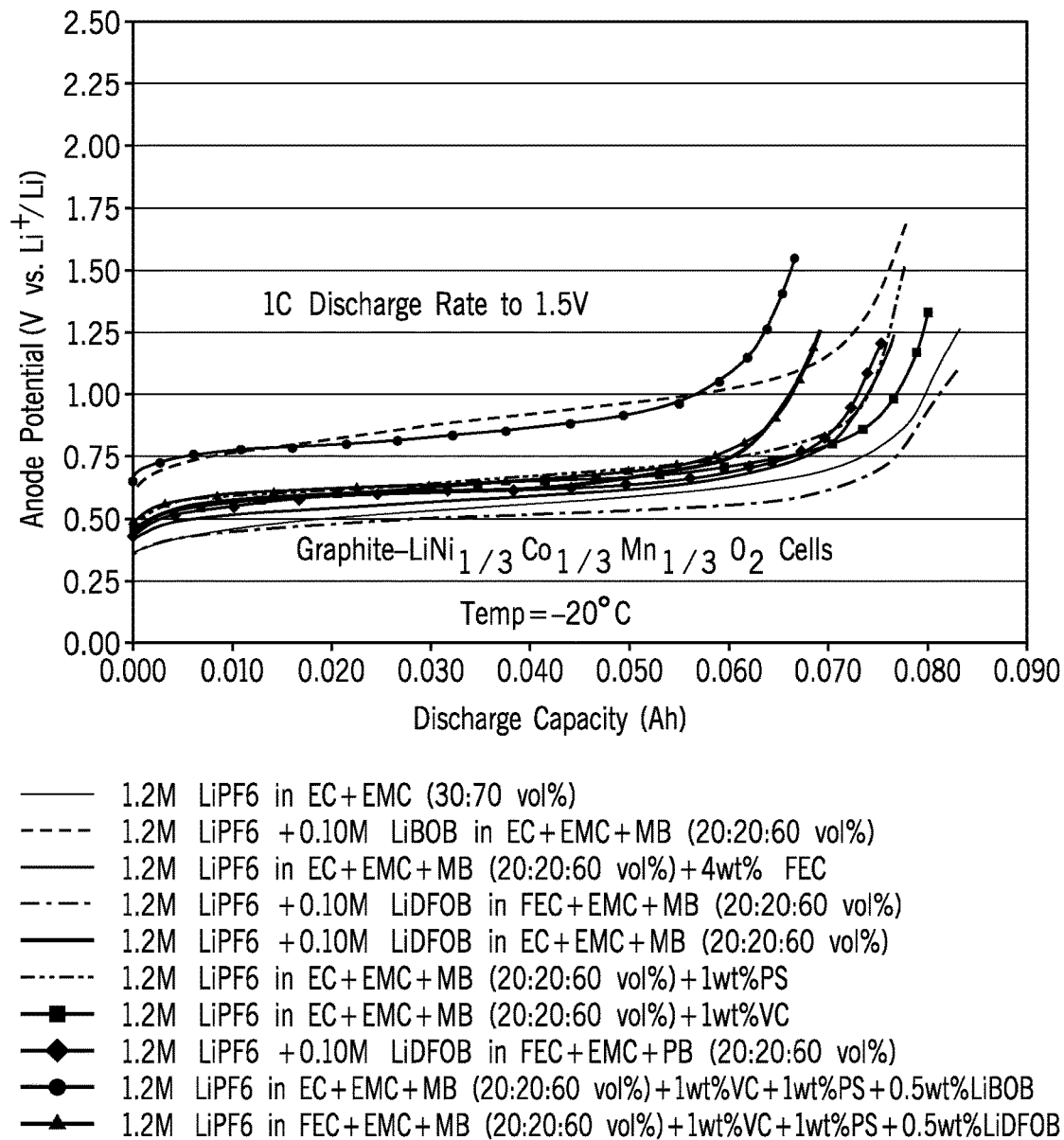
FIGS. 11 and 12 are plots of corresponding anode potential and cathode potential, respectively, for the battery cells having the different electrolyte formulations set forth in FIGS. 9 and 10.
Figure 12:
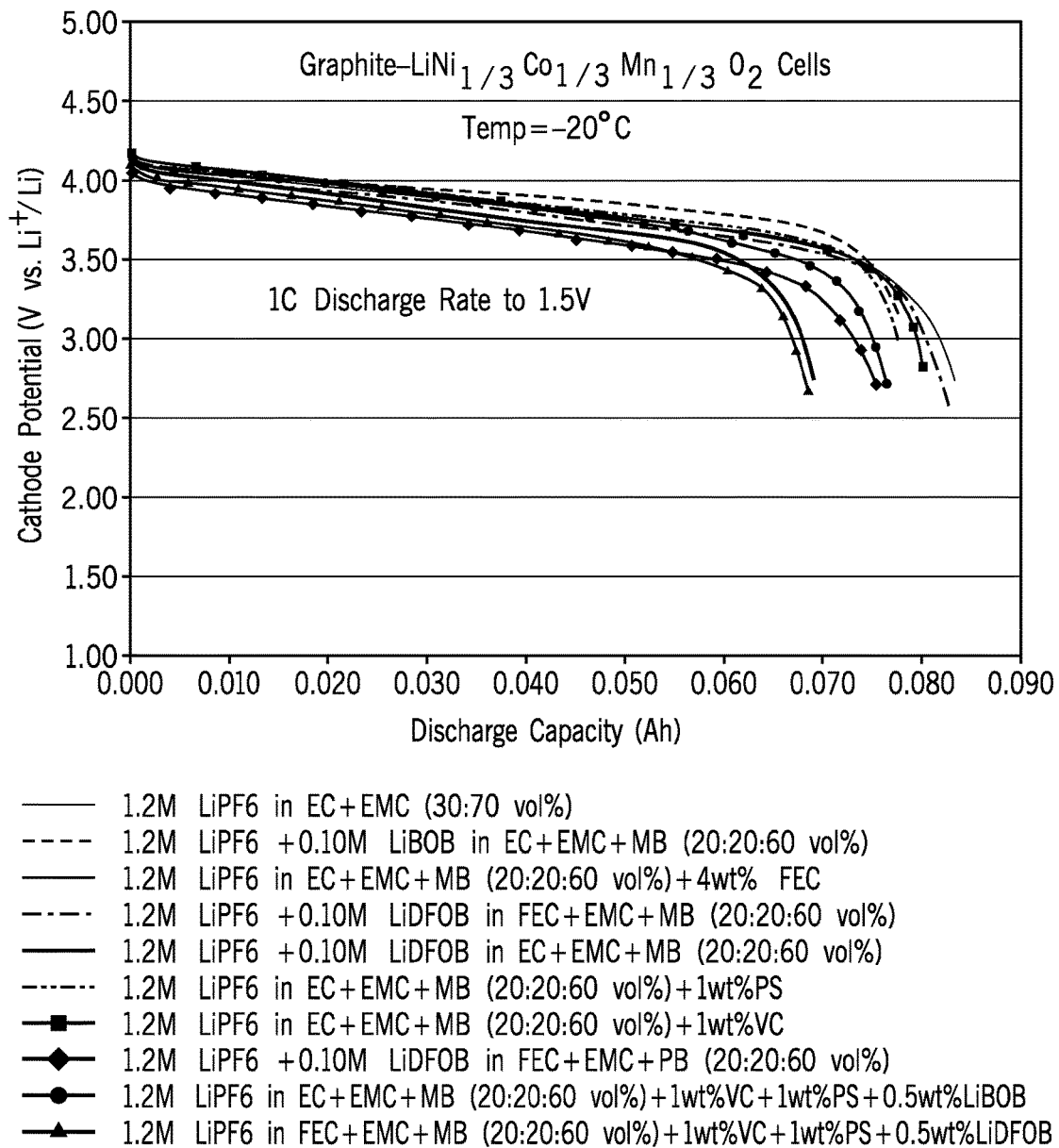

Similar trends were observed when the cells were evaluated at −20° C. using a 1C discharge rate, with the 1.0M LiPF$_6$+0.10M LiDFOB in FEC+EMC+MB (20:60:20 vol %) and the 1.0M LiPF$_6$ in EC+EMC (30:70 vol %) electrolytes delivering the highest capacity and operating voltage, as shown in FIG. 10. When the anode potential is observed throughout the discharges, as shown in FIG. 11, the use of LiBOB displays the greatest amount of polarization, whereas the use LiDFOB in conjunction with FEC displays the least amount of polarization. FIG. 12 illustrates the corresponding cathode potential observed throughout the discharges performed at the 1C rate.

Figure 13:
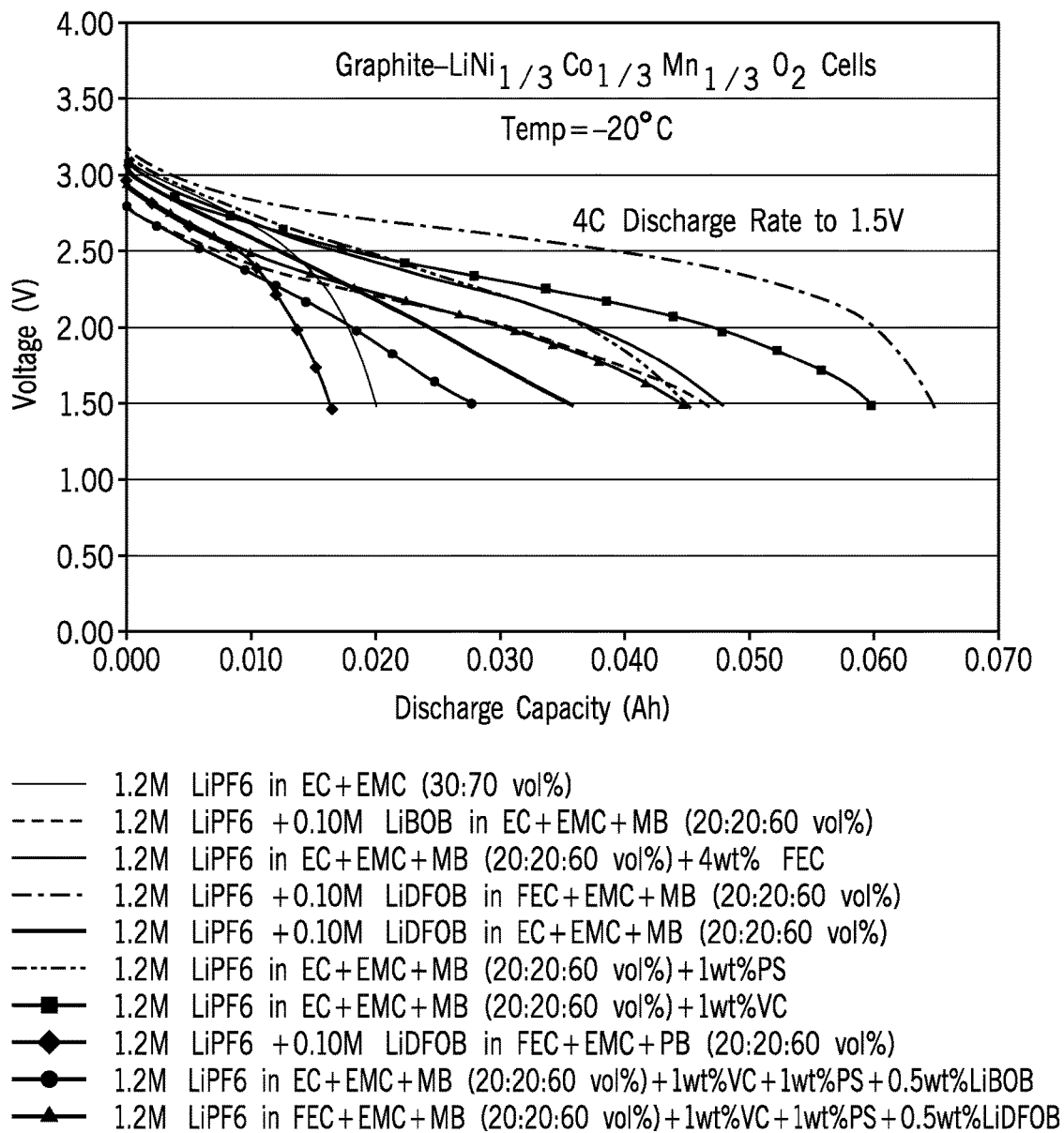
FIG. 13 is a plot of operating voltage as a function of discharge capacity obtained at −20° C. at a 4C discharge rate, for a plurality of NMC/graphite battery cells having different electrolyte formulations.
Figure 14:
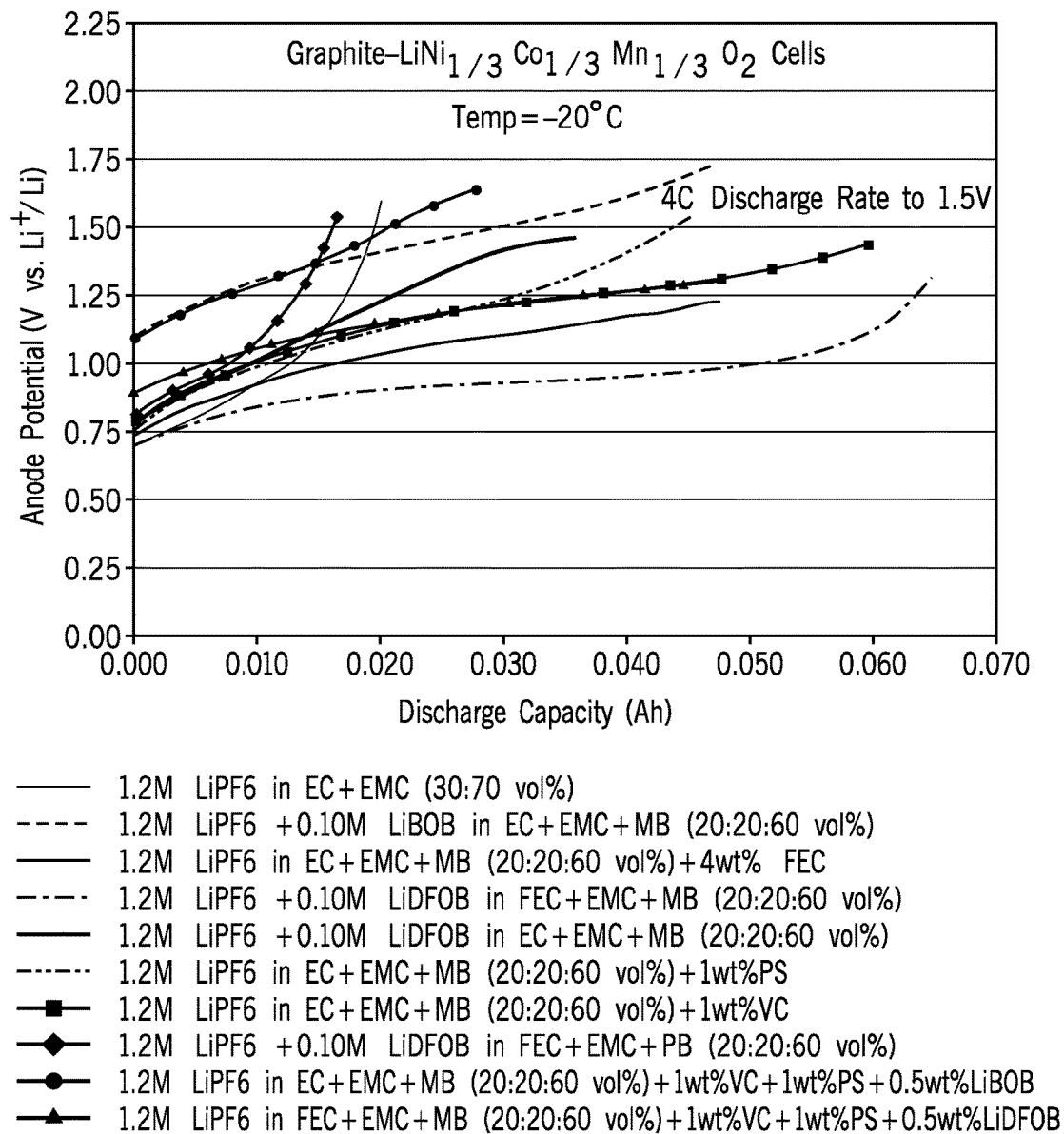
FIGS. 14 and 15 are plots of corresponding anode potential and cathode potential, respectively, for the battery cells having the different electrolyte formulations set forth in FIG. 13.
Figure 15:
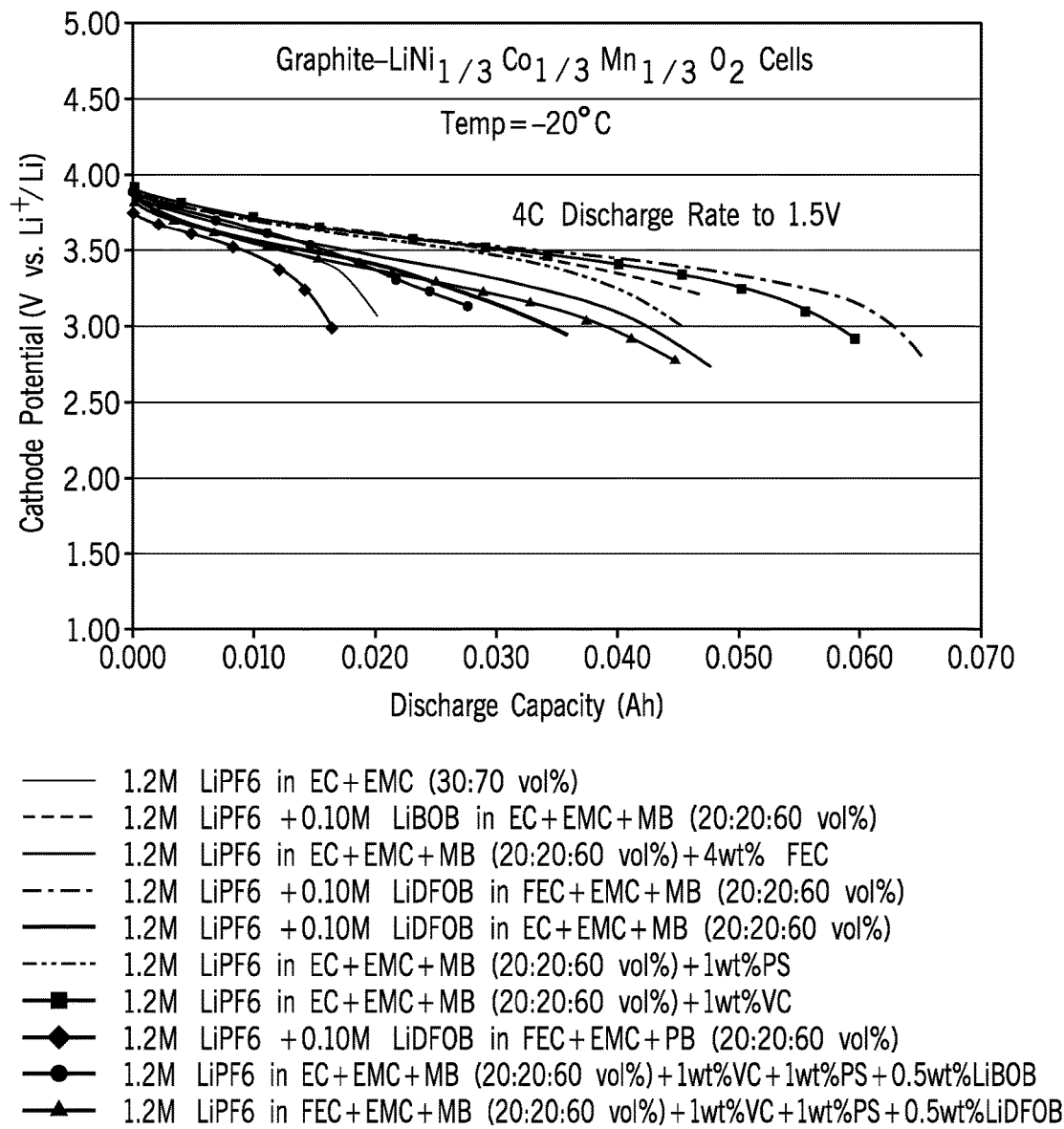

The difference between the electrolytes employing LiDFOB and FEC and the other electrolytes may be better appreciated with reference to FIGS. 13-15, which graphically depict data obtained at a higher discharge rate of 4C at −20° C. More specifically, FIG. 13 depicts operating voltage as a function of discharge capacity, and FIGS. 14 and 15 depict the anode and cathode potentials, respectively, as a function of the discharge capacity, when the battery cells shown in Table 2 were subjected to the 4C discharge rates. As shown in FIGS. 13-15, the electrolyte 1.20M LiPF$_6$+0.10M LiDFOB in FEC+EMC+MB (20:20:60 vol %) yielded the best performance, followed by 1.20M LiPF$_6$ in EC+EMC+MB (20:20:60 vol %)+2 wt % VC. Indeed, it is believed that the electrolytes utilizing a linear ester in combination with the carbonate solvents may generally provide better performance than electrolytes utilizing only carbonate solvents.

As depicted in FIG. 14, the anode potential of the cells containing the LiBOB additive were significantly higher than the other cells (by approximately 0.4V in some cases), suggesting the formation of a resistive SEI film and sluggish lithium kinetics. The polarization observed at the cathodes, shown in FIG. 15, were more similar amongst the electrolyte types, with the battery cells having LiBOB and LiDFOB electrolyte formulations displaying the least amount of polarization, suggesting that they have a beneficial role in cathode electrode interface (CEI) formation.

Figure 16:
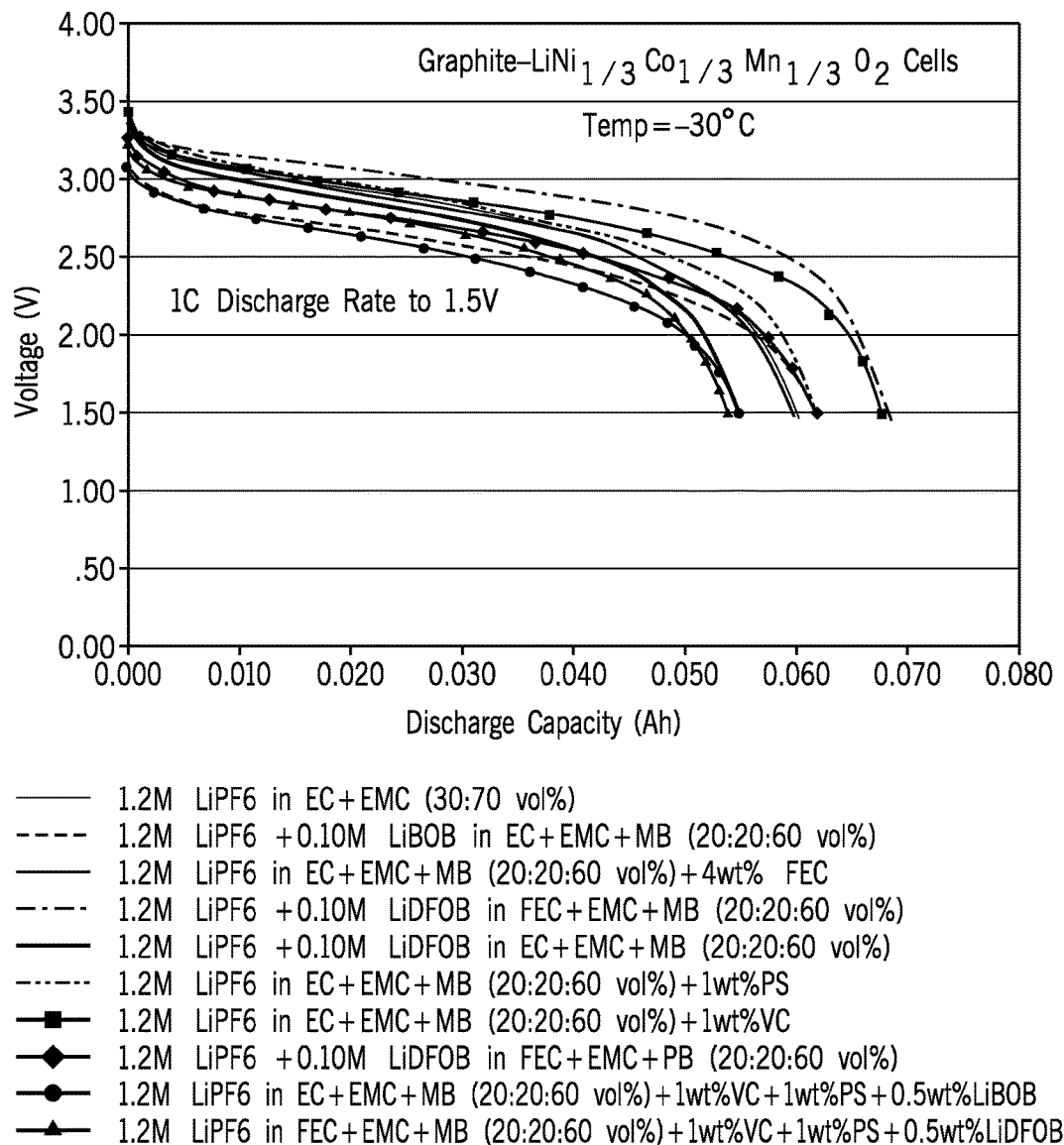
FIG. 16 is a plot of operating voltage as a function of discharge capacity obtained at −30° C. at a 1C discharge rate, for a plurality of NMC/graphite battery cells having different electrolyte formulations.
Figure 17:
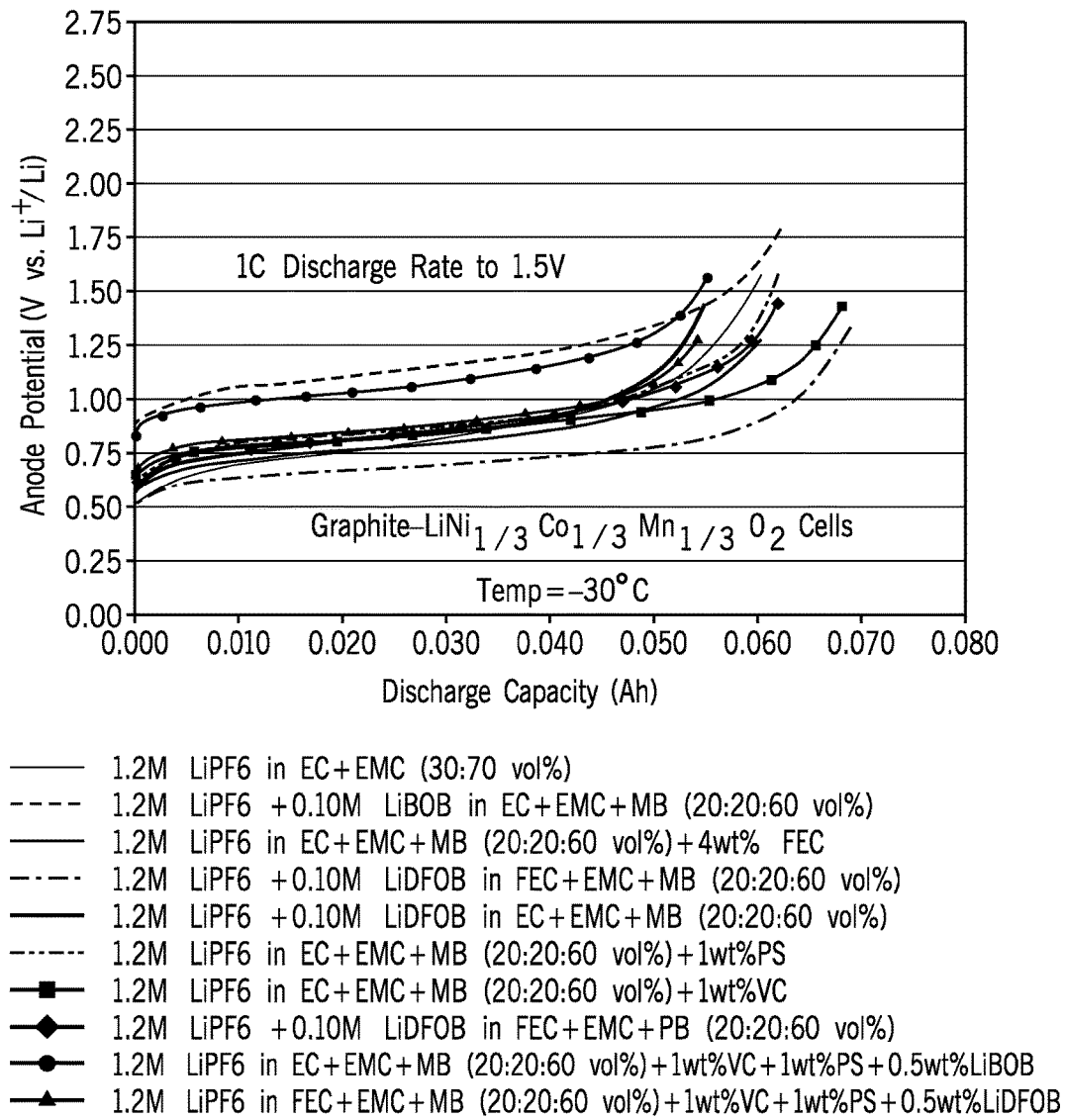
FIGS. 17 and 18 are plots of corresponding anode potential and cathode potential, respectively, for the battery cells having the different electrolyte formulations set forth in FIG. 16.
Figure 18:
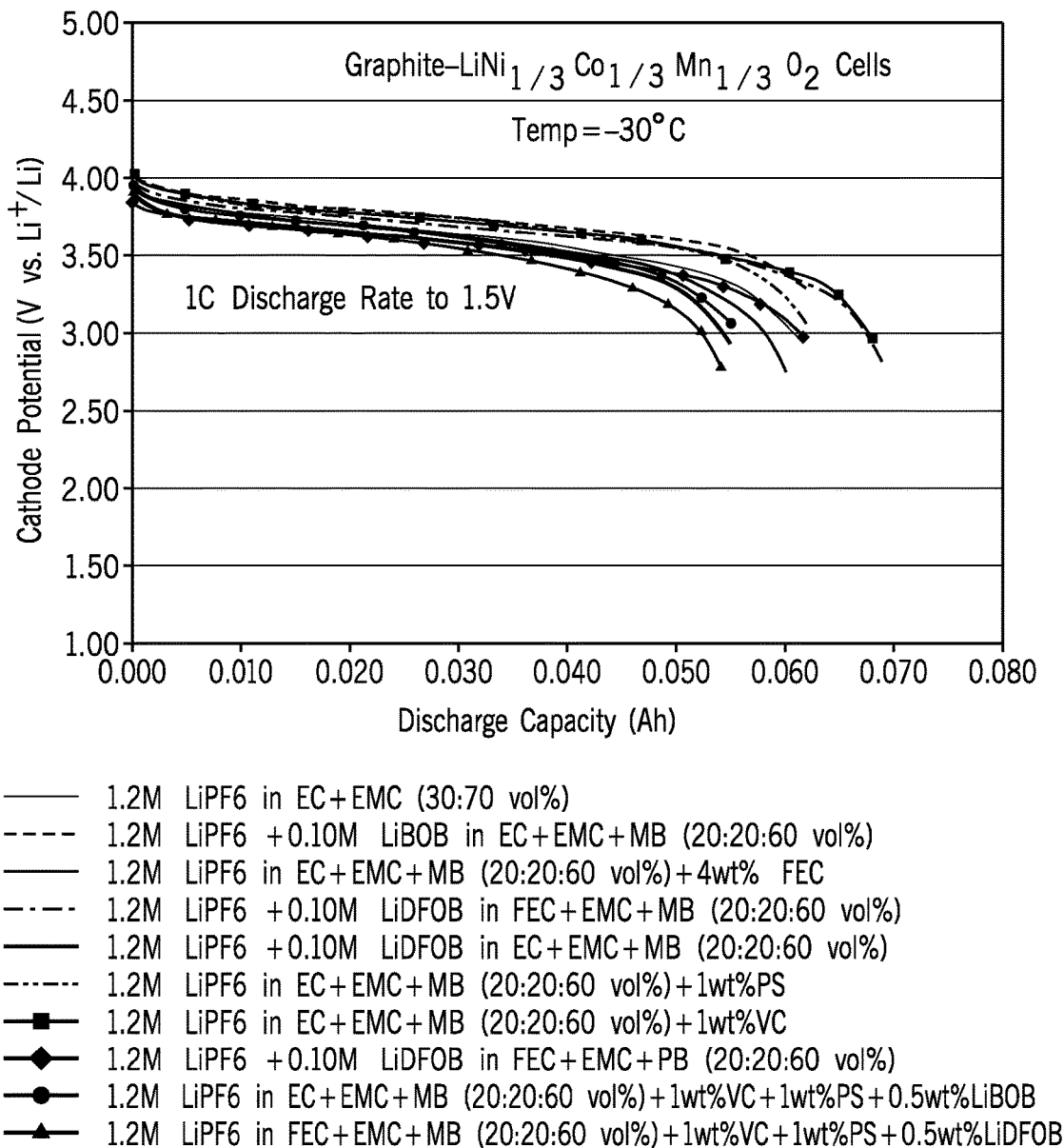

While it is believed that LiBOB may play a beneficial role at the cathode, anode polarization and discharge characteristics at relatively low temperatures (−30° C.) suggests that LiDFOB may provide better overall performance for the battery cells. With reference to the discharge characteristics, anode polarization, and cathode polarization data shown in FIGS. 16, 17, and 18, respectively, it can be seen that LiDFOB may be superior to LiBOB for certain performance characteristics and for certain electrolyte formulations. Indeed, similar trends to those noted above were observed with the 1.20M LiPF$_6$+0.10M LiDFOB in FEC+EMC+MB (20:20:60 vol %) and 1.20M LiPF$_6$ in EC+EMC+MB (20:20:60 vol %)+2 wt % VC electrolytes displaying the best performance, as illustrated in FIG. 16, when discharged at a 1C rate at −30° C. These favorable results may be at least partially attributable to desirable polarization characteristics at the anode, especially in the case when LiDFOB is used in conjunction with FEC, as shown in FIG. 17.

Hybrid power pulse characterization (HPPC) profiling of battery cells having the formulations noted above, at a number of different temperatures, also suggests that LiDFOB and FEC, alone or in combination, may be superior to similar formulations where the non-fluorinated analogs are utilized. FIGS. 19, 20, and 21 respectively illustrate ASI obtained for the overall battery cells, at the anode, and at the cathode as a function of SOC for each battery cell and associated electrolyte formulation.

During the course of the low temperature discharge characterization testing, the HPPC profiles were performed at −20° C., −25° C., −30° C., −35° C. and −40° C., and included the application of a 5C discharge current pulse (0.670 A) for 10 seconds in duration. These pulses were performed in 10% SOC increments, which was achieved by discharging the battery cells between pulses using a 1C discharge rate (0.134 A). It should be noted that the pulse was terminated and the test advanced to the next step (a rest condition) if the cell voltage was less than 0.50V to avoid cell reversal. Therefore, in some cases, especially at lower temperatures and lower SOC, the impedance was calculated from differing pulse durations. Thus, the impact of electrolyte type upon the individual electrode area specific impedance was more accurately compared when assessed at the higher states-of-charge (SOC) (e.g., from 70% to 100% SOC), especially at −30° C. and below. The data generated is reported using "current injection" techniques (the potential prior to the pulse was compared with the voltage at the end of the pulse), however, the data was also analyzed using "current interruption" techniques (the potential at the end of the rest period following the pulse was compared with the voltage at the end of the pulse).

When the cells were subjected to the HPPC profile at −25° C. at SOC over 70%, as shown in FIG. 19, the 1.20M LiPF$_6$ in EC+EMC+MB (20:20:60 vol %)+2% PS electrolyte delivered lowest overall cell impedance (375 Ohms*cm$^2$). In general, the benefit of esters is believed to be more pronounced as temperatures become lower, and many of the electrolyte solutions utilizing a linear ester as a co-solvent display lower impedance compared with the all carbonate-based electrolytes.

The following trend is observed with the electrolytes in increasing impedance (at 90% SOC): PS (335 Ohms*cm$^2$)<LiDFOB+EC (353 Ohms*cm$^2$)<VC (358*cm2)<LiDFOB+FEC+PB (379 Ohms*cm$^2$)<FEC+VC+PS+LiDFOB (386 Ohms*cm$^2$)<LiDFOB+FEC (393 Ohms*cm$^2$)<EC+VC+PS+LiBOB (415 Ohms*cm$^2$)<FEC (438 Ohms*cm$^2$) <All Carb, No additive (446 Ohms*cm$^2$)<LiBOB (472 Ohms*cm$^2$). Accordingly, one conclusion from the data is that LiDFOB may result in lower overall cell impedance compared to LiBOB. In addition, at high SOC, when LiDFOB is utilized as an additive, EC+EMC+MB+LiDFOB out performs FEC+EMC+MB+LiDFOB in terms of lower overall cell impedance. However, it is believed that as combinations of additives are used, the overall battery cell performance, a part of which is determined by the impedance of the overall battery cell, may not be easily predictable.

Indeed, as shown in FIG. 20, data obtained specifically for the impedance at the anode demonstrates that of the studied formulations, the 1.20M LiPF$_6$+0.10M LiDFOB in FEC+EMC+MB (20:20:60 vol %) electrolyte delivered the lowest anode impedance. This result correlates well with the observations noted above, where this electrolyte was observed to result in the best low temperature discharge characteristics. This result is also believed to suggest that the anode is the rate limiting electrode at low temperatures. The following trend is observed with the electrolytes in increasing impedance (at 90% SOC): LiDFOB+FEC (195 Ohms*cm$^2$)<PS (204 Ohms*cm$^2$)<LiDFOB (206 Ohms*cm$^2$)<LiDFOB+FEC+PB (213 Ohms*cm$^2$)<VC (217 Ohms*cm$^2$)<FEC (222 Ohms*cm$^2$)<FEC+VC+PS+LiDFOB (223 Ohms*cm$^2$)<All Carb, no additive (225 Ohms*cm$^2$)<VC+PS+LiBOB (265 Ohms*cm$^2$)<LiBOB (317 Ohms*cm$^2$). Accordingly, of the formulations denoted in FIG. 20, those utilizing LiBOB as an additive had the highest anode impedance. On the other hand, as set forth in FIG. 21, which depicts the cathode impedance of the same battery cells, LiBOB is believed to be approximately average at relatively low temperatures (−25° C.).

At even lower temperatures (−30° C.), similar trends are observed, as shown in FIGS. 22-24. Of the studied formulations, as shown in FIG. 22, the 1.20M LiPF$_6$ in EC+EMC+MB (20:20:60 vol %)+2% PS electrolyte again delivered lowest overall cell impedance, and the 1.20M LiPF$_6$+0.10M LiDFOB in FEC+EMC+MB (20:20:60 vol %) electrolyte delivered lowest anode impedance, as shown in FIG. 23. It is believed that LiDFOB and FEC, in combination, produce a relatively low resistance and thin SEI layer at the anode.

However, at these lower temperatures, the impact of FEC becomes more pronounced at the cathode, as shown in FIG. 24. The following trend is observed with the electrolytes in increasing impedance (at 90% SOC) at the cathode: PS (159 Ohms*cm$^2$)<VC (168 Ohms*cm$^2$)<EC+VC+PS+LiBOB (177 Ohms*cm$^2$)<LiDFOB (178 Ohms*cm$^2$)<LiBOB (189 Ohms*cm$^2$)<LiDFOB+FEC+PB (199 Ohms*cm$^2$)<FEC+VC+PS+LiDFOB (202 Ohms*cm$^2$)<LiDFOB+FEC (243 Ohms*cm$^2$)<FEC (289 Ohms*cm$^2$)<All Carb, no additive (301 Ohms*cm$^2$).

Given that the 1.20M LiPF$_6$+0.10M LiDFOB in FEC+EMC+MB (20:20:60 vol %) electrolyte provides excellent low temperature power capability and yet displays relatively high cathode impedance, it is believed that for the studied battery cells, the beneficial properties obtained at the anode from the use of LiDFOB and FEC may largely enhance the overall discharge capabilities of the battery cell. Accordingly, in embodiments where it may be desirable to use a lithium ion battery cell (e.g., multiple such cells in a battery module) for discharging applications at low temperature (e.g., cold cranking applications), LiDFOB and FEC, in combination with certain other components, may provide enhanced performance compared to the other studied additives alone, or compared to formulations that do not utilize LiDFOB and/or FEC. In this regard, while the above data was obtained specifically on cylindrical battery cells, the data obtained is also believed to be applicable to any other battery cell configuration, including pouch and prismatic configurations. Accordingly, the electrolytes listed above may be appropriate for cylindrical battery cells, prismatic battery cells, and pouch battery cells, and the data set forth above is believed to be representative of the relative behavior of the electrolytes for all different battery cell configurations.

Low Temperature Studies of Example Electrolytes in NMC/Graphite Pouch Battery Cells As noted above, the electrolytes of the present disclosure may be used in a wide variety of battery cell configurations. To help illustrate, HPPC measurements were also performed on NMC/graphite pouch cells at 25° C. and −25° C., as shown in FIGS. 25 and 26, respectively. As illustrated in FIG. 25, when the impedance is measured at +25° C., the ester-containing electrolytes displayed from 7% to 11% lower resistance compared to an all carbonate-based electrolyte. However, the performances of the battery cells are quite different at lower temperatures. As shown in FIG. 26, the benefit of the ester co-solvents is more dramatic at low temperature (i.e., −25° C.), with 10–20% lower resistance being obtained. As also illustrated in FIG. 26, of the electrolytes studied, the electrolyte incorporating a combination of FEC and LiDFOB, specifically the 1.20M LiPF$_6$ in FEC/EC/EMC/MB (10:10:20:60 vol %)+1 wt % VC, 0.5 wt % LiDFOB electrolyte displayed the lowest resistance for over half of the % DOD range. As may be appreciated from the data, FEC used in combination with EC as cyclic carbonate co-solvents may be appropriate for some formulations.

Low Temperature Studies of Example Electrolytes in NMC/Graphite Coin Battery Cells In addition to evaluating the electrolytes in larger three-electrode cylindrical and pouch cells, the performance was also assessed in smaller NMC/graphite coin cells. Coin battery cells containing the various formulations were subjected to discharge rate characterization at −20° C., as shown in Table 3. Based on the tabulated data, all of the cells containing MB-based electrolytes displayed improved discharge rate capability compared to the battery cell with the baseline all carbonate based electrolyte. In terms of the discharge capacity delivered at higher rates, the cells containing the LiBOB additive and 1.20M LiPF$_6$+0.10M LiDFOB in FEC+EMC+MB (20:20:60 vol %) were observed to provide the best performance.

Although the battery cells containing electrolytes with the LiBOB additive delivered comparable capacity to the battery cells containing electrolytes with the FEC+LiDFOB blend, they displayed notably lower operating voltage. This may be further appreciated with reference to FIGS. 27 and 28, which graphically depict discharge data obtained at −20° C. and a discharge rate of 2C. More specifically, FIG. 27 is as plot of voltage as a function of discharge capacity, and FIG. 28 is a plot of voltage as a function of the corresponding room temperature capacity of the battery cells.

Based on the data obtained with the three-electrode cylindrical cells, the lower operating voltage observed with the coin battery cells with electrolytes containing LiBOB (listed in Table 3 as JCS-03 and JCS-04) is believed to be attributable to a higher anode potential during discharge, corresponding to higher resistance or polarization. Therefore, although LiBOB may have beneficial effects from the standpoint of lithium kinetics at the cathode, it may affect the discharge capability of the battery cell due to increased resistance at the anode. Indeed, it is presently recognized that while the beneficial effects of additives such as LiBOB on cathode kinetics is desirable, it is also desirable to avoid its deleterious effects at the anode due to high resistance and polarization. In other words, it may be desirable to use additives that produce protective films over the electrodes to enable higher temperature operation, but also do not produce a prohibitively resistive film at the anode.

TABLE 3

Discharge Rate Characterization of NMC/graphite Battery Cells with Different Electrolytes

| | | Cell | | | | | | | | |
|---|---|---|---|---|---|---|---|---|---|---|
| | | JCS-02 | | JCS-03 | | JCS-04 | | JCS-06 | | JCS-07 |
| | | | | | | Electrolyte | | | | |
| | | 1.2M LiPF$_6$ in EC + EMC (30:70 vol %) | | 1.20M LiPF$_6$ + 0.10M LiBOB in EC + EMC + MB (20:20:60 vol %) | | 1.20M LiPF$_6$ + 0.10M LiBOB in EC + EMC + MB (20:20:60 vol %) | | 1.20M LiPF$_6$ + 0.10M LiDFOB in EC + EMC + MB (20:20:60 vol %) | | 1.2M LiPF$_6$ in EC + EMC + MB (20:20:60 vol %) + 4 wt % FEC |
| Temp. | Discharge Rate | Capacity (Ah) | Percent (%) | Capacity (Ah) | Percent (%) | Capacity (Ah) | Percent (%) | Capacity (Ah) | Percent (%) | Capacity (Ah) | Percent (%) |
| 20° C. | C/20 | 0.00193 | 100.00 | 0.00188 | 100.00 | 0.00191 | 100.00 | 0.00192 | 100.00 | 0.00193 | 100.00 |
| −20° C. | C/20 | 0.00145 | 74.95 | 0.00170 | 90.20 | 0.00168 | 88.17 | 0.00149 | 77.58 | 0.00161 | 83.80 |
| | C/5 | 0.00138 | 71.58 | 0.00160 | 84.97 | 0.00159 | 83.17 | 0.00142 | 73.83 | 0.00146 | 75.98 |
| | C/2 | 0.00133 | 68.89 | 0.00147 | 78.22 | 0.00146 | 76.59 | 0.00127 | 66.34 | 0.00133 | 69.05 |
| | 1.0 C | 0.00114 | 59.09 | 0.00136 | 72.20 | 0.00136 | 71.07 | 0.00117 | 60.81 | 0.00123 | 63.88 |
| | 2.0 C | 0.00094 | 48.51 | 0.00119 | 63.38 | 0.00123 | 64.17 | 0.00101 | 52.46 | 0.00109 | 56.78 |
| | 3.0 C | 0.00081 | 42.19 | 0.00108 | 57.56 | 0.00114 | 59.89 | 0.00092 | 48.01 | 0.00101 | 52.41 |
| | 4.0 C | 0.00051 | 26.37 | 0.00101 | 53.64 | 0.00109 | 56.91 | 0.00086 | 44.73 | 0.00094 | 48.74 |
| | 5.0 C | 0.00029 | 15.17 | 0.00093 | 49.37 | 0.00101 | 53.12 | 0.00071 | 36.95 | 0.00087 | 44.97 |
| | 6.0 C | 0.00020 | 10.33 | 0.00076 | 40.24 | 0.00088 | 46.29 | 0.00052 | 27.07 | | |
| | 7.0 C | 0.00016 | 8.14 | 0.00048 | 25.42 | 0.00066 | 34.47 | 0.00036 | 18.58 | | |
| | 8.0 C | 0.00014 | 7.02 | 0.00034 | 17.94 | 0.00046 | 24.24 | 0.00027 | 14.02 | 0.00033 | 17.02 |

TABLE 3-continued

Discharge Rate Characterization of NMC/graphite Battery Cells with Different Electrolytes

| | | Cell | | | | | |
|---|---|---|---|---|---|---|---|
| | | JCS-08 | | JCS-09 | | JCS-10 | |
| | | Electrolyte | | | | | |
| | | 1.2M LiPF$_6$ in EC + EMC + MB (20:20:60 vol %) + 4 wt % FEC | | 1.20M LiPF$_6$ + 0.10M LiDFOB in FEC + EMC + MB (20:20:60 vol %) | | 1.20 M LiPF$_6$ + 0.10M LiDFOB in FEC + EMC + MB (20:20:60 vol %) | |
| Temp. | Discharge Rate | Capacity (Ah) | Percent (%) | Capacity (Ah) | Percent (%) | Capacity (Ah) | Percent (%) |
| 20° C. | C/20 | 0.00190 | 100.00 | 0.00189 | 100.00 | 0.00183 | 100.00 |
| −20° C. | C/20 | 0.00164 | 86.34 | 0.00171 | 90.48 | 0.00141 | 76.99 |
| | C/5 | 0.00156 | 81.79 | 0.00158 | 83.43 | 0.00134 | 73.36 |
| | C/2 | 0.00143 | 74.86 | 0.00146 | 77.03 | 0.00118 | 64.72 |
| | 1.0 C | 0.00131 | 68.88 | 0.00136 | 72.12 | 0.00105 | 57.54 |
| | 2.0 C | 0.00114 | 60.03 | 0.00124 | 65.82 | 0.00089 | 48.57 |
| | 3.0 C | 0.00104 | 54.77 | 0.00116 | 61.54 | 0.00080 | 43.73 |
| | 4.0 C | 0.00096 | 50.61 | 0.00111 | 58.61 | 0.00074 | 40.28 |
| | 5.0 C | 0.00085 | 44.78 | 0.00105 | 55.73 | 0.00065 | 35.75 |
| | 6.0 C | 0.00063 | 33.21 | | | 0.00049 | 26.92 |
| | 7.0 C | 0.00040 | 21.04 | | | 0.00034 | 18.32 |
| | 8.0 C | 0.00029 | 15.26 | 0.00075 | 39.73 | 0.00024 | 13.22 |

Low temperature characterization was performed on additional NMC/graphite coin battery cells, and the data is summarized in Table 4 below. In general, somewhat comparable results were obtained for several of the electrolytes at −20° C. (up to 3C), as illustrated by the discharge performance illustrated in FIGS. 29 and 30. The best performance for the battery cells in Table 4 was obtained using the 1.20M LiPF$_6$ in EC+EMC+MB (20:20:60 vol %)+1 wt % PS electrolyte and 1.20M LiPF$_6$+0.10M LiDFOB in EC+EMC+MB (20:20:60 vol %) electrolyte. The MB-based electrolyte with VC also performed well. These trends are also observed when discharging at lower temperatures and higher rates, with somewhat more differentiation in the performance of the different electrolytes, as shown in FIGS. 31 and 32. The data illustrated in FIGS. 31 and 32, depicting operating voltage as a function of discharge capacity and percent of room temperature capacity, respectively, were obtained at −30° C. using a 3C discharge rate.

TABLE 4

Summary of Discharge Rate Characterization of NMC/graphite Battery Cells with Different Electrolytes

| | | Cell | | | | | | | |
|---|---|---|---|---|---|---|---|---|---|
| | | JCS-11 | | JCS-13 | | JCS-15 | | JCS-17 | |
| | | Electrolyte | | | | | | | |
| | | 1.20M LiPF$_6$ + 0.10M LiDFOB in EC + EMC + MB (20:20:60 vol %) | | 1.20M LiPF$_6$ in EC + EMC + MB (20:20:60 vol %) + 1% PS | | 1.20M LiPF$_6$ in EC + EMC + MB (20:20:60 vol %) + 1 wt % VC | | 1.20M LiPF$_6$ + 0.10M LiDFOB in FEC + EMC + PB (20:20:60 vol %) | |
| Temp. | Discharge Rate | Capacity (Ah) | Percent (%) | Capacity (Ah) | Percent (%) | Capacity (Ah) | Percent (%) | Capacity (Ah) | Percent (%) |
| 20° C. | C/20 | 0.00197 | 100.00 | 0.00191 | 100.00 | 0.00188 | 100.00 | 0.00180 | 100.00 |
| −20° C. | C/20 | 0.00169 | 85.85 | 0.00168 | 87.93 | 0.00162 | 86.02 | 0.00161 | 89.83 |
| | C/5 | 0.00157 | 79.60 | 0.00155 | 81.10 | 0.00154 | 81.80 | 0.00152 | 84.90 |
| | C/2 | 0.00145 | 73.32 | 0.00143 | 75.18 | 0.00138 | 73.53 | 0.00136 | 75.91 |
| | 1.0 C | 0.00132 | 67.16 | 0.00133 | 69.65 | 0.00124 | 66.03 | 0.00116 | 64.86 |
| | 2.0 C | 0.00122 | 61.89 | 0.00123 | 64.54 | 0.00114 | 60.43 | 0.00101 | 56.39 |
| | 3.0 C | 0.00115 | 58.25 | 0.00116 | 60.89 | 0.00107 | 56.93 | 0.00091 | 50.59 |
| | 4.0 C | 0.00110 | 55.67 | 0.00111 | 58.17 | 0.00101 | 53.81 | 0.00069 | 38.17 |
| | 5.0 C | 0.00102 | 51.99 | 0.00105 | 55.03 | 0.00094 | 50.00 | 0.00035 | 19.69 |
| | 6.0 C | 0.00091 | 46.30 | 0.00089 | 46.60 | 0.00081 | 43.26 | 0.00022 | 12.19 |
| | 7.0 C | 0.00069 | 35.22 | 0.00059 | 30.95 | 0.00056 | 29.87 | 0.00017 | 9.62 |
| | 8.0 C | 0.00046 | 23.29 | 0.00039 | 20.27 | 0.00038 | 20.26 | 0.00014 | 7.64 |
| −30° C. | C/20 | 0.00139 | 70.56 | 0.00143 | 75.03 | 0.00132 | 69.97 | 0.00110 | 61.54 |
| | C/5 | 0.00125 | 63.43 | 0.00129 | 67.78 | 0.00118 | 62.48 | 0.00096 | 53.63 |
| | C/2 | 0.00108 | 54.61 | 0.00114 | 59.68 | 0.00101 | 53.44 | 0.00073 | 40.90 |
| | 1.0 C | 0.00097 | 49.34 | 0.00104 | 54.73 | 0.00090 | 48.07 | 0.00062 | 34.27 |
| | 2.0 C | 0.00084 | 42.40 | 0.00092 | 48.01 | 0.00075 | 40.03 | 0.00026 | 14.34 |
| | 3.0 C | 0.00072 | 36.77 | 0.00083 | 43.24 | 0.00063 | 33.29 | 0.00011 | 6.09 |
| | 4.0 C | 0.00047 | 23.95 | 0.00055 | 28.84 | 0.00037 | 19.87 | 0.00007 | 4.13 |
| | 5.0 C | 0.00028 | 14.36 | 0.00031 | 16.49 | 0.00024 | 12.73 | 0.00005 | 2.97 |
| | 6.0 C | 0.00021 | 10.43 | 0.00023 | 11.96 | 0.00019 | 9.87 | 0.00004 | 1.95 |

TABLE 4-continued

Summary of Discharge Rate Characterization of NMC/graphite Battery Cells with Different Electrolytes

| | | | | | | | | | |
|---|---|---|---|---|---|---|---|---|---|
| −40° C. | C/20 | 0.00116 | 59.10 | 0.00124 | 65.13 | 0.00115 | 61.01 | 0.00092 | 51.13 |
| | C/5 | 0.00097 | 49.39 | 0.00107 | 56.18 | 0.00096 | 51.12 | 0.00068 | 37.74 |
| | C/2 | 0.00084 | 42.47 | 0.00095 | 49.56 | 0.00083 | 44.09 | 0.00053 | 26.92 |
| | 1.0 C | 0.00068 | 34.30 | 0.00080 | 42.16 | 0.00066 | 35.17 | 0.00020 | 11.08 |
| | 2.0 C | 0.00044 | 22.17 | 0.00062 | 32.48 | 0.00041 | 21.73 | 0.00004 | 2.21 |
| | 3.0 C | 0.00018 | 8.97 | 0.00025 | 13.16 | 0.00017 | 9.13 | 0.00001 | 0.34 |

| | | Cell | | | |
|---|---|---|---|---|---|
| | | JCS-19 | | JCS-21 | |
| | | Electrolyte | | | |
| | | 1.20M LiPF$_6$ in EC + EMC + MB (20:20 :60 vol %) + 1 wt % PS + 1 wt % VC + 0.5 wt % LiBOB | | 1.20M LiPF$_6$ in FEC + EMC + MB (20:20:60 vol %) + 1 wt % PS + 1 wt % VC + 0.5 wt % LiDFOB | |
| Temp. | Discharge Rate | Capacity (Ah) | Percent (%) | Capacity (Ah) | Percent (%) |
| 20° C. | C/20 | 0.00187 | 100.00 | 0.00189 | 100.00 |
| −20° C. | C/20 | 0.00172 | 91.86 | 0.00165 | 87.71 |
| | C/5 | 0.00161 | 85.82 | 0.00158 | 83.75 |
| | C/2 | 0.00146 | 78.13 | 0.00143 | 75.87 |
| | 1.0 C | 0.00132 | 70.72 | 0.00124 | 65.94 |
| | 2.0 C | 0.00120 | 64.11 | 0.00109 | 57.59 |
| | 3.0 C | 0.00112 | 59.92 | 0.00102 | 53.87 |
| | 4.0 C | 0.00107 | 57.01 | 0.00095 | 50.47 |
| | 5.0 C | 0.00100 | 53.42 | 0.00088 | 46.61 |
| | 6.0 C | 0.00089 | 47.53 | 0.00078 | 41.24 |
| | 7.0 C | 0.00063 | 33.72 | 0.00056 | 29.54 |
| | 8.0 C | 0.00043 | 23.14 | 0.00035 | 18.75 |
| −30° C. | C/20 | 0.00134 | 71.65 | 0.00117 | 62.26 |
| | C/5 | 0.00120 | 64.03 | 0.00104 | 55.28 |
| | C/2 | 0.00101 | 53.92 | 0.00085 | 44.99 |
| | 1.0 C | 0.00090 | 48.29 | 0.00075 | 39.60 |
| | 2.0 C | 0.00076 | 40.42 | 0.00061 | 32.40 |
| | 3.0 C | 0.00058 | 30.94 | 0.00045 | 23.72 |
| | 4.0 C | 0.00032 | 17.04 | 0.00026 | 13.52 |
| | 5.0 C | 0.00020 | 10.48 | 0.00016 | 8.71 |
| | 6.0 C | 0.00015 | 7.96 | 0.00013 | 6.90 |
| −40° C. | C/20 | 0.00113 | 60.11 | 0.00099 | 52.71 |
| | C/5 | 0.00093 | 49.87 | 0.00081 | 42.75 |
| | C/2 | 0.00080 | 42.62 | 0.00068 | 35.95 |
| | 1.0 C | 0.00061 | 32.77 | 0.00052 | 27.72 |
| | 2.0 C | 0.00030 | 15.86 | 0.00027 | 14.38 |
| | 3.0 C | 0.00011 | 5.90 | 0.00011 | 5.82 |

High Temperature Studies of Example Electrolytes in Three-Electrode NMC/Graphite Cylindrical Battery Cells In addition to the electrochemical characterization at low temperatures (including 20° C., −20° C., −30° C., and −40° C.), the discharge rate testing (~25 cycles) and the HPPC characterization at different temperatures, a number of the three electrode battery cells set forth above were subjected to cycle life testing at high temperature (60° C.) and 1C charge and discharge rates, as shown in FIG. 33. Each cell was taken to approximately 100% DOD. More specifically, FIG. 33 depicts discharge capacity as a function of cycle number, which is indicative of how the capacity retention of the battery cells might change over time. A reduction in capacity may be referred to as "capacity fade."

The data shown in FIG. 33 suggests that LiBOB, VC, and to a lesser extent LiDFOB, appear to impart improved stability at high temperatures. In addition, all the ester containing electrolytes with various additives appear to retain a higher percentage of their original capacity relative to the baseline all-carbonate-based electrolyte, which does not contain any additives. The capacity retention for the baseline electrolyte illustrated in FIG. 33 is normalized to the initial capacity prior to cycling. The data set forth in FIG. 33 also appears in sets of 50 cycles, as electrochemical characterization was performed on the cells every 50 cycles.

Every 50 cycles, open circuit stand tests were also performed at 60° C. on a number of the formulations to supplement the high temperature data. The results of the open circuit stand tests are shown in FIG. 34 as a bar graph of percentage of formation capacity as a function of the electrolyte. The stand tests included fully charging the battery cells and then storing them at 60° C. for 10 days to determine the reversible and permanent capacity loss. Each entry has two bars indicating data obtained for two samples (to obtain an average).

Based on the data shown in FIG. 34, it is believed that there is a synergistic effect when FEC is used in combination with either of LiBOB or LiDFOB, in that there is less irreversible capacity loss with the formulations including these combinations. Indeed, from the standpoint of the high temperature studies, the use of FEC alone (without additives) does not appear to improve the capacity retention of the battery cells when used as a replacement for EC. On the other hand, used alone or in combination with FEC, LiBOB and LiDFOB improve high temperature stand results, and VC also generally shows an improvement relative to baseline.

FIG. 35 is a plot depicting the ASI of different battery cells as a function of their electrolyte and as a function of time. The listed electrolytes include 10 vol % MB, rather than the 60 vol % MB (or PB) used in the electrolytes listed in FIG. 34. The battery cells with the electrolytes listed in FIG. 35 were compared with a battery cell having an all carbonate-based electrolyte: 1.2M LiPF$_6$ in EC/EMC/DMC/PC+1 wt % VC, 0.5 wt % LiBOB. As illustrated, comparable resistance increase was observed with the MB-based electrolytes compared to the baseline, suggesting that they are viable formulations for high temperature operation.

Formation Studies of Example Electrolytes in NMC/LTO Coin Battery Cells

As set forth above, the disclosed electrolytes may be useful for a wide variety of battery cell chemistries and, indeed, certain of these electrolytes were incorporated into battery cells with lithium titanium oxide (LTO)-based anodes and subjected to various electrical characterization techniques. Although the specific energy of the cell design would be lower compared to battery cells with graphite-based anodes, lithium titanate has promise to deliver improved cycle life performance and potentially can be used with more aggressive electrolyte solutions. Indeed, it is believed that the resistance caused by film formation may be reduced in lithium titanate-based anode battery cells. As discussed above, it is also believed that FEC and LiDFOB, when used alone or in combination, may provide enhanced performance in NMC/LTO cells.

The following example electrolytes were used to construct NMC/LTO coin battery cells used for electrical characterization. The example electrolytes include: (1.) 1.20M LiPF$_6$ in EC+EMC+MB (20:60:20 vol %)+1% VC (JTS01, JTS02); (2.) 1.20M LiPF$_6$ in EC+EMC+MP (20:60:20 vol %)+1% VC (JTS03, JTS04); (3.) 1.20M LiPF$_6$+0.10M LiDFOB in FEC+EMC+MB (20:20:60 vol %)(JTS05, JTS06); (4.) 1.20M LiPF$_6$+0.10M LiDFOB in FEC+EMC+MP (20:20:60 vol %)(JTS07, TS08); and (5.) 1.20M LiPF$_6$+0.10M LiBOB in EC+EMC+MP (20:20:60 vol %)(JTS09, JTS10). The results of the formation cycling are presented in Table 5.

TABLE 5

Formation Results of NMC/LTO Battery Cells with Different Electrolytes

| Cell | Electrolyte | Cell Type | Total Cathode Weight (g) | Charge Capacity (mAh) 1st Cycle | Discharge Capacity (mAh) 1st Cycle | Irreversible Capacity (mAh) (1st Cycle) | Coulombic Efficiency (1st Cycle) | Charge Capacity (mAh) 5th Cycle | Reversible Capacity (mAh) 5th Cycle | Cumulative Irreversible Capacity (1st-5th Cycle) (mAh) | Coulombic Efficiency (5th Cycle) |
|---|---|---|---|---|---|---|---|---|---|---|---|
| JTS-01 | 1.2M LiPF$_6$ in EC + EMC + MB (20:20:60 vol %) + 1 wt % VC | Li$_4$Ti$_5$O$_{12}$—LiNi$_{1/3}$Co$_{1/3}$Mn$_{1/3}$O$_2$ | 0.0246 | 1.8419 | 1.6224 | 0.219 | 88.08 | 1.6578 | 1.6461 | 0.2590 | 99.29 |
| JTS-02 | 1.2M LiPF$_6$ in EC + EMC + MB (20:20:60 vol %) + 1% VC | Li$_4$Ti$_5$O$_{12}$—LiNi$_{1/3}$Co$_{1/3}$Mn$_{1/3}$O$_2$ | 0.0246 | 1.8510 | 1.6274 | 0.224 | 87.92 | 1.6661 | 1.6560 | 0.2594 | 99.40 |
| JTS-03 | 1.2M LiPF$_6$ in EC + EMC + MP (20:20:60 vol %) + 1 wt % VC | Li$_4$Ti$_5$O$_{12}$—LiNi$_{1/3}$Co$_{1/3}$Mn$_{1/3}$O$_2$ | 0.0247 | 1.8592 | 1.6375 | 0.222 | 88.08 | 1.6745 | 1.6634 | 0.2582 | 99.34 |
| JTS-04 | 1.2M LiPF$_6$ in EC + EMC + MP (20:20:60 vol %) + 1 wt % VC | Li$_4$Ti$_5$O$_{12}$—LiNi$_{1/3}$Co$_{1/3}$Mn$_{1/3}$O$_2$ | 0.0247 | 1.9964 | 1.6367 | 0.360 | 81.98 | 1.6816 | 1.6701 | 0.3959 | 99.32 |
| JTS-11 | 1.2M LiPF$_6$ + 0.10M LiDFOB in FEC + EMC + MB (20:20:60 vol %) | Li$_4$Ti$_5$O$_{12}$—LiNi$_{1/3}$Co$_{1/3}$Mn$_{1/3}$O$_2$ | 0.0245 | 1.9226 | 1.6750 | 0.248 | 87.12 | 1.7441 | 1.7348 | 0.2760 | 99.47 |
| JTS-06 | 1.2M LiPF$_6$ + 0.10M LiDFOB in FEC + EMC + MB (20:20:60 vol %) | Cell | 0.0247 | 1.9618 | 1.7207 | 0.241 | 87.71 | 1.7801 | 1.7800 | 0.2864 | 99.99 |
| JTS-07 | 1.2M LiPF$_6$ + 0.10M LiDFOB in FEC + EMC + MP (20:20:60 vol %) | Cell | 0.0247 | 2.1331 | 1.5672 | 0.566 | 73.47 | 1.5615 | 1.5394 | 0.6965 | 98.58 |
| JTS-08 | 1.2M LiPF$_6$ + 0.10M LiDFOB in FEC + EMC + MP (20:20:60 vol %) | Cell | 0.0250 | 2.0851 | 1.6661 | 0.419 | 79.91 | 1.6985 | 1.6763 | 0.5288 | 98.69 |

TABLE 5-continued

Formation Results of NMC/LTO Battery Cells with Different Electrolytes

| Cell | Electrolyte | Cell Type | Total Cathode Weight (g) | Charge Capacity (mAh) 1st Cycle | Discharge Capacity (mAh) 1st Cycle | Irreversible Capacity (mAh) (1st Cycle) | Coulombic Efficiency (1st Cycle) | Charge Capacity (mAh) 5th Cycle | Reversible Capacity (mAh) 5th Cycle | Cumulative Irreversible Capacity (1st-5th Cycle) (mAh) | Coulombic Efficiency (5th Cycle) |
|---|---|---|---|---|---|---|---|---|---|---|---|
| JTS-09 | 1.2M LiPF$_6$ + 0.10M LiBOB in EC + EMC + MB (20:20:60 vol %) | Li$_4$Ti$_5$O$_{12}$—LiNi$_{1/3}$Co$_{1/3}$Mn$_{1/3}$O$_2$ Cell | 0.0248 | 1.9871 | 1.7593 | 0.228 | 88.54 | 1.8234 | 1.8278 | 0.2489 | 100.24 |
| JTS-10 | 1.2M LiPF$_6$ + 0.10M LiBOB in EC + EMC + MB (20:20:60 vol %) | Li$_4$Ti$_5$O$_{12}$—LiNi$_{1/3}$Co$_{1/3}$Mn$_{1/3}$O$_2$ Cell | 0.0248 | 1.9285 | 1.7011 | 0.227 | 88.21 | 1.7695 | 1.7688 | 0.2587 | 99.96 |

In accordance with certain embodiments of the present disclosure and as set forth above, the relative amounts of the different solvents may vary. Indeed, a number of other example electrolytes have been investigated. For instance, while the electrolytes listed in Table 5 include 60 vol % linear ester, other example embodiments of electrolytes including between 10 vol % and 20 vol % linear ester were subjected to characterization, as shown in Table 6 below. Example embodiments of electrolytes employing PC in lieu of EC, as well as an electrolyte having a solvent mixture with an all carbonate blend, were also characterized, as shown in Table 6.

TABLE 6

Formation Charachteristics of NMC/LTO Battery Cells with Different Electrolytes

| Cell | Electrolyte Type | Cell type | Total Cathode mass (g) | Charge Capacity (mAh), 1st Cycle | Discharge Capacity (mAh), 1st Cycle | Irreversible Capacity (mAh), 1st Cycle | Coulombic Efficiency, 1st Cycle | Charge Capacity (mAh), 5th Cycle | Reversible Capacity (mAh), 5th Cycle | Cumulative Irreversible Capacity (mAh, 5 cycles) | Coulombic efficiency, 5th Cycle |
|---|---|---|---|---|---|---|---|---|---|---|---|
| JTS12 | 1.2M LiPF$_6$, EC + EMC + DMC + MB (20:30:40:10 vol %) | Li$_4$Ti$_5$O$_{12}$—LiNi$_{1/3}$Co$_{1/3}$Mn$_{1/3}$O$_2$ Cell | 0.0245 | 1.8098 | 1.5785 | 0.2313 | 87.22 | 1.6202 | 1.6136 | 0.2385 | 99.60 |
| JTS13 | 1.2M LiPF$_6$, EC + EMC + DMC + MB (20:30:40:10 vol %) | Li$_4$Ti$_5$O$_{12}$—LiNi$_{1/3}$Co$_{1/3}$Mn$_{1/3}$O$_2$ Cell | 0.0245 | 1.8392 | 1.6063 | 0.2329 | 87.34 | 1.6670 | 1.6464 | 0.2596 | 98.76 |
| JTS14 | 1.2M LiPF$_6$, EC + EMC + DMC + MB (20:30:40:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0245 | 1.8766 | 1.6355 | 0.2411 | 87.15 | 1.7203 | 1.6979 | 0.2701 | 98.70 |
| JTS28 | 1.2M LiPF$_6$, EC + EMC + DMC + MB (20:30:40:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0244 | 1.8688 | 1.6480 | 0.2208 | 88.18 | 1.7017 | 1.6898 | 0.2549 | 99.30 |
| JTS16 | 1.2M LiPF$_6$, EC + EMC + DMC + MB (20:30:40:10 vol %) + 1 wt % VC + 0.5 wt % LiDFOB | Li$_4$Ti$_5$O$_{12}$—LiNi$_{1/3}$Co$_{1/3}$Mn$_{1/3}$O$_2$ Cell | 0.0245 | 1.8977 | 1.6464 | 0.2513 | 86.76 | 1.7162 | 1.6932 | 0.2823 | 98.66 |
| JTS17 | 1.2M LiPF$_6$, EC + EMC + | Li$_4$Ti$_5$O$_{12}$—LiNi$_{1/3}$Co$_{1/3}$Mn$_{1/3}$O$_2$ Cell | 0.0246 | 1.8875 | 1.6367 | 0.2508 | 86.71 | 1.7223 | 1.6988 | 0.2820 | 98.63 |

TABLE 6-continued

Formation Charachteristics of NMC/LTO Battery Cells with Different Electrolytes

| Cell | Electrolyte Type | Cell type | Total Cathode mass (g) | Charge Capacity (mAh), 1st Cycle | Discharge Capacity (mAh), 1st Cycle | Irreversible Capacity (mAh), 1st Cycle | Coulombic Efficiency, 1st Cycle | Charge Capacity (mAh), 5th Cycle | Reversible Capacity (mAh), 5th Cycle | Cumulative Irreversible Capacity (mAh, 5 cycles) | Coulombic efficiency, 5th Cycle |
|---|---|---|---|---|---|---|---|---|---|---|---|
| | DMC + MB (20:30:40:10 vol %) + 1 wt % VC + 0.5 wt % LiDFOB | | | | | | | | | | |
| JTS18 | 1.2M LiPF$_6$, EC + EMC + DMC 20:40:40 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0246 | 1.8876 | 1.6417 | 0.2459 | 86.98 | 1.7289 | 1.7068 | 0.2758 | 98.73 |
| JTS19 | 1.2M LiPF$_6$, EC + EMC + DMC (20:40:40 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0246 | 1.8826 | 1.6389 | 0.2437 | 87.06 | 1.7301 | 1.7087 | 0.2740 | 98.76 |
| JTS20 | 1.2M LiPF$_6$, EC + EMC + DMC + MP (20:30:40:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0246 | 1.8380 | 1.5913 | 0.2467 | 86.58 | 1.6860 | 1.6622 | 0.2833 | 98.59 |
| JTS21 | 1.2M LiPF$_6$, EC + EMC + DMC + MP (20:30:40:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0247 | 1.8761 | 1.6238 | 0.2523 | 86.55 | 1.7454 | 1.7229 | 0.2843 | 98.71 |
| JTS22 | 1.2M LiPF$_6$, PC + EMC + DMC + MB (20:30:40:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0247 | 1.8862 | 1.6443 | 0.2419 | 87.18 | 1.7360 | 1.7181 | 0.2679 | 98.97 |
| JTS23 | 1.2M LiPF$_6$, PC + EMC + DMC + MB (20:30:40:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0247 | 1.9100 | 1.6636 | 0.2463 | 87.10 | 1.7432 | 1.7303 | 0.2659 | 99.26 |
| JTS24 | 1.2M LiPF$_6$, EC + EMC + DMC + MB (30:30:30:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0247 | 1.8940 | 1.6543 | 0.2397 | 87.34 | 1.7245 | 1.7038 | 0.2672 | 98.80 |
| JTS25 | 1.2M LiPF$_6$, EC + EMC + DMC + MB (30:30:30:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0247 | 1.8901 | 1.6430 | 0.2471 | 86.92 | 1.7290 | 1.7069 | 0.2764 | 98.72 |

TABLE 6-continued

Formation Charachteristics of NMC/LTO Battery Cells with Different Electrolytes

| Cell | Electrolyte Type | Cell type | Total Cathode mass (g) | Charge Capacity (mAh), 1st Cycle | Discharge Capacity (mAh), 1st Cycle | Irreversible Capacity (mAh), 1st Cycle | Coulombic Efficiency, 1st Cycle | Charge Capacity (mAh), 5th Cycle | Reversible Capacity (mAh), 5th Cycle | Cumulative Irreversible Capacity (mAh, 5 cycles) | Coulombic efficiency, 5th Cycle |
|---|---|---|---|---|---|---|---|---|---|---|---|
| JTS26 | 1.2M LiPF$_6$, PC + EMC + DMC + MB (30:30:30:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0247 | 1.8914 | 1.6481 | 0.2433 | 87.14 | 1.7486 | 1.7325 | 0.2678 | 99.08 |
| JTS27 | 1.2M LiPF$_6$, PC + EMC + DMC + MB (30:30:30:10 vol %) + 1 wt % VC + 0.5 wt % LiBOB | Li$_4$Ti$_5$O$_{12}$—LiNi$_{1/3}$Co$_{1/3}$Mn$_{1/3}$O$_2$ Cell | 0.0247 | 1.9153 | 1.6725 | 0.2428 | 87.32 | 1.7518 | 1.7425 | 0.2581 | 99.47 |

Low Temperature Studies of Example Electrolytes in NMC/LTO Coin Battery Cells

After completing the formation cycling of the battery cells described above (listed in Tables 5 and 6), half of the battery cells were subjected to low temperature characterization, as summarized in Table 7.

LiDFOB in FEC+EMC+MB (20:20:60 vol %) electrolyte at a variety of discharge rates at −20° C., and FIG. 37 depicts operating voltage as a function of discharge capacity for the 1.20M LiPF$_6$+0.10M LiDFOB in FEC+EMC+MP (20:20:60 vol %) electrolyte at a variety of discharge rates at −20° C. The superior power capability of the MP-based electrolyte,

TABLE 7

Low Temperature Discharge Characteristics of NMC/LTO Battery Cells with Different Electrolytes

| | | Cell | | | | | | | | |
|---|---|---|---|---|---|---|---|---|---|---|
| | | JTS-02 | | JTS-04 | | JTS-06 | | JTS-08 | | JTS-10 | |
| | | Electrolyte Type | | | | | | | | | |
| | | 1.2M LiPF$_6$ in EC + EMC + MB (20:20:60 vol %) + 1 wt % VC | | 1.2M LiPF$_6$ in EC + EMC + MP (20:20:60 vol %) + 1 wt % VC | | 1.2M LiPF$_6$ + 0.10M LiDFOB in FEC + EMC + MB (20:20:60 vol %) | | 1.2M LiPF$_6$ + 0.10M LiDFOB in FEC + EMC + MB (20:20:60 vol %) | | 1.2M LiPF$_6$ + 0.10M LiDFOB in EC + EMC + MB (20:20:60 vol %) | |
| Temp. | Discharge Rate | Capacity (Ah) | Percent (%) | Capacity (Ah) | Percent (%) | Capacity (Ah) | Percent (%) | Capacity (Ah) | Percent (%) | Capacity (Ah) | Percent (%) |
| 20° C. | C/20 | 0.00166 | 100.00 | 0.00167 | 100.00 | 0.00178 | 100.00 | 0.00168 | 100.00 | 0.00177 | 100.00 |
| −20° C. | C/20 | 0.00136 | 81.86 | 0.00138 | 82.48 | 0.00150 | 84.00 | 0.00160 | 95.35 | 0.00151 | 85.19 |
| | C/5 | 0.00120 | 72.41 | 0.00123 | 73.44 | 0.00133 | 74.52 | 0.00145 | 86.37 | 0.00134 | 75.89 |
| | C/2 | 0.00109 | 65.67 | 0.00112 | 67.06 | 0.00121 | 67.80 | 0.00133 | 79.28 | 0.00121 | 68.27 |
| | 1.0 C | 0.00100 | 60.44 | 0.00104 | 62.01 | 0.00111 | 62.17 | 0.00125 | 74.35 | 0.00102 | 57.81 |
| | 2.0 C | 0.00089 | 53.74 | 0.00093 | 55.85 | 0.00098 | 54.83 | 0.00114 | 67.84 | 0.00069 | 39.24 |
| | 3.0 C | 0.00082 | 49.25 | 0.00087 | 51.99 | 0.00089 | 49.85 | 0.00108 | 64.45 | 0.00050 | 28.46 |
| | 4.0 C | 0.00074 | 44.45 | 0.00082 | 48.81 | 0.00080 | 44.74 | 0.00103 | 61.72 | 0.00034 | 19.03 |
| | 5.0 C | 0.00065 | 38.99 | 0.00076 | 45.77 | 0.00069 | 38.97 | 0.00099 | 59.17 | 0.00022 | 12.29 |
| | 6.0 C | 0.00053 | 32.24 | 0.00071 | 42.57 | 0.00056 | 31.58 | 0.00093 | 55.70 | 0.00013 | 7.39 |
| | 7.0 C | 0.00042 | 25.07 | 0.00067 | 39.88 | 0.00042 | 23.61 | 0.00085 | 51.00 | 0.00008 | 4.44 |
| | 8.0 C | 0.00032 | 19.52 | 0.00061 | 36.54 | 0.00030 | 16.77 | 0.00074 | 43.91 | 0.00006 | 3.30 |
| −30° C. | C/20 | 0.00122 | 73.72 | 0.00124 | 74.24 | 0.00135 | 75.86 | 0.00151 | 89.93 | 0.00139 | 78.63 |
| | C/5 | 0.00106 | 63.72 | 0.00108 | 64.37 | 0.00117 | 65.63 | 0.00138 | 82.47 | 0.00120 | 67.79 |
| | C/2 | 0.00093 | 55.99 | 0.00095 | 57.07 | 0.00103 | 57.69 | 0.00125 | 74.49 | 0.00096 | 54.06 |
| | 1.0 C | 0.00081 | 48.84 | 0.00085 | 50.71 | 0.00089 | 50.18 | 0.00113 | 67.29 | 0.00066 | 37.17 |
| | 2.0 C | 0.00063 | 38.04 | 0.00071 | 42.72 | 0.00070 | 39.29 | 0.00102 | 60.87 | 0.00029 | 16.33 |
| | 3.0 C | 0.00046 | 27.55 | 0.00061 | 36.43 | 0.00051 | 28.43 | 0.00094 | 55.82 | 0.00009 | 5.34 |
| | 4.0 C | 0.00029 | 17.79 | 0.00051 | 30.75 | 0.00031 | 17.59 | 0.00084 | 50.02 | 0.00005 | 2.56 |

In general, the electrolytes with methyl propionate (MP) deliver superior power capability compared with methyl butyrate (MB)-based systems, as illustrated in FIGS. 36 and 37. Specifically, FIG. 36 depicts operating voltage as a function of discharge capacity for the 1.20M LiPF$_6$+0.10M which is manifest in FIGS. 36 and 37 as a higher retained discharge capacity over the voltage range, is believed to be attributable to the higher ionic conductivity of the MP-based electrolyte and lower viscosity of the MP solvent mixture compared to the MB solvent mixture.

High Temperature Cycling Studies of Example Electrolytes in NMC/LTO Coin Cells

In addition to performing the low temperature characterization discussed above, a number of NMC/LTO battery cells with the example formulations set forth above were subjected to high temperature cycle life performance studies. FIG. 38 graphically depicts discharge capacity as a function of cycle number for a variety of electrolyte chemistries used in NMC/LTO and NMC/graphite battery cells. As shown, clearly superior performance was obtained for the NMC/LTO coin cells when compared with the NMC/graphite coin cells upon cycling at 60° C. using a 1C charge and discharge rate over the voltage range of 1.5V to 2.80V), even when using MP-based electrolytes. Of the electrolytes investigated, the 1.2 M $LiPF_6$+0.10 M LiBOB in EC/EMC/MB (20:20:60 vol %) delivered the best performance.

As should be appreciated from the foregoing discussion, certain solvent mixtures may be utilized to provide desired power capabilities at lower temperatures (e.g., −20° C. and lower), while certain additives may be utilized to provide stability to the battery cells at higher temperatures. Unfortunately, these properties are often weighed against one another due to competing modes in which they are enabled—film formation is desirable from a high temperature stability standpoint, but may be undesirable from a low temperature resistance standpoint. Again, it is believed that LiDFOB, when used alone or in combination with certain solvents and other additives, may provide desirable properties for both high and low temperature operations. Furthermore, as described in further detail below, PC may be used in addition to or in lieu of EC and/or FEC to provide enhanced power capability in battery cells with titanate-based anodes. Indeed, battery cells incorporating electrolytes produced in accordance with embodiments of the present disclosure may display good power characteristics over a relatively wide temperature range. In fact, the discharge characteristics of such battery cells may enable their use for cold cranking in certain automotive settings (e.g., in a 12 V battery module used for starting, lighting, and ignition (SLI)).

In accordance with certain embodiments of the present disclosure, a combination of LiDFOB, a linear ester, and a carbonate mixture may be utilized, along with a lithium salt (e.g., $LiPF_6$) to provide enhanced power performance and a wide temperature operating range for battery cells used in automotive applications. For example, in one embodiment, the lithium ion battery module 28 of FIG. 2 may incorporate a number of the battery cells 40 having such electrolyte chemistries. It should be noted that in such embodiments, the battery cells 40 (and the battery module 28) may be operated within an SOC range that enables the battery module 28 to provide good discharge power but also have good charge acceptance (e.g., to enable energy capture from regenerative braking). In addition, due to a desirable voltage match, NMC/LTO battery cells may be used in parallel with lead-acid battery cells in certain applications (e.g., start-stop microhybrid applications), and may be operated in a certain SOC range desirable for such applications.

To illustrate certain of the advantages associated with the use of PC in place of EC and LiDFOB in place of LiBOB, FIGS. 39-42 illustrate comparative resistance and power output data associated with a first NMC/LTO battery cell having a baseline electrolyte and a second NMC/LTO battery cell having MB1, an electrolyte with PC and LiDFOB. More specifically, the baseline electrolyte is 1.15M $LiPF_6$ in EC/EMC/DMC/PC (25:30:40:5 vol %)+1 wt % VC, 0.5 wt % LiBOB and MB1 is 1.0M $LiPF_6$ in PC/EMC/DMC/MB (20:30:40:10 vol %)+1 wt % LiDFOB.

FIG. 39 illustrates 10-second internal resistance (IR), in Ohms, for the baseline and MB1 electrolytes, obtained at 50% SOC at 25° C. As shown, the NMC/LTO cells with MB1 demonstrated much lower impedance during both charging and discharging when compared to the baseline electrolyte at 25° C. FIG. 40 illustrates 10-second power (in Watts) for the same electrolytes, also obtained at 50% SOC at 25° C. As shown in FIG. 40, the MB1 battery cells clearly demonstrate a higher power in both the charging and discharging processes compared to the baseline electrolyte.

FIGS. 41 and 42 present similar data to FIGS. 39 and 40, respectively, but obtained at a lower temperature (−25° C.). With reference to FIG. 41, it can be seen that the battery cells with the MB1 electrolyte still have a lower resistance compared to the baseline electrolyte, even at the reduced temperature. Similarly, it can be appreciated with reference to FIG. 42 that the battery cells with the MB1 electrolyte still have a higher power compared to the battery cells with the baseline electrolyte. Indeed, the MB1-based battery cells display a charge power that is approximately 20% higher than the charge power of the battery cells with the baseline electrolyte.

Continuing with the comparison of battery cells with MB1 and battery cells with the baseline electrolyte, it will be appreciated with reference to FIG. 43 that the volumetric power density for MB1-based cells is generally higher than cells with the baseline electrolyte. Specifically, FIG. 43 is a combined plot depicting discharge volumetric power density, in Watts per Liter (W/L), and regenerative volumetric power density in W/L, for an 8 amp-hour (Ah) battery module incorporating a plurality of the MB1-based battery cells and an 8 Ah battery module incorporating a plurality of battery cells with the baseline electrolyte, with the volumetric power densities being a function of % DOD. As shown, the discharge volumetric power density for the MB1-based cells (denoted as line DM) generally remains higher than the baseline cells (denoted as line DB), until the cells are nearly completely discharged. In a similar fashion, the MB1-based cells (denoted as line RM) generally have a higher regenerative volumetric power density compared to the baseline cells (denoted as line RB). That is, for the same battery cell volume, MB-1 based cells are capable of providing and accepting more power than the baseline cells.

As set forth above, the NMC/LTO battery cells incorporating the MB1 electrolyte may be suitable for use as a 12V lithium ion battery module for certain applications (e.g., start-stop microhybrid applications). FIG. 44 illustrates voltage response on pulsing at a temperature of −25° C. of 6 NMC/LTO cells in series for both the MB1 and baseline electrolytes. As shown, the MB1-based battery module has improved polarization resistance versus the battery module with the baseline electrolyte. As discussed above, this may be at least partially due to the presence of LiDFOB, which is believed to produce an SEI layer at the anode that has a lower resistance compared to LiBOB and other additives.

Regarding the resistance of the battery cells, as described above, the overall resistance of the battery cells may increase over time at elevated temperatures due, for example, to side reactions at the surface of the electrodes, where certain solvents may become degraded over time. Accordingly, the use of additives that produce SEI layers may be beneficial. However, some SEI layers may be resistive and, accordingly, may be counterproductive from the standpoint of maintaining the performance of the battery cell. Indeed, the properties of the additives and their associated SEI layers may result in different degrees of resistance increase, as set forth above. LiDFOB may, in certain formulations, have a lower resistance increase compared to other such additives (a greater prevention of resistance increase). Again, it is believed that LiDFOB may produce a thinner and more conductive SEI layer compared to other such additives, as noted above.

FIG. 45 is a bar graph depicting % resistance increase as a function of electrolyte additive. The resistance data was obtained for NMC/LTO battery cells having electrolytes with various additives that produce SEI layers, with a lower % resistance increase being desirable. Specifically, the data obtained to produce the bar graph was based on electrolytes using 1M LiPF$_6$+PC/EMC/DMC/MB (20/30/40/10 vol %)+1 wt % additive, with the baseline formulation being the same as set forth above with respect to FIGS. 39-44. The graph shows the influence of the various additives on resistance increase during high temperature (60° C.) storage of NMC/LTO battery cells with the different electrolytes. As shown, LiDFOB, LiBOB, and LiTFSI have the lowest percentage of resistance increase, with LiDFOB having the best performance out of the group.

One or more of the disclosed embodiments, alone or on combination, may provide one or more technical effects useful in the manufacture of lithium ion battery cell electrolytes, lithium ion battery cells, and lithium ion battery modules. For example, certain embodiments of the present disclosure may enable the manufacture of lithium ion battery cells that having a wide range of operating temperatures, such as temperatures ranging between −40° C. and 60° C. In particular, embodiments of battery cells of the present disclosure include an electrolyte having one or more additives (e.g., fluorinated additives) one or more ester solvents, and one or more carbonate solvents. The disclosed embodiments of the electrolytes enable low resistance at low temperatures (e.g., −30° C.) and good cycle life performance at higher temperatures (e.g., 60° C.). As such, present embodiments enable the production of improved secondary lithium ion battery cells that can provide more current when operating at lower temperatures (e.g., −20° C. and below), and can also provide good longevity throughout successive cycles when operating at higher temperatures (e.g., 45° C. and above). The technical effects and technical problems in the specification are exemplary and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A lithium ion battery cell, comprising:
 a housing;
 a cathode disposed within the housing, wherein the cathode comprises a cathode active material;
 an anode disposed within the housing, wherein the anode comprises an anode active material; and
 an electrolyte disposed within the housing and in contact with the cathode and anode, wherein the electrolyte consists essentially of:
 a solvent mixture comprising a cyclic carbonate, a first non-cyclic carbonate, a second non-cyclic carbonate, and a linear ester;
 a lithium salt in a concentration ranging from approximately 1.0 molar (M) to approximately 1.6M; and
 an additive mixture consisting essentially of lithium difluoro(oxalato)borate (LiDFOB) in an amount ranging from approximately 0.5 wt % to approximately 2.0 wt % based on the weight of the electrolyte, and vinylene carbonate (VC) in an amount ranging from approximately 0.5 wt % to approximately 2.0 wt % based on the weight of the electrolyte,
 wherein the solvent mixture consists essentially of:
 the cyclic carbonate in an amount between approximately 5 vol % and approximately 30 vol % based on the total volume of the solvent mixture;
 wherein the first and second non-cyclic carbonates together represent between approximately 50 vol % and approximately 80 vol % of the total volume of the solvent mixture; and
 the linear ester in an amount between approximately 5 vol % and approximately 20 vol %, based on the total volume of the solvent mixture, wherein the volume percentage of the cyclic carbonate is greater than or approximately equal to the volume percentage of the linear ester.

2. The lithium ion battery cell of claim 1, wherein the cyclic carbonate is ethylene carbonate (EC), the first non-cyclic carbonate is ethyl methyl carbonate (EMC), the second non-cyclic carbonate is dimethyl carbonate (DMC), the linear ester is methyl butyrate (MB), and the lithium salt is lithium hexafluorophosphate (LiPF$_6$).

3. The lithium ion battery cell of claim 2, wherein the solvent mixture is EC/EMC/DMC/MB (20:30:40:10 vol %), LiDFOB is present in an amount of approximately 0.5 wt % based on the weight of the electrolyte, VC is present in an amount of approximately 1 wt % based on the weight of the electrolyte, and LiPF$_6$ is in a concentration of approximately 1.2 M.

4. The lithium ion battery cell of claim 1, wherein the first cyclic carbonate is fluoroethylene carbonate (FEC) and the second cyclic carbonate is ethylene carbonate (EC), and FEC and EC are present in approximately equal volume percentages.

5. The lithium ion battery cell of claim 4, wherein the linear ester is MB, the first non-cyclic carbonate is EMC, and the second non-cyclic carbonate is DMC.

6. The lithium ion battery cell of claim 1, wherein the anode active material comprises a titanate-based material or a graphite-based material.

7. The lithium ion battery cell of claim 6, wherein the electrolyte produces a solid electrolyte interface (SEI) layer at the anode that is less resistive than would be obtained using lithium bis(oxalato)borate (LiBOB) in place of the LiDFOB.

8. The lithium ion battery cell of claim 1, wherein the cathode active material comprises a lithium nickel cobalt manganese oxide (NMC) active material, a lithium cobalt oxide (LCO) active material, a lithium metal oxide spinel (LMO-spinel) active material, or any combination thereof.

9. A lithium ion battery cell, comprising:
a housing;
a cathode disposed within the housing, wherein the cathode comprises a cathode active material;
an anode disposed within the housing, wherein the anode comprises an anode active material; and
an electrolyte disposed within the housing and in contact with the cathode and anode, wherein the electrolyte comprises a solvent mixture, a lithium salt in a concentration ranging from approximately 1.0 molar (M) to approximately 1.6 M, and lithium difluoro(oxalato) borate (LiDFOB) in an amount ranging from approximately 0.5 wt % to approximately 2.0 wt % based on the weight of the electrolyte; and
wherein the solvent mixture consists essentially of fluoroethylene carbonate (FEC) in an amount between approximately 5 vol % and approximately 30 vol % based on the total volume of the solvent mixture, a non-cyclic carbonate in an amount between approximately 5 vol % and approximately 30 vol % based on the total volume of the solvent mixture, and a linear ester in an amount between approximately 50 vol % and approximately 70 vol % based on the total volume of the solvent mixture.

10. The lithium ion battery cell of claim 9, wherein FEC and the non-cyclic carbonate are present in approximately equal volume percentages.

11. The lithium ion battery cell of claim 9, wherein the non-cyclic carbonate is ethyl methyl carbonate (EMC).

12. The lithium ion battery cell of claim 9, wherein the linear ester is methyl butyrate (MB), methyl propionate (MP), or ethyl propionate (EP).

13. The lithium ion battery cell of claim 9, wherein the linear ester is EP.

14. The lithium ion battery cell of claim 13, wherein the electrolyte is such that the lithium ion battery cell is less resistive, at a depth of discharge percentage (% DOD) ranging between approximately 0% and approximately 75% and at a temperature below approximately −25° C., than would be obtained using MB or MP in place of the EP.

15. The lithium ion battery cell of claim 9, wherein the electrolyte consists essentially of the solvent mixture, the lithium salt, and LiDFOB.

16. The lithium ion battery cell of claim 15, wherein the solvent mixture is FEC/EMC/MB (20:20:60 vol %), FEC/EMC/MP (20:20:60 vol %), or FEC/EMC/EP (20:20:60 vol %).

17. The lithium ion battery cell of claim 9, wherein the electrolyte is 1.20 M $LiPF_6$ in FEC/EMC/MB (20:20:60 vol %)+1 wt % LiDFOB, or 1.20 M LiPF6+0.10M LiDFOB in FEC/EMC/MP (20:20:60 vol %), or 1.20M $LiPF_6$ in FEC/EMC/EP (20:20:60 vol %)+1 wt % LiDFOB.

18. A lithium ion battery cell, comprising:
a housing;
a cathode disposed within the housing, wherein the cathode comprises a cathode active material;
an anode disposed within the housing, wherein the anode comprises a titanate-based active material; and
an electrolyte disposed within the housing and in contact with the cathode and anode, wherein the electrolyte comprises a solvent mixture, a lithium salt in a concentration ranging from approximately 1.0 molar (M) to approximately 1.6 M, and lithium difluoro(oxalato) borate (LiDFOB) in an amount ranging from approximately 0.5 wt % to approximately 2.0 wt % based on the weight of the electrolyte;
wherein the solvent mixture consists essentially of propylene carbonate (PC) in an amount between approximately 5 vol % and approximately 30 vol % based on the total volume of the solvent mixture, a first non-cyclic carbonate and a second non-cyclic carbonate, wherein the first and second non-cyclic carbonates together represent between approximately 50 vol % and approximately 80 vol % of the total volume of the solvent mixture, and a linear ester in an amount between approximately 5 vol % and approximately 20 vol % based on the total volume of the solvent mixture, wherein the volume percentage of the PC is greater than or approximately equal to the volume percentage of the linear ester.

19. The lithium ion battery cell of claim 18, wherein the volume percentage of the PC is less than or approximately equal to the total volume percentage of the first and second non-cyclic carbonates.

20. The lithium ion battery cell of claim 18, wherein the electrolyte consists essentially of the solvent mixture, the lithium salt, and LiDFOB.

21. The lithium ion battery cell of claim 18, wherein the solvent mixture is PC/ethyl methyl carbonate (EMC)/dimethyl carbonate (DMC)/metyl butyrate (MB) (20:30:40:10 vol %).

* * * * *

UNITED STATES PATENT AND TRADEMARK OFFICE
CERTIFICATE OF CORRECTION

| | | |
|---|---|---|
| PATENT NO. | : 9,947,960 B2 | |
| APPLICATION NO. | : 14/614389 | |
| DATED | : April 17, 2018 | |
| INVENTOR(S) | : Boutros Hallac et al. | |

It is certified that error appears in the above-identified patent and that said Letters Patent is hereby corrected as shown below:

On the Title Page

1. In Item (57), under "ABSTRACT", in Column 2, Line 10, delete "an non-cyclic" and insert -- a non-cyclic --.

2. On Page 2, in Item (56), under "OTHER PUBLICATIONS", in Column 2, Line 7, delete "Use" and insert -- Use of --.

3. On Page 2, in Item (56), under "OTHER PUBLICATIONS", in Column 2, Line 12, delete "NOP-44974;" and insert -- NPO-44974; --.

4. On Page 2, in Item (56), under "OTHER PUBLICATIONS", in Column 2, Line 34, delete "Phospate" and insert -- Phosphate --.

In the Drawings

5. Sheets 4, 7, 8, 10, 11, 13, 14, 16, 21, 22, 25, 26, 32-36 should be replaced with attached drawing sheets 4, 7, 8, 10, 11, 13, 14, 16, 21, 22, 25, 26, 32-36.

In the Specification

6. In Column 1, Lines 10-12, delete ""ELECTROYLYTES WITH ESTER CO-SOLVENTS AND ADDITIVES FOR INPROVED WIDE OPERATING TEMPERATURE RANGE"," and insert -- "ELECTROLYTES WITH ESTER CO-SOLVENTS AND ADDITIVES FOR IMPROVED WIDE OPERATING TEMPERATURE RANGE", --.

7. In Column 1, Line 52, delete "systems" and insert -- electric vehicles --.

8. In Column 1, Line 55, delete "systems" and insert -- electric vehicles --.

Signed and Sealed this
Eleventh Day of December, 2018

Andrei Iancu
*Director of the United States Patent and Trademark Office*

9. In Column 2, Lines 57-58, delete "an non-cyclic" and insert -- a non-cyclic --.

10. In Column 3, Line 25, delete "an non-cyclic" and insert -- a non-cyclic --.

11. In Column 3, Line 29, delete "DRAWINGS" and insert -- BRIEF DESCRIPTION OF DRAWINGS --.

12. In Column 5, Line 25, delete "25° C." and insert -- -25° C. --.

13. In Column 9, Line 60, delete "module" and insert -- battery module --.

14. In Column 11, Line 9, delete "42, 44." and insert -- 44, 42. --.

15. In Column 12, Line 28, delete "cobalt manganese" and insert -- manganese cobalt --.

16. In Column 12, Line 29, delete "$LiN_{1/3}Co_{1/3}Mn_{1/3}O_2$" and insert -- $LiNi_{1/3}Co_{1/3}Mn_{1/3}O_2$ --.

17. In Column 17, Lines 58-59, delete "lithium bistrifluoromethylsulfonylimide" and insert -- lithium bis(trifluoromethanesulfonyl)imide --.

18. In Column 18, Line 63, delete "%))+1" and insert -- %)+1 --.

19. In Column 22, Line 10, delete "JCO1")," and insert -- JC01"), --.

20. In Column 30, Line 17, delete "as plot" and insert -- a plot --.

21. In Columns 31-32, in Table 4, under "JCS-13", Line 4, delete "1% PS" and insert -- 1 wt % PS --.

22. In Columns 33-34, in Table 4, Line 4, delete "26.92" and insert -- 29.62 --.

23. In Columns 33-34, in Table 4, under "JCS-19", Line 3, delete "(20:20 :60" and insert -- (20:20:60 --.

24. In Columns 35-36, in Table 5, under "Electrolyte", Line 10, delete "1% VC" and insert -- 1 wt % VC --.

25. In Columns 37-38, in Table 6, Line 1, delete "Charachteristics" and insert -- Characteristics --.

26. In Columns 39-40, in Table 6, Line 1, delete "Charachteristics" and insert -- Characteristics --.

27. In Columns 41-42, in Table 6, Line 1, delete "Charachteristics" and insert -- Characteristics --.

28. In Column 45, Line 23, delete "on" and insert -- in --.

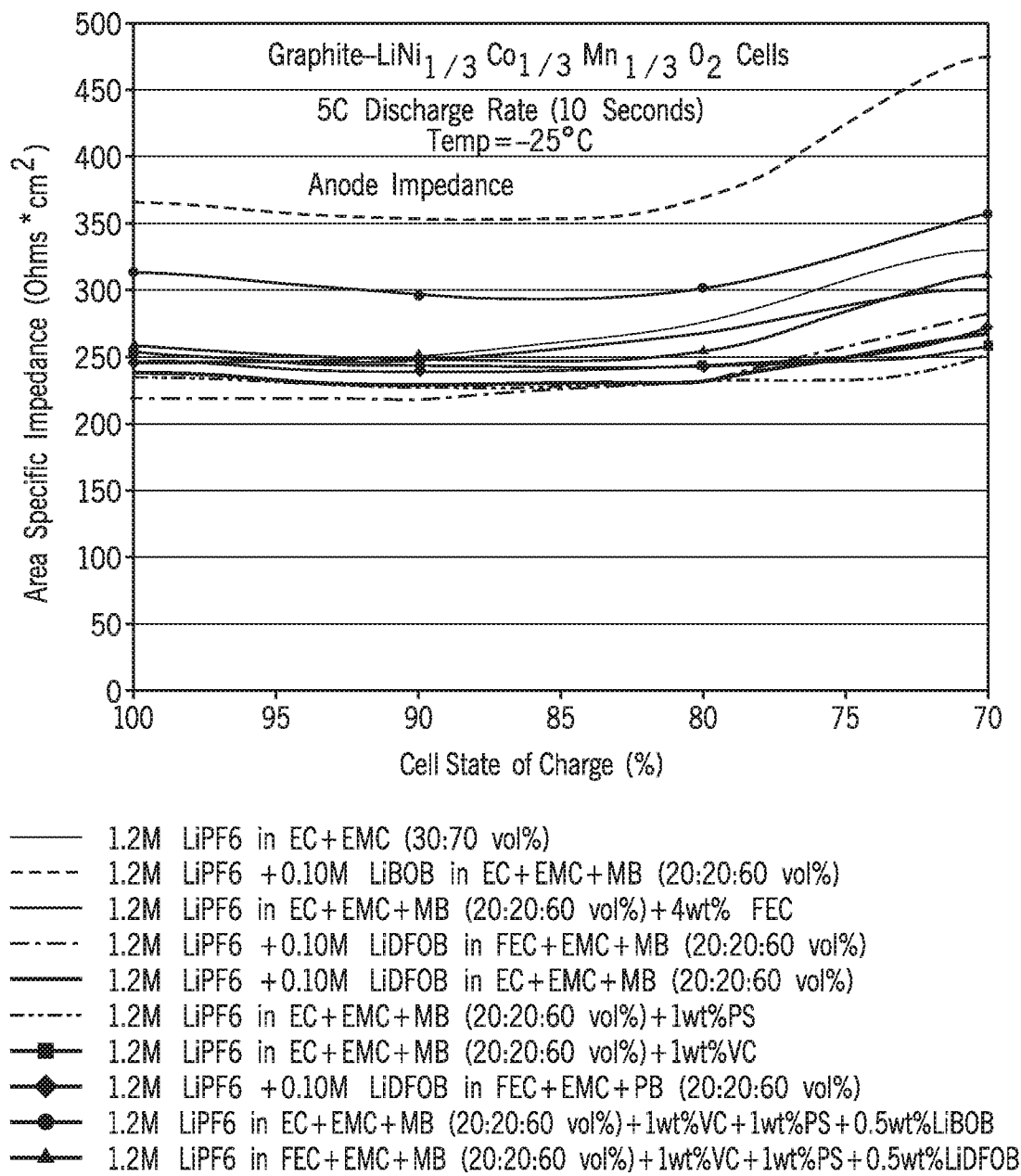

― 1.2M LiPF6 in EC+EMC (30:70 vol%)
---- 1.2M LiPF6 +0.10M LiBOB in EC+EMC+MB (20:20:60 vol%)
――― 1.2M LiPF6 in EC+EMC+MB (20:20:60 vol%)+4wt% FEC
―·―· 1.2M LiPF6 +0.10M LiDFOB in FEC+EMC+MB (20:20:60 vol%)
━━━ 1.2M LiPF6 +0.10M LiDFOB in EC+EMC+MB (20:20:60 vol%)
······ 1.2M LiPF6 in EC+EMC+MB (20:20:60 vol%)+1wt%PS
―■― 1.2M LiPF6 in EC+EMC+MB (20:20:60 vol%)+1wt%VC
―◆― 1.2M LiPF6 +0.10M LiDFOB in FEC+EMC+PB (20:20:60 vol%)
―●― 1.2M LiPF6 in EC+EMC+MB (20:20:60 vol%)+1wt%VC+1wt%PS+0.5wt%LiBOB
―▲― 1.2M LiPF6 in FEC+EMC+MB (20:20:60 vol%)+1wt%VC+1wt%PS+0.5wt%LiDFOB

FIG. 20